US011336890B2

(12) United States Patent
George et al.

(10) Patent No.: US 11,336,890 B2
(45) Date of Patent: May 17, 2022

(54) ENCODER AND DECODER, ENCODING METHOD AND DECODING METHOD FOR VERSATILE SPATIAL PARTITIONING OF CODED PICTURES

(71) Applicant: Fraunhofer-Gesellschaft zur Förderung der angewandten Forschung e.V., Munich (DE)

(72) Inventors: Valeri George, Berlin (DE); Tobias Hinz, Berlin (DE); Jackie Ma, Berlin (DE); Yago Sánchez De La Fuente, Berlin (DE); Robert Skupin, Berlin (DE); Thomas Schierl, Berlin (DE); Jens Brandenburg, Berlin (DE); Christian Lehmann, Berlin (DE); Adam Wieckowski, Berlin (DE); Heiko Schwarz, Berlin (DE); Detlev Marpe, Berlin (DE); Thomas Wiegand, Berlin (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/140,560

(22) Filed: Jan. 4, 2021

(65) Prior Publication Data

US 2021/0127111 A1 Apr. 29, 2021

Related U.S. Application Data

(63) Continuation of application No. PCT/EP2019/068429, filed on Jul. 9, 2019.

(30) Foreign Application Priority Data

Jul. 9, 2018 (EP) .................................... 18182554

(51) Int. Cl.
*H04N 19/119* (2014.01)
*H04N 19/172* (2014.01)
(Continued)

(52) U.S. Cl.
CPC ......... *H04N 19/119* (2014.11); *H04N 19/172* (2014.11); *H04N 19/1883* (2014.11); *H04N 19/46* (2014.11)

(58) Field of Classification Search
CPC ......................... H04N 19/172; H04N 19/1883
See application file for complete search history.

(56) References Cited

U.S. PATENT DOCUMENTS

| | | | | |
|---|---|---|---|---|
| 8,855,201 B2* | 10/2014 | Kim | H04N 19/46 | 375/240.12 |
| 2015/0201501 A1* | 7/2015 | Chi | H01L 21/76831 | 428/138 |

FOREIGN PATENT DOCUMENTS

| | | |
|---|---|---|
| EP | 3 185 553 A1 | 6/2017 |
| WO | 2019/185815 A1 | 10/2019 |
| WO | 2019/185821 A1 | 10/2019 |

OTHER PUBLICATIONS

Oh, H.M., et al.; "MCTS extraction with implicit slice reordering;" Joint Collaborative Team on Video Coding of ISO/IEC JTC1/SC29/WG11 and ITU-T SG.16; Oct. 2017; pp. 1-3.

(Continued)

*Primary Examiner* — Jerry T Jean Baptiste
(74) *Attorney, Agent, or Firm* — Spencer C. Patterson; Grable Martin Fulton PLLC

(57) ABSTRACT

A video decoder for decoding an encoded video signal including encoded picture data and indication data of a picture of a video to reconstruct the picture of the video is provided. The video decoder includes an interface configured for receiving the encoded video signal, and a data decoder configured for reconstructing the picture of the (Continued)

video by decoding the encoded picture data using the indication data. The picture is partitioned into a plurality of coding areas. One or more coding areas of the plurality of coding areas include two or more coding tree units of the plurality of coding tree units, wherein each coding area of the one or more coding areas which includes two or more coding tree units exhibits a coding order for the two or more coding tree units of the coding area.

24 Claims, 32 Drawing Sheets

(51) Int. Cl.

*H04N 19/169* (2014.01)

*H04N 19/46* (2014.01)

(56) References Cited

OTHER PUBLICATIONS

Skupin, R., et al.; "AHG 12: Sub-bitstream extraction/merging friendly slice address signalling;" The Joint Video Exploration Team of ISO/IEC JTC1/SC29/WG11 and ITU-T SG.16; Sep. 2018; pp. 1-5.

ISO/IEC, ITU-T. High efficiency video coding. ITU-T Recommendation H.265 | ISO/IEC 23008 10 (HEVC), edition 1; Apr. 2013; pp. 1-317.

ISO/IEC, ITU-T. High efficiency video coding. ITU-T Recommendation H.265 | ISO/IEC 23008 10 (HEVC edition 2; Oct. 2014; pp. 1-540.

International Search Report and Written Opinion in PCT/EP2019/068429, dated Nov. 22, 2019.

* cited by examiner

ENCODER AND DECODER, ENCODING METHOD AND DECODING METHOD FOR VERSATILE SPATIAL PARTITIONING OF CODED PICTURES

CROSS-REFERENCE TO RELATED APPLICATIONS

This application is a continuation of copending International Application No. PCT/EP2019/068429, filed Jul. 9, 2019, which is incorporated herein by reference in its entirety, and additionally claims priority from European Application Ns. 18182554.8, filed Jul. 9, 2018, which is also incorporated herein by reference in its entirety.

The present invention relates to video encoding and video decoding and, in particular, to an encoder and a decoder, to an encoding method and to a decoding method for versatile spatial partitioning of coded pictures.

BACKGROUND OF THE INVENTION

H.265/HEVC is video codec which already provides tools for elevating or even enabling parallel processing at encoder and/or decoder. For instance, HEVC supports a sub-division of pictures into an array of tiles which are encoded independently from each other. Another concept supported by HEVC pertains to WPP, according to which CTU rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following section "VCL partitioning according to the state-of-the-art", an introduction to VCL partitioning according to the state-of-the-art is described (VCL=video coding layer).

Typically, in video coding, a coding process of picture samples involves smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used. In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, slice means a segment comprising one or more consecutive CTUs of a picture.

In the subsection "picture partitioning with slices" below, it is explained, how slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc., as described in more detail in the following.

In the following subsection "picture partitioning with slices", picture partitioning with slices is described.

Beginning with the H.263 standard, the sequence of data representing contiguous blocks in a particular scan order can be organized into groups called slices. Typically, the dependencies between CTUs of different slices of a picture, e.g. in terms of prediction and entropy coding, are prohibited, so individual slices within a picture can be independently reconstructed.

FIG. 2 illustrates picture segmentation with slices in raster scan order. The size of a slice is determined by the number of CTUs (coding tree units) and the size of each coded CTU that belongs to a slice as illustrated in FIG. 2. FIG. 2 comprises 50 CTUs, for example, CTU 21, CTU 24 and CTU 51.

In the following subsection "picture partitioning with tiles", picture partitioning with tiles is described with reference to FIG. 3. FIG. 3 comprises 50 CTUs, for example, CTU 23, CTU 27 and CTU 41.

Tiles are a concept introduced in HEVC, although the concept is a quite similar to Flexible Macroblock Ordering (FMO) was added to H.264/AVC. The concept of tiles allows dividing the picture into several rectangular regions.

Tiles are thus a result of dividing the original picture into a given number of rows and columns with a specified height and width respectively as illustrated in FIG. 3. As a result of that, tiles within an HEVC bitstream need to have common boundaries that form a regular grid.

In the following sub-section "partitioning use cases and shortcomings of the state-of-the-art", partitioning use cases and shortcomings of the state-of-the-art are described with reference to FIG. 4 and to FIG. 5.

FIG. 4 illustrates tile-based 360° video streaming with an unequal resolution. In 360° video streaming, a viewport adaptive streaming technique is gaining traction called tile-based 360° video streaming. The main idea is to provide the 360° video comprising several tiles at different resolutions. Thus, depending on the current viewport the client downloads some tiles matching to the viewport at high resolution other tiles that are located outside the viewport at lower resolutions, as shown in FIG. 4.

At the client side, the receiver combines these downloaded tiles at different resolutions into a single HEVC bitstream for which the downloaded tiles cannot be described as tiles in HEVC syntax anymore. The reason for this is that these downloaded tiles do not share the same boundaries across the whole picture, and the tiling granularity of the original streams is different. See, for example, the top and bottom dashed lines for the low-resolution part in FIG. 4, which can only be expressed as slice boundaries in HEVC syntax as there is no corresponding boundary in the high-resolution part on the left-hand side.

Another scenario in which a more flexible picture partitioning would be beneficial are low-delay conversational applications. Picture partitioning is also used for decoding/encoding parallelization. In some cases, this parallelization is the only way to achieve real time decoding/encoding. One could imagine a video conferencing scenario where 2 persons appear in the picture.

FIG. 5 illustrates flexible coding area partitioning.

Probably, a good picture partitioning that could be used to achieve a (coding complexity wise-)fair load balancing could be the one shown in FIG. 5. However, in this scenario, tiling lacks desirable flexibility due to the need of a rectangular tiling grid.

Another main purpose of segmentation (with slices) is error robustness. If some slices of the picture are lost, it will not prevent the reconstruction of the successfully received slices and so the partially reconstructed picture can be output and can be further used as the reference picture in the temporal prediction process for the following pictures. This feature is very important in transmission systems with higher error rates or where the content of each picture is of extreme importance. On the other hand, there also exist transmission schemes, e.g. dynamic adaptive streaming via HTTP as in MPEG DASH, that feature error detection and mitigation techniques on the transport layer (TCP/IP) and for which buffer stalling until successful retransmission is the solution to transmission errors. In such scenarios, introduction of additional dependencies can be allows which would be damaging to error resilience. The state-of-the-art slice and tile partitioning lack flexibility in the respect as well.

SUMMARY

According to an embodiment, a video decoder for decoding an encoded video signal having encoded picture data and indication data of a picture of a video to reconstruct the picture of the video may have: an interface configured for receiving the encoded video signal, a data decoder configured for reconstructing the picture of the video by decoding the encoded picture data using the indication data, wherein the picture is partitioned into a plurality of coding areas, wherein each coding area of the plurality of coding areas is located within the picture, wherein each of the plurality of coding areas includes one or more coding tree units of a plurality of coding tree units being located within the picture, wherein, using the indication data, the data decoder is configured to decode the encoded picture data depending on the plurality of coding areas, wherein the indication data includes information on the plurality of coding areas, wherein one or more coding areas of the plurality of coding areas include two or more coding tree units of the plurality of coding tree units, wherein each coding area of the one or more coding areas which includes two or more coding tree units exhibits a coding order for the two or more coding tree units of said coding area, wherein, using the indication data, the data decoder is configured to decode the encoded picture data depending on the coding order of the one or more coding areas which include two or more coding tree units, wherein the indication data includes information on the coding order of the one or more coding areas which include two or more coding tree units.

According to another embodiment, a video encoder for encoding a picture by generating an encoded video signal may have: a data encoder configured for encoding a picture of a video into encoded picture data, wherein the data encoder is moreover configured to generate indication data, and a signal generator configured for generating the encoded video signal including the encoded picture data and the indication data, wherein the picture is partitioned into a plurality of coding areas, wherein each coding area of the plurality of coding areas is located within the picture, wherein each of the plurality of coding areas includes one or more coding tree units of a plurality of coding tree units being located within the picture, wherein the data encoder is configured to encode the picture depending on the plurality of coding areas, and wherein the data encoder is configured to generate the indication data such that the indication data includes information on the plurality of coding areas, wherein one or more coding areas of the plurality of coding areas include two or more coding tree units of the plurality of coding tree units, wherein each coding area of the one or more coding areas which includes two or more coding tree units exhibits a coding order for the two or more coding tree units of said coding area, wherein the data encoder is configured to encode the picture depending on the coding order of the one or more coding areas which include two or more coding tree units, and wherein the data encoder is configured to generate the indication data such that the indication data includes information on the coding order of the one or more coding areas which include two or more coding tree units.

Another embodiment may have an encoded video signal encoding a picture, wherein the encoded video signal has encoded picture data and indication data, wherein the picture is partitioned into a plurality of coding areas, wherein each coding area of the plurality of coding areas is located within the picture, wherein each of the plurality of coding areas includes one or more coding tree units of a plurality of coding tree units being located within the picture, wherein the picture is encoded depending on the plurality of coding areas, and wherein the indication data includes information on the plurality of coding areas, wherein one or more coding areas of the plurality of coding areas include two or more coding tree units of the plurality of coding tree units, wherein each coding area of the one or more coding areas which includes two or more coding tree units exhibits a coding order for the two or more coding tree units of said coding area, wherein the picture is encoded depending on the coding order of the one or more coding areas which include two or more coding tree units, and wherein the indication data includes information on the coding order of the one or more coding areas which include two or more coding tree units.

According to another embodiment, a method for decoding an encoded video signal including encoded picture data and indication data of a picture of a video to reconstruct the picture of the video may have the steps of: receiving the encoded video signal, and reconstructing the picture of the video by decoding the encoded picture data using the indication data, wherein the picture is partitioned into a plurality of coding areas, wherein each coding area of the plurality of coding areas is located within the picture, wherein each of the plurality of coding areas includes one or more coding tree units of a plurality of coding tree units being located within the picture, wherein, using the indication data, wherein decoding the encoded picture data is conducted depending on the plurality of coding areas, wherein the indication data includes information on the plurality of coding areas, wherein one or more coding areas of the plurality of coding areas include two or more coding tree units of the plurality of coding tree units, wherein each coding area of the one or more coding areas which includes two or more coding tree units exhibits a coding order for the two or more coding tree units of said coding area, wherein, using the indication data, decoding the encoded picture data is conducted depending on the coding order of the one or more coding areas which include two or more coding tree units, wherein the indication data includes information on the coding order of the one or more coding areas which include two or more coding tree units.

According to another embodiment, a method for encoding a picture by generating an encoded video signal may have the steps of: encoding a picture of a video into encoded picture data, generating indication data, and generating the encoded video signal including the encoded picture data and the indication data, wherein the picture is partitioned into a plurality of coding areas, wherein each coding area of the plurality of coding areas is located within the picture, wherein each of the plurality of coding areas includes one or more coding tree units of a plurality of coding tree units being located within the picture, wherein encoding the picture is conducted depending on the plurality of coding areas, and wherein generating the indication data is conducted such that the indication data includes information on the plurality of coding areas, wherein one or more coding areas of the plurality of coding areas include two or more coding tree units of the plurality of coding tree units, wherein each coding area of the one or more coding areas which includes two or more coding tree units exhibits a coding order for the two or more coding tree units of said coding area, wherein encoding the picture is conducted depending on the coding order of the one or more coding areas which include two or more coding tree units, and wherein generating the indication data is conducted such that the indication data includes information on the coding order of the one or more coding areas which include two or more coding tree units.

Another embodiment may have a non-transitory digital storage medium having a computer program stored thereon to perform the inventive methods when said computer program is run by a computer.

According to another embodiment, an inventive system may have: the inventive video encoder for encoding a picture by generating an encoded video signal, and the video decoder for decoding an encoded video signal including encoded picture data and indication data of a picture of a video to reconstruct the picture of the video, wherein the video encoder is configured to generate the encoded video signal, and wherein the video decoder is configured to decode the encoded video signal to reconstruct the picture of the video.

A video encoder for encoding a picture by generating an encoded video signal is provided. The video encoder comprises a data encoder configured for encoding a picture of a video into encoded picture data, wherein the data encoder is moreover configured to generate indication data. Moreover, the video encoder comprises a signal generator configured for generating the encoded video signal comprising the encoded picture data and the indication data. The picture is partitioned into a plurality of coding areas, wherein each coding area of the plurality of coding areas is located within the picture, wherein each of the plurality of coding areas comprises one or more coding tree units of a plurality of coding tree units being located within the picture, wherein the data encoder is configured to encode the picture depending on the plurality of coding areas, and wherein the data encoder is configured to generate the indication data such that the indication data comprises information on the plurality of coding areas. One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the data encoder is configured to encode the picture depending on the coding order of the one or more coding areas which comprise two or more coding tree units, and wherein the data encoder is configured to generate the indication data such that the indication data comprises information on the coding order of the one or more coding areas which comprise two or more coding tree units.

Moreover, a video decoder for decoding an encoded video signal comprising encoded picture data and indication data of a picture of a video to reconstruct the picture of the video is provided. The video decoder comprises an interface configured for receiving the encoded video signal, and a data decoder configured for reconstructing the picture of the video by decoding the encoded picture data using the indication data. The picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, the data decoder is configured to decode the encoded picture data depending on the plurality of coding areas, wherein the indication data comprises information on the plurality of coding areas. One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, the data decoder is configured to decode the encoded picture data depending on the coding order of the one or more coding areas which comprise two or more coding tree units, wherein the indication data comprises information on the coding order of the one or more coding areas which comprise two or more coding tree units.

Furthermore, a method for encoding a picture by generating an encoded video signal is provided. The method comprises:

Encoding a picture of a video into encoded picture data.

Generating indication data. And:

Generating the encoded video signal comprising the encoded picture data and the indication data.

The picture is partitioned into a plurality of coding areas, wherein each coding area of the plurality of coding areas is located within the picture, wherein each of the plurality of coding areas comprises one or more coding tree units of a plurality of coding tree units being located within the picture, wherein encoding the picture is conducted depending on the plurality of coding areas, and wherein generating the indication data is conducted such that the indication data comprises information on the plurality of coding areas. One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein encoding the picture is conducted depending on the coding order of the one or more coding areas which comprise two or more coding tree units, and wherein generating the indication data is conducted such that the indication data comprises information on the coding order of the one or more coding areas which comprise two or more coding tree units.

Moreover, a method for decoding an encoded video signal comprising encoded picture data and indication data of a picture of a video to reconstruct the picture of the video is provided. The method comprises:

Receiving the encoded video signal. And:

Reconstructing the picture of the video by decoding the encoded picture data using the indication data.

The picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, wherein decoding the encoded picture data is conducted depending on the plurality of coding areas, wherein the indication data comprises information on the plurality of coding areas. One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, decoding the encoded picture data is conducted depending on the coding order of the one or more coding areas which comprise two or more coding tree units, wherein the indication data comprises information on the coding order of the one or more coding areas which comprise two or more coding tree units.

Moreover, a computer program is provided for implementing one of the above-described methods when being executed on a computer or signal processor.

Furthermore, an encoded video signal encoding a picture is provided, wherein the encoded video signal comprises encoded picture data and indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein the picture is encoded depending on the plurality of coding areas, and wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the picture is encoded depending on the coding order of the one or more coding areas which comprise two or more coding tree units, and wherein the indication data comprises information on the coding order of the one or more coding areas which comprise two or more coding tree units.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
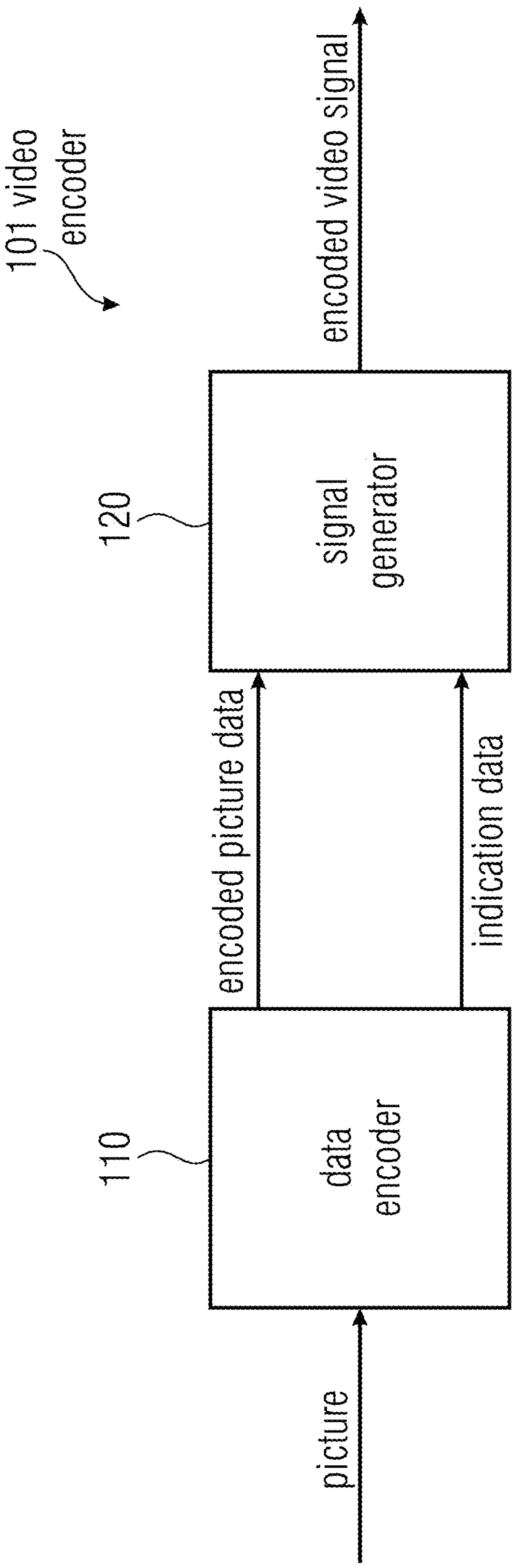
FIG. 1*a* illustrates a video encoder for encoding a picture by generating an encoded video signal according to an embodiment.

FIG. 1*a* illustrates a video encoder 101 for encoding a picture by generating an encoded video signal according to an embodiment.

The video encoder 101 comprises a data encoder 110 configured for encoding a picture of a video into encoded picture data. The data encoder 110 is moreover configured to generate indication data.

Moreover, the video encoder 101 comprises a signal generator 120 configured for generating the encoded video signal comprising the encoded picture data and the indication data.

The picture is partitioned into a plurality of coding areas, wherein each coding area of the plurality of coding areas is located within the picture, wherein each of the plurality of coding areas comprises one or more coding tree units of a plurality of coding tree units being located within the picture. The data encoder 110 is configured to encode the picture depending on the plurality of coding areas, and wherein the data encoder 110 is configured to generate the indication data such that the indication data comprises information on the plurality of coding areas.

One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area. The data encoder 110 is configured to encode the picture depending on the coding order of the one or more coding areas which comprise two or more coding tree units. Moreover, the data encoder 110 is configured to generate the indication data such that the indication data comprises information on the coding order of the one or more coding areas which comprise two or more coding tree units.

Figure 1B:
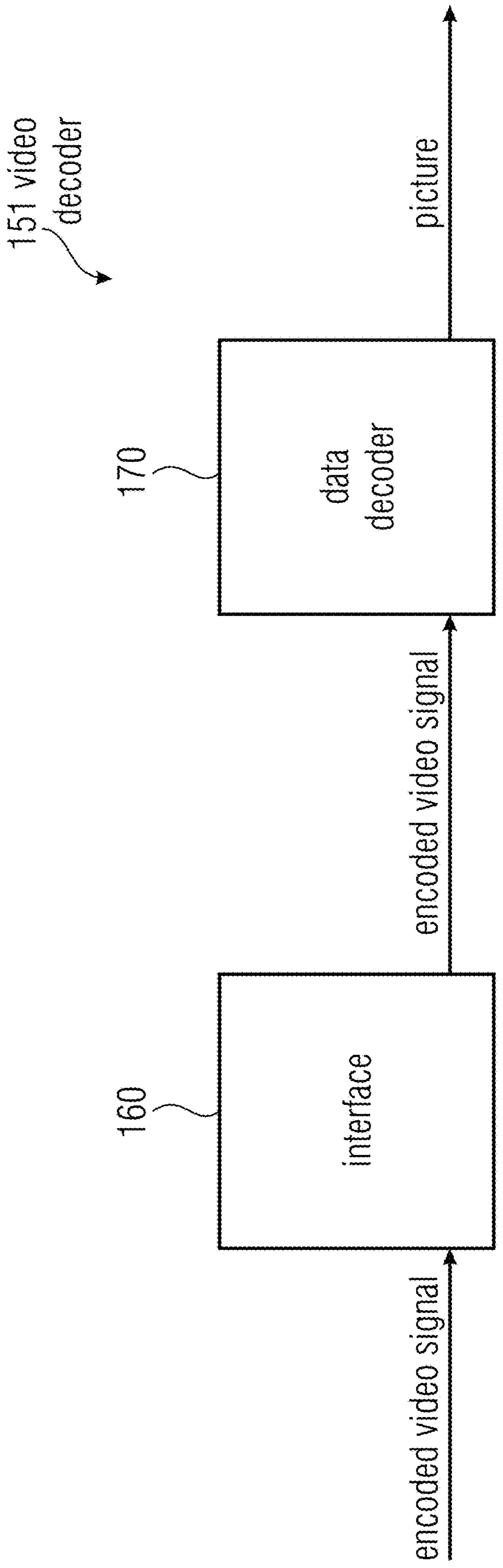
FIG. 1*b* illustrates a video decoder for decoding an encoded video signal comprising encoded picture data and indication data of a picture of a video to reconstruct the picture of the video according to an embodiment.

FIG. 1*b* illustrates a video decoder 151 for decoding an encoded video signal comprising encoded picture data and indication data of a picture of a video to reconstruct the picture of the video according to an embodiment.

The video decoder 151 comprises an interface 160 configured for receiving the encoded video signal.

Moreover, the video decoder 151 comprises data decoder 170 configured for reconstructing the picture of the video by decoding the encoded picture data using the indication data.

The picture is partitioned into a plurality of coding areas, wherein each coding area of the plurality of coding areas is located within the picture, wherein each of the plurality of coding areas comprises one or more coding tree units of a plurality of coding tree units being located within the picture. Using the indication data, the data decoder 170 is configured to decode the encoded picture data depending on the plurality of coding areas, wherein the indication data comprises information on the plurality of coding areas.

One or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area. Using the indication data, the data decoder 170 is configured to decode the encoded picture data depending on the coding order of the one or more coding areas which comprise two or more coding tree units, wherein the indication data comprises information on the coding order of the one or more coding areas which comprise two or more coding tree units.

According to an embodiment, the video decoder 151 of FIG. 1*b* may, e.g., be configured to output the picture of the video on an output device, for example, on a display of e.g., a TV, a computer, a mobile phone, etc.

Figure 1C:
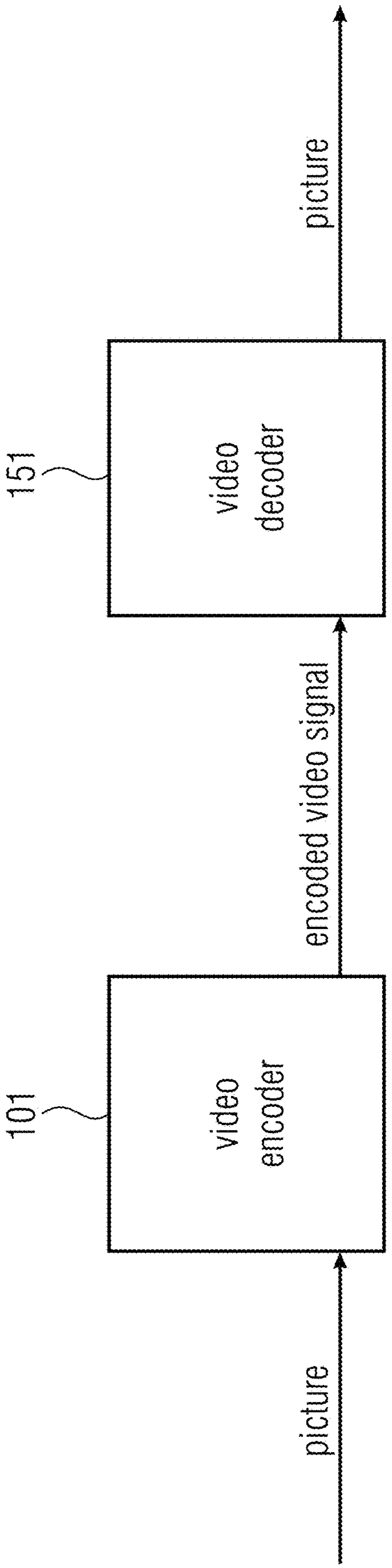
FIG. 1*c* illustrates a system according to an embodiment.
Figure 2:
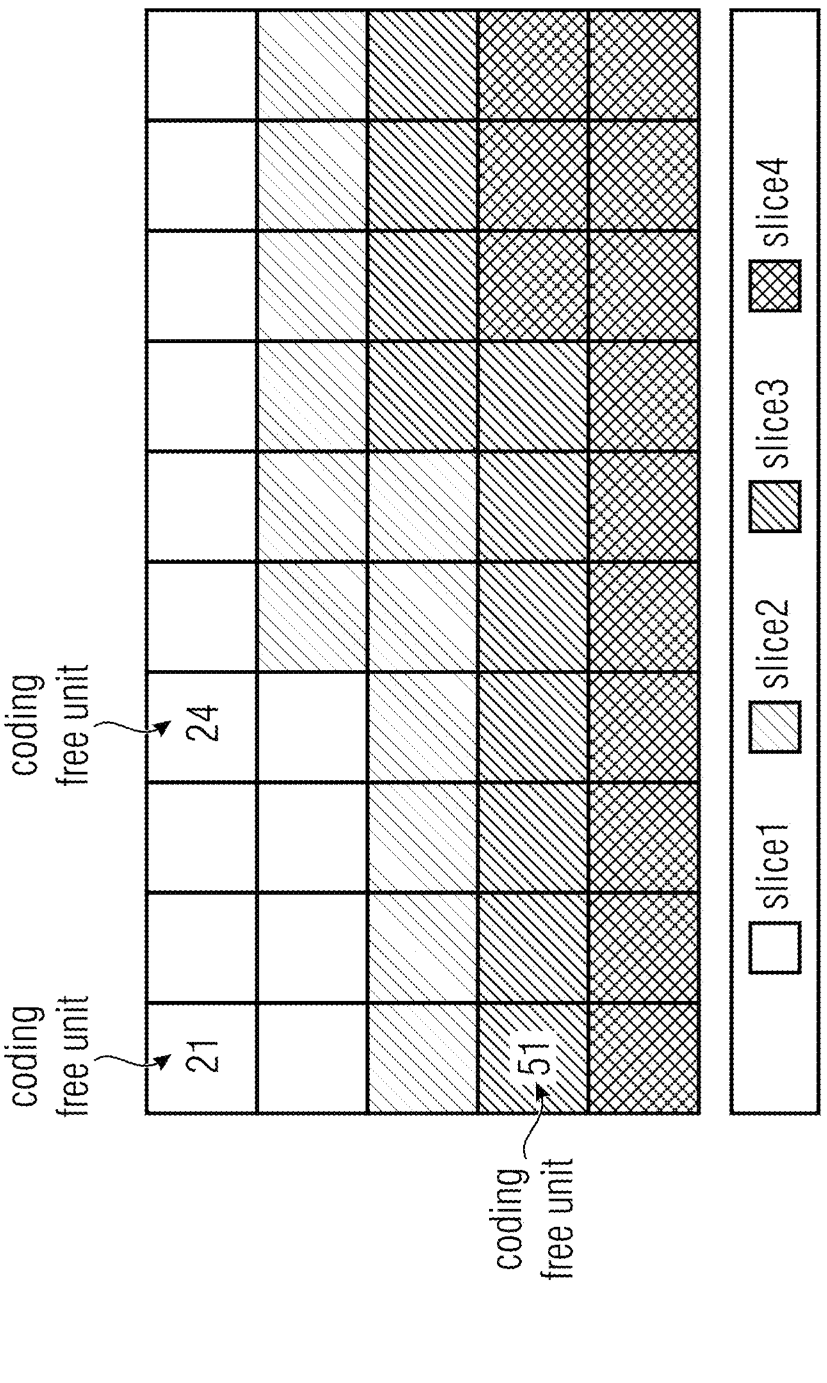
FIG. 2 illustrates picture segmentation with slices in raster scan order.

FIG. 1*c* illustrates a system according to an embodiment. The system comprises a video encoder 101 according to FIG. 1*a*. Moreover, the system comprises a video decoder 151 according to FIG. 1*b*.

The video encoder 101 of FIG. 1*a* is configured to generate the encoded video signal, and The video decoder 151 of FIG. 1*b* is configured to decode the encoded video signal to reconstruct the picture of the video.

In the following section "versatile picture partitioning with coding areas", versatile picture partitioning with coding areas is described.

In the following subsection "coding areas", coding areas are described.

Beyond the current state-of-the art partitioning schemes, such as tiles, embodiments provide a more flexible spatial region definition concept, which may, e.g., be referred to as Coding Area (CA). This is an advantageous concept for the spatial subdivision of pictures into rectangular regions. With Coding Areas, the partitioning is more flexible and individual regions are allowed to have their own, area specific, coding characteristics.

The Coding Area is defined by the dimensions and location (width, height, position) of a particular region as well as how the data of the region is to be processed. Signalling can be implemented either in in terms of low-level coding process specification or in terms of high-level parameters such as scan order, scan direction, scan start, etc.

Figure 6:
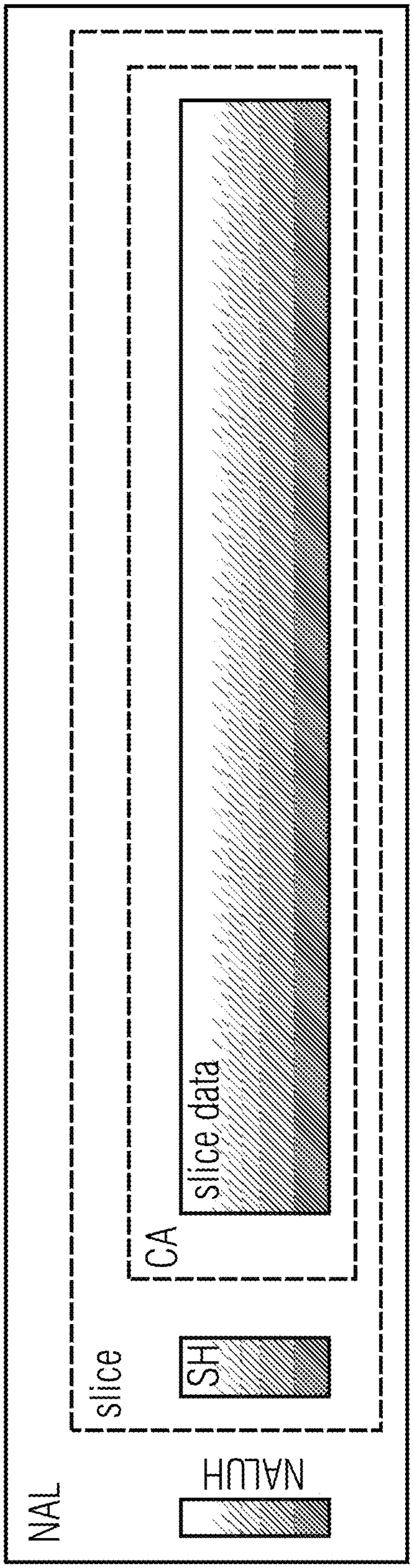
FIG. 6 illustrates a bitstream comprising single picture with one implicit coding area according to an embodiment.

FIG. 6 illustrates a bitstream comprising single picture with one implicit coding area according to an embodiment. (NAL=Network Abstraction Layer; NALUH=Network Abstraction Layer Unit Header; SH=Slice Header)

Figure 7:
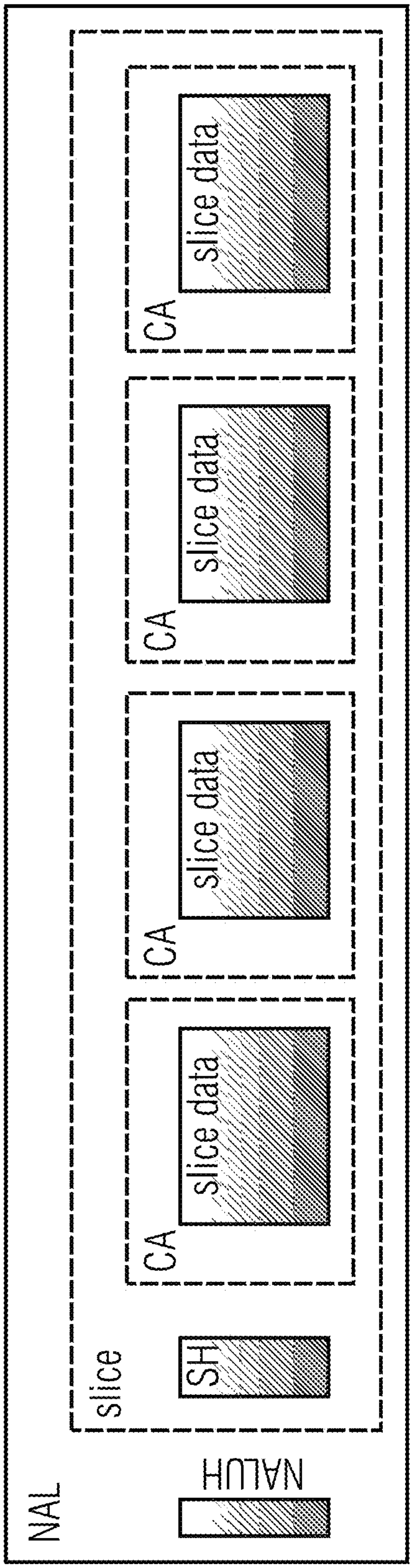
FIG. 7 illustrates a bitstream comprising single picture with four coding areas according to another embodiment.

FIG. 7 illustrates a bitstream comprising single picture with four coding areas according to another embodiment.

If no partitioning is applied, then the picture comprising one Coding Area (CA) implicitly, see FIG. 6. This can be a default Coding Area with pre-defined functionality. FIG. 7 illustrates a sub-divisioning of a picture into multiple CAs.

In an embodiment, the data encoder 110 of FIG. 1*a* may, e.g., be configured to partition the picture into the plurality of coding areas.

Figure 8:
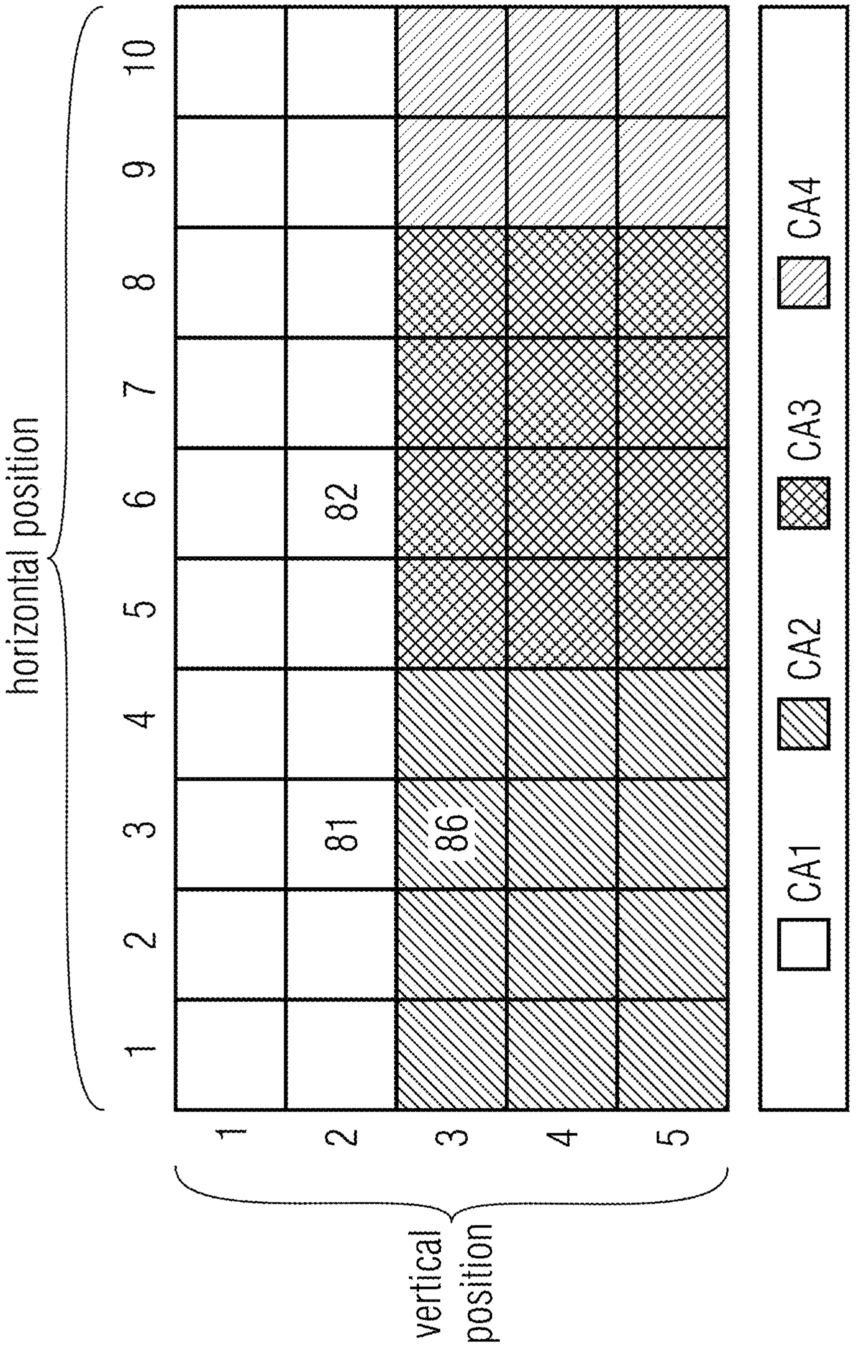
FIG. 8 illustrates spatial subdivision of picture with single CA at the top and three CAs at the bottom according to an embodiment.
Figure 9:
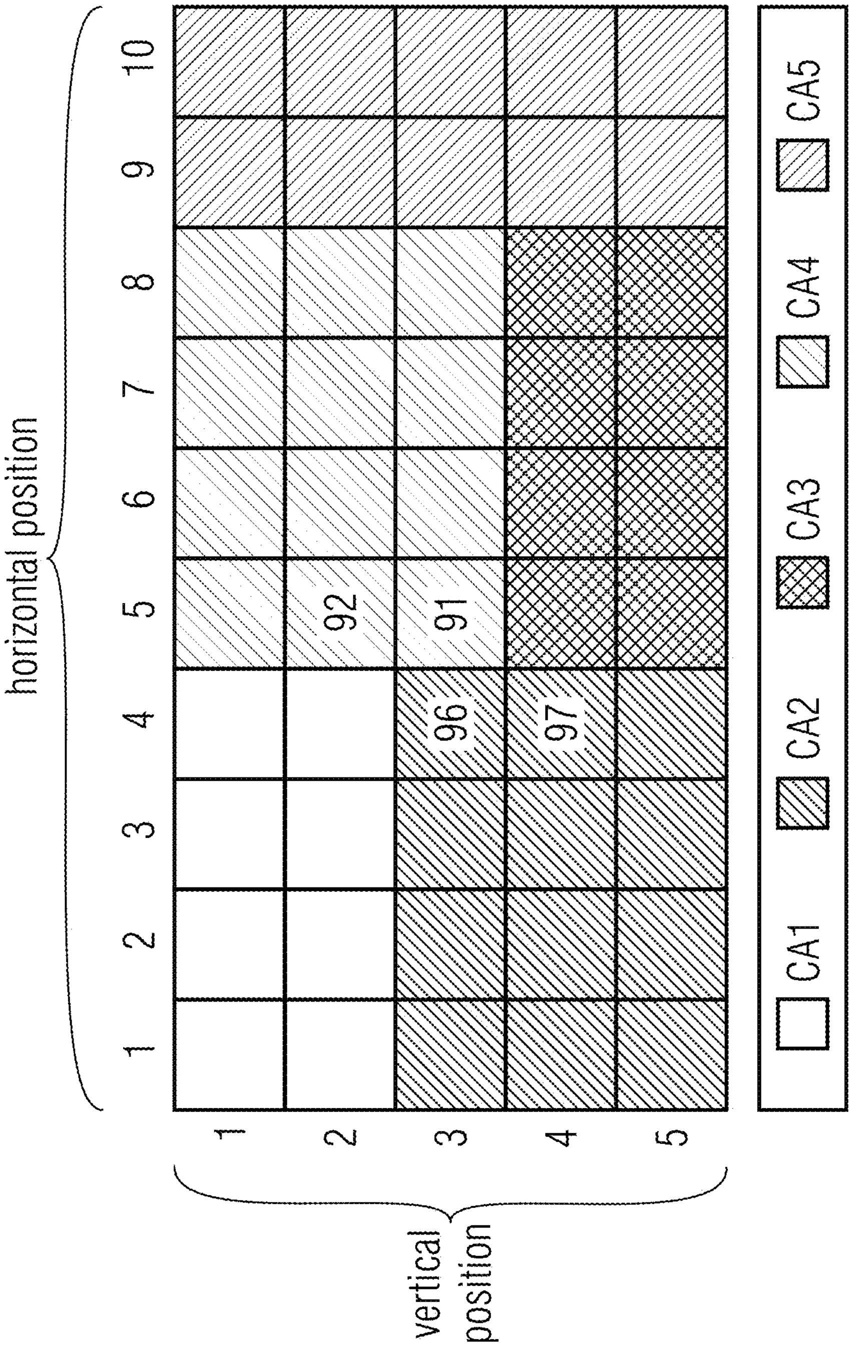
FIG. 9 illustrates spatial subdivision of picture with five coding areas according to another embodiment.

FIG. 8 illustrates spatial subdivision of picture with single coding area (CA) at the top and three CAs at the bottom according to an embodiment. Each square in FIG. 8 and FIG. 9 represents a coding tree unit (CTU). Although FIG. 8 and FIG. 9 illustrates CTUs that have the shape of a square, a CTU may, e.g., in other examples, have a rectangular shape or any other shape.

As can be seen in FIG. 8 and FIG. 9, each of the coding areas in FIG. 8 and FIG. 9 extend rectangularly within the picture. Moreover, in FIG. 8 and FIG. 9, each CTU extend rectangularly within the picture.

Thus, according to an embodiment, each coding area of the plurality of coding areas may, e.g., extend rectangularly within the picture. Each coding tree unit of the one or more coding tree units of each of the plurality of coding areas may, e.g., extend rectangularly within the picture.

FIG. 9 illustrates spatial subdivision of picture with five coding areas according to another embodiment.

One important advantage of CA partitioning is demonstrated in the following. In FIG. 8 and in FIG. 9, two examples of the new partitioning concept are provided.

Figure 3:
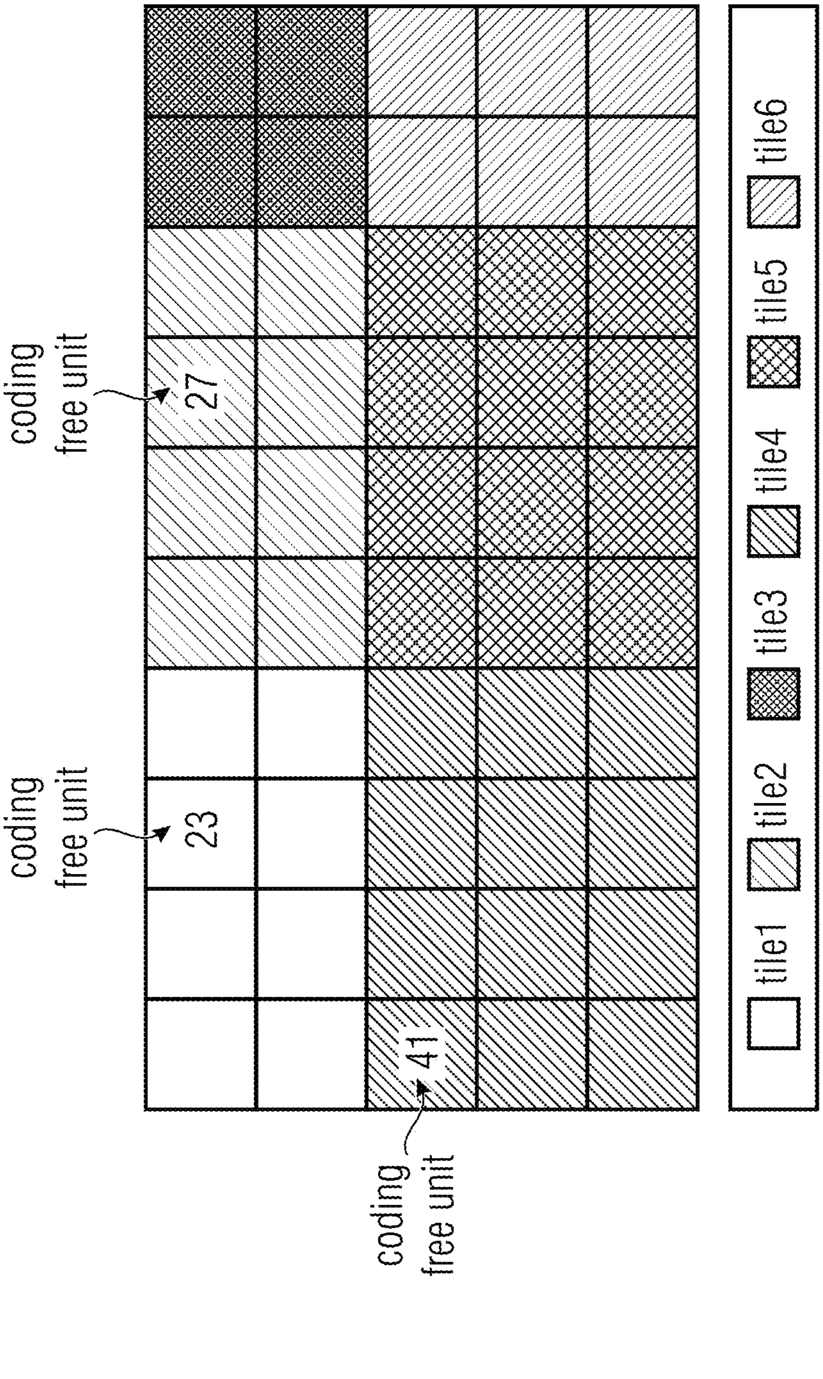
FIG. 3 illustrates picture partitioning with tiles.

For some use cases, it is possible to achieve partitioning with CAs that are impossible with Tiles, and where CA partitioning results in less partitions. As it can be seen from the Tile-based partitioning in FIG. 3, creating three separate regions at the bottom of the picture (Tile4, Tile5, Tile6), involves to encode three additional regions on top of the picture (Tile1, Tile2, Tile3). Using Coding Areas, the region on top can be encoded as one Coding Area CA1, as seen in FIG. 8. The partition shown in FIG. 9 can also not be achieved through tiles, as CA1, CA2 and CA3 do not have the same height.

According to an embodiment, each of the plurality of coding tree units may, e.g., have a horizontal position within the picture and a vertical position within the picture. FIG. 8 and FIG. 9 illustrate horizontal positions of the CTUs from 1-10 and the vertical positions of the CTUs from 1-5. It is, of course, not necessary in such an embodiment that the positions start with 1 and that the step from one horizontal or vertical position to the next is 1. Instead, other start positions and other steps from CTU to CTU are also possible. The step size from one CTU to the next for the vertical positions may be different from the step size from one CTU to the next for the horizontal positions.

The new partitioning of FIG. 9 may, e.g., characterized as follows.

In such an embodiment (alternative 1:) a first coding area of the plurality of coding areas may, e.g., comprise a first coding tree unit having a first vertical position being identical to a second vertical position of a different second coding tree unit of a different second coding area of the plurality of coding areas, and a third coding tree unit of the first coding area has a third vertical position being different from the vertical position of any other coding tree unit of the second coding area, and a fourth coding tree unit of the second coding area has a fourth vertical position being different from the vertical position of any other coding tree unit of the first coding area.

Or (alternative 2:), the first coding area of the plurality of coding areas may, e.g., comprise the first coding tree unit having a first horizontal position being identical to a second horizontal position of the different second coding tree unit of the different second coding area of the plurality of coding areas, and the third coding tree unit of the first coding area has a third horizontal position being different from the horizontal position of any other coding tree unit of the second coding area, and the fourth coding tree unit of the second coding area has a fourth horizontal position being different from the horizontal position of any other coding tree unit of the first coding area.

FIG. 9 fulfills alternative 1: CA2 comprises CTU 91. CTU 91 has a vertical position 3. CTU 96 of CA4 also has the vertical position 3. CTU 92 of CA2 has a vertical position 2. None of the CTUs of CA4 has the vertical position 2 (as the vertical positions of CA4 are in the range from 3-5). Moreover, CTU 97 of CA4 has a vertical position 4. None of the CTUs of CA2 has the vertical position 4 (as the vertical positions of CA2 are in the range from 1-3).

In contrast, FIG. 8 does not fulfill alternative 1 and does not fulfil alternative 2:

Alternative 1:

Only CA2, CA3 and CA4 have same vertical positions (in the range from 3-5). CA1 does not have same vertical positions with any other coding area. However, CA2 does not have a vertical position that is different from any other vertical position in the coding areas CA3 or CA4. The same is true for CA3 and CA4, respectively, with respect to CA2, CA4 and CA2, CA3, respectively.

Alternative 2:

CA2, CA3 and CA4 have no CTUs with same horizontal positions.

In contrast, CTU 81 of CA1 has a same horizontal position (3) as CTU 86 of CA2. Moreover, none of the CTUs of CA2 has a horizontal position 6 of CTU 82 of CA1, as the horizontal positions of CA2 are in the range from 1-4. However, there is no CTU in CA2 that differs from the horizontal position of any other CTU of CA1, as the horizontal positions of the CTUs of CA2 are in the range from 1-4, and as the horizontal positions of the CTUs of CA1 are in the range from 1-10.

The same is true from CA3 and CA4 with respect to CA1 for analogous reasons.

Therefore, the partitioning of FIG. 8 does not fulfill alternative 1 and does not fulfill alternative 2.

A signaling mechanism for a number of CA parameters related to fragmentation and scan order is presented in sub-subsection “general properties of coding areas”.

Spatially, the Coding Area is covering a particular number of CTUs. The flexible arrangement of the CAs is one of the features of some of the embodiments. We suggest several variants for this: explicit signaling, as well as a hierarchical method, both used outside of VCL. Also, if no bitstream fragmentation is employed, the signaling within the VCL can be used. The detailed description for CA arrangement is provided in sub-subsection “size and arrangement of coding areas”.

Besides the arrangement of segments, embodiments provide a new flexible processing or scan order of CTUs within the Coding Area. The details of this technique are presented in sub-subsection “CTU scan order”.

One of the other invented features is that, within a single picture, one CA can be independent and/or dependent from other Coding Areas in some respect as explained in the sub-subsection “dependent coding areas”.

Using a combination of the new proposed methods leads to new opportunities in the high-level parallelism. The parallel processing of the spatial picture regions can be done in a more efficient way as detailed in sub-subsection “parallel processing of coding areas”.

Aspects of error resilience are described in sub-subsection “error resiliency aspects”.

Summarizing the concepts above:

According to an embodiment, each coding area of the plurality of coding areas may, e.g., exhibit a spatial characteristic comprising a position, a width and a height of said coding area, wherein the width and the height of said coding area depend on the rectangular extension of said coding area, and wherein the position of said coding area depends on the location of said coding area within the picture.

In an embodiment, a first height of a first one of the plurality of coding areas may, e.g., be different from a second height of a second one of the plurality of coding areas. Or, a first width of the first one of the plurality of coding areas is different from a second width of the second one of the plurality of coding areas.

According to an embodiment, the data encoder 110 may, e.g., be configured to generate the indication data such that the information on the plurality of coding areas comprises information on the spatial characteristic of each coding area of the plurality of coding areas.

In an embodiment, the data encoder 110 may, e.g., be configured to generate the indication data such that the information on the plurality of coding areas comprises the position, the width and the height of each coding area of the plurality of coding areas.

According to an embodiment, the data encoder 110 may, e.g., be configured to encode image data of a picture portion of each of the plurality of coding areas independently from encoding the image data of the picture portion of any other coding area of the plurality of coding areas to obtain the encoded picture data.

In an embodiment, the data encoder 110 may, e.g., be configured to encode the picture by encoding image data of a picture portion within each coding area of the plurality of coding areas to obtain the encoded picture data. The data encoder 110 may, e.g., be configured to encode the image data of the picture portion of at least one of the plurality of coding areas such that encoding the image data of said at least one of the plurality of coding areas depends on the encoding of the image data of at least another one of the plurality of coding areas.

In an embodiment, the data encoder 110 may, e.g., be configured to determine the coding order for each one of the one or more coding areas which comprise two or more coding tree units.

According to an embodiment, the data encoder 110 may, e.g., be configured to determine the coding order for each one of the one or more coding areas by selecting a scan order from two or more scan orders for each one of the one or more coding areas.

In an embodiment, the signal generator 120 may, e.g., be configured to generate the encoded video signal, such that the encoded video signal comprises a bitstream, wherein the bitstream comprises the encoded picture data and the indication data.

Likewise, according to an embodiment, each coding area of the plurality of coding areas may, e.g., exhibit a spatial characteristic comprising a position, a width and a height of said coding area, wherein the width and the height of said coding area depend on the rectangular extension of said coding area, and wherein the position of said coding area depends on the location of said coding area within the picture. The data decoder 170 may, e.g., be configured to decode the encoded picture data depending on the spatial characteristic of the plurality of coding areas.

In an embodiment, a first height of a first one of the plurality of coding areas may, e.g., be different from a second height of a second one of the plurality of coding areas. Or a first width of the first one of the plurality of coding areas is different from a second width of the second one of the plurality of coding areas.

According to an embodiment, the data decoder 170 may, e.g., be configured to decode the encoded picture data using information within the indication data on the spatial characteristic of the plurality of coding areas.

In an embodiment, the data decoder 170 may, e.g., be configured to decode the encoded picture data using information within the indication data on the plurality of coding areas, which comprises the position, the width and the height of each coding area of the plurality of coding areas.

According to an embodiment, the data decoder 170 may, e.g., be configured to decode the encoded picture data of each of the plurality of coding areas independently from decoding the encoded picture data of any other coding area of the plurality of coding areas.

In an embodiment, the data decoder 170 may, e.g., be configured to decode the encoded picture data of at least one of the plurality of coding areas such that decoding the encoded picture data of said at least one of the plurality of coding areas depends on the decoding of the encoded picture data of at least another one of the plurality of coding areas.

According to an embodiment, the data decoder 170 may, e.g., be configured to decode the encoded picture data using a coding order for each one of the one or more coding areas which comprise two or more coding tree units, said coding order for each one of the one or more coding areas being indicated by the indication data.

In an embodiment, the data decoder 170 may, e.g., be configured to decode the encoded picture data using an indication on a scan order from two or more scan orders for each one of the one or more coding areas, wherein the indication data may, e.g., comprise the indication on the scan order for each one of the one or more coding areas.

According to an embodiment, the interface 160 may, e.g., be configured to receive a bitstream, wherein the bitstream comprises the encoded picture data and the indication data.

In the following sub-subsection "general properties of coding areas", general properties of coding areas are described.

The general information about the Coding Areas is concentrated into so called Coding Areas Set (CAS). The CAS can be settled outside of VCL in the high-level parameter sets and then it has impact on the whole sequence or apart of the sequence, e.g. a picture.

x=video, sequence, picture . . .

| | Descriptor |
|---|---|
| x_parameter_set_rbsp( ) { | |
| [ ... ] | |
| xps_coding_areas_enabled_flag | u(1) |
| if ( xps_coding_areas_enabled_flag ) | |
| coding_areas_set( ) | |
| [ ... ] | |
| } | |

TABLE 2-1

| | Descriptor |
|---|---|
| coding_areas_set( ) { | |
| coding_area_explicit_positioning_flag | u(1) |
| num_coding_areas_minus1 | ue(v) |
| coding_areas_arangement( ) | |
| dependent_coding_areas_enabled_flag | u(1) |
| if( dependent_coding_areas_enabled_flag ) { | |
| coding_areas_CTU_wise_dependent_flag | u(1) |
| } | |
| coding_area_no_slices_flag | u(1) |
| coding_area_CTU_scan_flag | u(1) |
| if( coding_area_CTU_scan_flag ) { | |

TABLE 2-1-continued

| | Descriptor |
|---|---|
| coding_area_CTU_scan_type_idx | ue(v) |
| for( i = 0; i <= num_coding_ares_minus1; i++ ) { | |
| if( coding_area_width_in_units*( coding_area_scaling_factor_minus1+1)>1 ) { | |
| coding_area_CTU_scan_start_left_flag[i] | u(1) |
| } | |
| if( coding_area_height_in_units*( coding_area_scaling_factor_minus1+1)>1 ) { | |
| coding_area_CTU_scan_start_top_flag[i] | u(1) |
| } | |
| if( ( coding_area_width_in_units*( coding_area_scaling_factor_minus1+1)>1 ) | |
| && | |
| ( coding_area_height_in_units*( coding_area_scaling_factor_minus1+1)>1 ) ) { | |
| coding_area_CTU_scan_direction_flag[i] | u(1) |
| } | |
| } | |
| } | |
| } | |

coding_area_explicit_positioning_flag if true coding_area_top_left_CTU_address is present in the bitstream, otherwise default implicit CA positioning is used num_coding_areas_minus1 number of coding areas signaled in the bitstream dependent_coding_areas_enabled_flag if true indicating the CA following in the bitstream depend on each other in the order of appearance in the bitstream, otherwise the CAs are treated as independent regions.

coding_areas_CTU_wise_dependent_flag if true indicating dependencies of CTUs between adjacent CAs are treated in a CTU-wise processing interleaving CA-processing, otherwise the CA are processed individually in a fixed order.

coding_area_no_slices_flag if true indicating one slice per CA. This implies that EOS_flag and CTU_start_address is not present in the bitstream. The CAs are addressed by CA_idx instead which is a fix length code derived from ceil(log 2 (num_coding_areas_minus1+1)). Otherwise, default slice syntax is present in the bitstream.

coding_area_CTU_scan_flag indicating if true, that CTU scan parameter are present in the bitstream. The flexible CTU scan technique is described in the sub-subsection “CTU scan order”.

coding_area_CTU_scan_type_idx maps into a scan type table (raster scan, diagonal scan).

coding_area_CTU_scan_start_left_flag[i] present if the i-th CA comprises more than one CTU per CTU-line, indicating if true to start the CTU scan at the leftmost CTU within the CA. Otherwise the CTU scan of the the i-th CA is started with the rightmost CTU.

coding_area_CTU_scan_start_top_flag[i] present if the i-th CA comprises more than one CTU per CTU-column, indicating if true to start the CTU scan in the top CTU row within the CA. Otherswise the CTU scan of the the i-th CA begins in the CTU bottom line of the CA.

coding_area_CTU_scan_direction_flag[i] present if the i-th CA contains at least two CTU rows and two CTU columns, indicating the start scan direction of the CTU-scan. If true than the scan direction of the i-th CA starts in horizontal direction, otherwise the scan is a vertical scan.

Summarizing the above concepts:

In an embodiment, the data encoder 110 may, e.g., be configured to generate the indication data such that the indication data may, e.g., comprise information for each coding area on whether an address of a top left coding tree unit is specified. A particular example, may, e.g., be the coding_area_explicit_positioning_flag. If true, the coding_area_top_left_CTU_address is present in the bitstream, otherwise default implicit CA positioning is used.

According to an embodiment, the data encoder 110 may, e.g., be configured to generate the indication data such that the indication data may, e.g., comprise information on a number of the plurality of coding areas or the number of the plurality of coding areas minus 1 or the number of the plurality of coding areas minus 2. A particular example, may, e.g., be the num_coding_areas_minus1 field described above.

In an embodiment, the data encoder 110 may, e.g., be configured to generate the indication data such that the indication data indicates for one of the plurality of coding areas which succeeds another one of the plurality of coding areas whether said one of the plurality of coding areas depends on said another one of the plurality of coding areas. A particular example may, e.g., be the dependent_coding_areas_enabled_flag, which, if true, may, e.g., indicate that the CAs following in the bitstream depend on each other in the order of appearance in the bitstream, otherwise the CAs are treated as independent regions.

According to an embodiment, the data encoder 110 may, e.g., be configured to generate the indication data such that the indication data indicates whether exactly one slice of a plurality of slices is assigned to exactly one coding area of the plurality of coding areas. A particular example may, e.g., be the coding_area_no_slices_flag described above.

In an embodiment, the data encoder 110 may, e.g., be configured to generate the indication data such that the indication data indicates whether the indication data may, e.g., comprise information on how to scan within each of the one or more coding tree units of the plurality of coding areas. A particular example may, e.g., be the coding_area_CTU_scan_flag described above.

According to an embodiment, the data encoder 110 may, e.g., be configured to generate the indication data such that the indication data indicates how to scan within each of the one or more coding tree units of the plurality of coding areas. A particular example, may, e.g., be coding_area_CTU_scan_type_idx which maps into a scan type table. Scan types may, e.g., be raster scan and/or, e.g., diagonal scan, etc.

In an embodiment, the data encoder 110 may, e.g., be configured to generate the indication data such that the indication data indicates for each of the plurality of coding areas whether the coding area comprises more than one coding tree unit.

According to an embodiment, the data encoder 110 may, e.g., be configured to generate the indication data such that the indication data indicates for one of the plurality of coding areas whether a coding tree unit scan is started with a leftmost coding tree unit or whether the coding tree unit scan is started with a rightmost coding tree unit. A particular example may, e.g., be the coding_area_CTU_scan_start_left_flag[i] described above.

In an embodiment, the data encoder 110 may, e.g., be configured to generate the indication data such that the indication data indicates for one of the plurality of coding areas whether a coding tree unit scan is started with a top coding tree unit row of the coding area or whether the coding tree unit scan is started with a bottom coding tree unit row of the coding area. A particular example may, e.g., be the coding_area_CTU_scan_start_top_flag[i] described above.

In an embodiment, the data encoder 110 may, e.g., be configured to generate the indication data such that the indication data indicates for one of the plurality of coding areas whether a coding tree unit scan is started in a horizontal direction or whether a coding tree unit scan is started in a vertical direction. A particular example, may, e.g., be the coding_area_CTU_scan_direction_flag[i], which may, e.g., be present if the i-th CA conatins at least two CTU rows and two CTU columns, indicating the start scan direction of the CTU-scan. If true than the scan direction of the the i-th CA may, e.g., start in horizontal direction, otherwise the scan may, e.g., be a vertical scan.

Likewise, according to an embodiment, the data decoder 170 may, e.g., be configured to decode the encoded picture data using information for each coding area on whether an address of a top left coding tree unit is specified, wherein the indication data may, e.g., comprise said information.

In an embodiment, the data decoder 170 may, e.g., be configured to decode the encoded picture data using information on a number of the plurality of coding areas or the number of the plurality of coding areas minus 1 or the number of the plurality of coding areas minus 2, wherein the indication data may, e.g., comprise said information.

According to an embodiment, the data decoder 170 may, e.g., be configured to decode the encoded picture data using information which indicates for one of the plurality of coding areas which succeeds another one of the plurality of coding areas whether said one of the plurality of coding areas depends on said another one of the plurality of coding areas, wherein the indication data may, e.g., comprise said information.

In an embodiment, the data decoder 170 may, e.g., be configured to decode the encoded picture data using information which indicates whether exactly one slice of a plurality of slices is assigned to exactly one coding area of the plurality of coding areas, wherein the indication data may, e.g., comprise said information.

According to an embodiment, the data decoder 170 may, e.g., be configured to decode the encoded picture data using information on whether the indication data may, e.g., comprise information on how to scan within each of the one or more coding tree units of the plurality of coding areas, wherein the indication data may, e.g., comprise said information.

In an embodiment, the data decoder 170 may, e.g., be configured to decode the encoded picture data using information on how to scan within each of the one or more coding tree units of the plurality of coding areas, wherein the indication data may, e.g., comprise said information.

According to an embodiment, the data decoder 170 may, e.g., be configured to decode the encoded picture data using information that indicates for each of the plurality of coding areas whether the coding area comprises more than one coding tree unit, wherein the indication data may, e.g., comprise said information.

In an embodiment, the data decoder 170 may, e.g., be configured to decode the encoded picture data using information which indicates for one of the plurality of coding areas whether a coding tree unit scan is started with a leftmost coding tree unit or whether the coding tree unit scan is started with a rightmost coding tree unit, wherein the indication data may, e.g., comprise said information.

According to an embodiment, the data decoder 170 may, e.g., be configured to decode the encoded picture data using information which indicates for one of the plurality of coding areas whether a coding tree unit scan is started with a top coding tree unit row of the coding area or whether the coding tree unit scan is started with a bottom coding tree unit row of the coding area, wherein the indication data may, e.g., comprise said information.

According to an embodiment, the data decoder 170 may, e.g., be configured to decode the encoded picture data using information which indicates for one of the plurality of coding areas whether a coding tree unit scan is started in a horizontal direction or whether a coding tree unit scan is started in a vertical direction, wherein the indication data may, e.g., comprise said information.

In the following sub-subsection "size and arrangement of coding areas", a size and an arrangement of coding areas are described.

It is crucial to signal how coding areas are arranged within the picture. Depending on the application, different targets are pursued that might affect the desired flexibility on the picture partitioning, e.g., CAs size and position. The layout can also be transmitted in the High-Level section of the bitstream in order to use a temporally fixed CA-layout or adapt the layout according to the content overtime.

Figure 4:
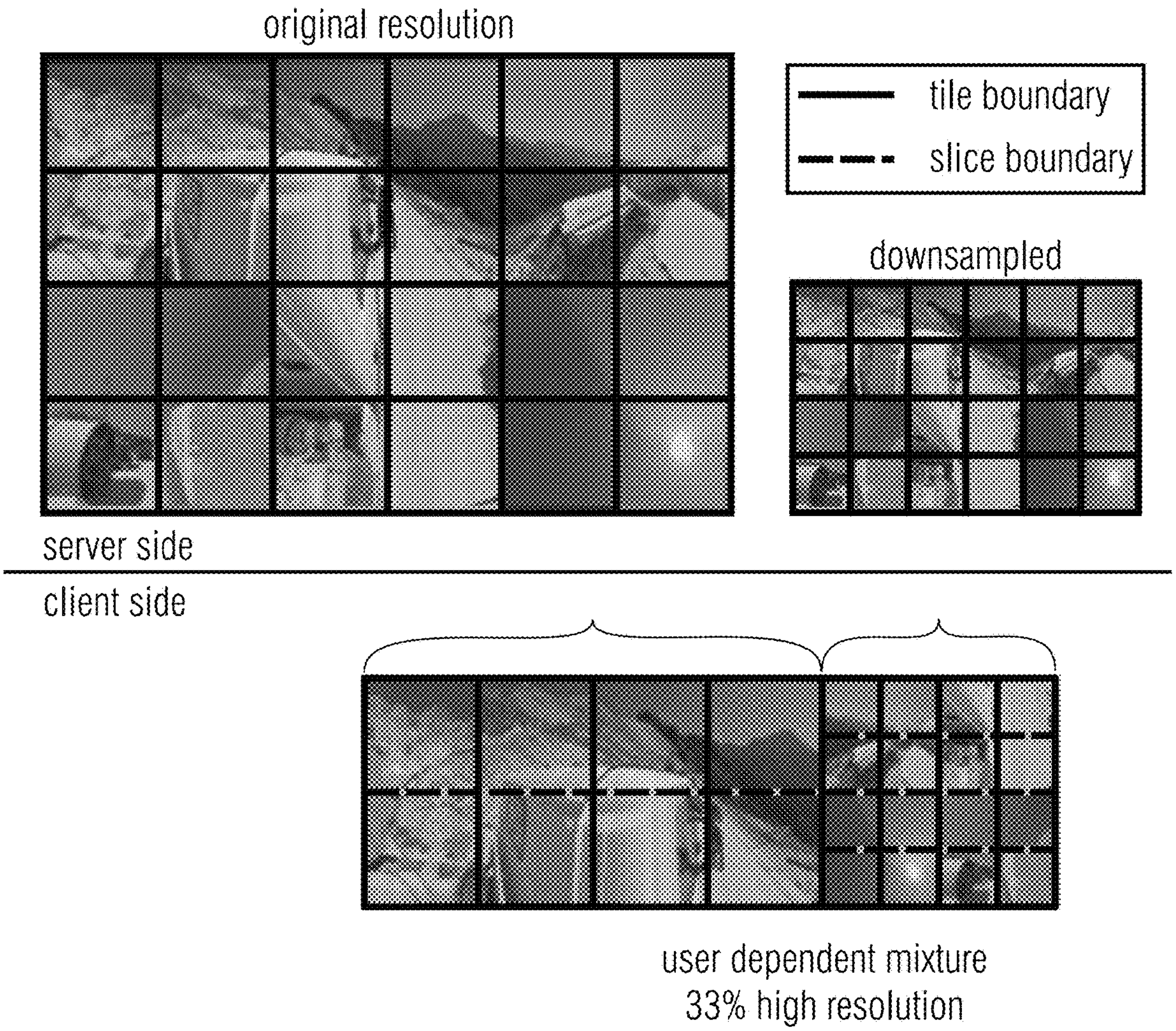
FIG. 4 illustrates tile-based 360° video streaming with unequal resolution.
Figure 5:
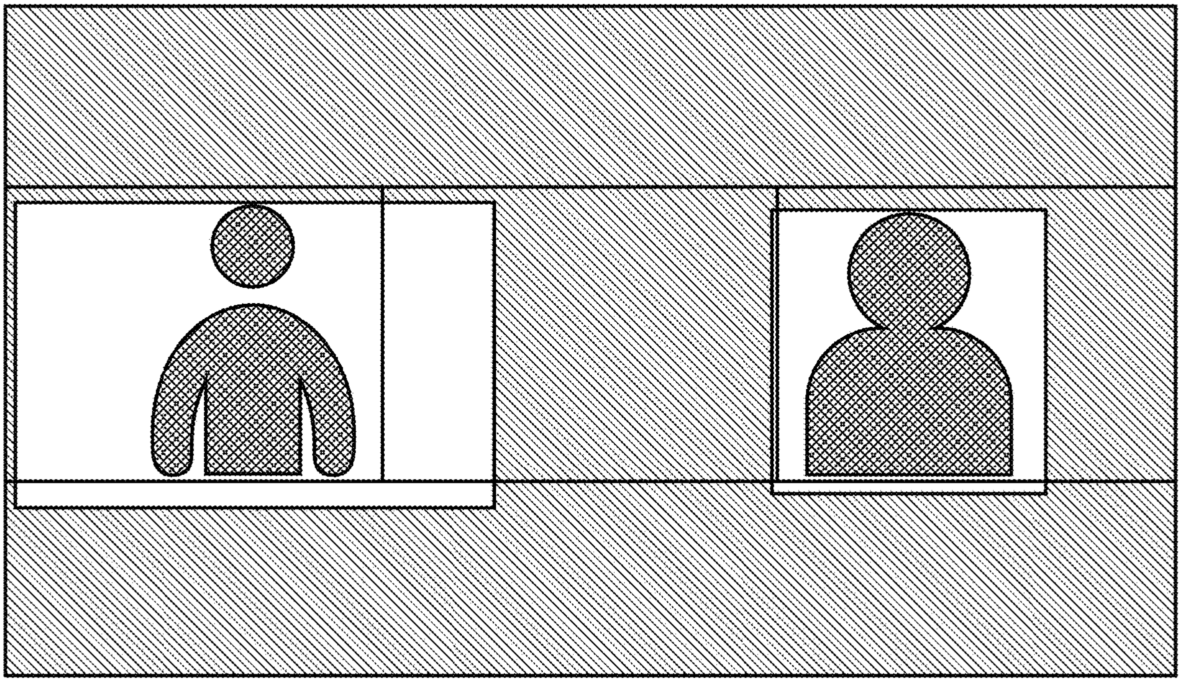
FIG. 5 illustrates flexible coding area partitioning.

For instance, in the example provided in subsection "picture partitioning with tiles" for 360° video streaming the CAs are typically constant for the whole CVS (coding video sequence) and their size only needs to accommodate partitions that are generated from different resolutions of the same content, e.g., as illustrated in FIG. 4. For such a case, the most proper place for CA arrangement signaling is at a high-level syntax structure (see for instance VPS, SPS, PPS for HEVC) as described in sub-sub-subsection "embodiment A" and sub-sub-subsection "embodiment B", later on.

However, in other examples as in subsection "picture partitioning with tiles" for load balancing (e.g., videoconferencing scenario), dynamic per picture partitioning might be desirable. In addition, the initial configuration selected for the CAs might be found not optimal and therefore in-picture modification (while encoding) of the partitioning might be needed. For such a case, where the CA arrangement is not known a priori, in-VCL (Video Coding Layer, within the slice payload) signaling is advantageous over high-level signaling (within the parameter sets) as described in sub-sub-subsection "embodiment C".

In the following sub-sub-subsection "embodiment A", sample- or unit-wise position and size signaling is described.

Explicit CA positioning using CTU start address to select the according area:

TABLE 2-2

|  | Descriptor |
|---|---|
| coding_areas_arrangement( ) { | |
|   num_coding_areas_minus1 | ue(v) |
|   for( i = 0; i <= num_coding_ares_minus1; i++ ){ | |
|     coding_area_start_address[i] | u(v) |
|     coding_area_width_in_luma_samples[i] | u(v) |
|     coding_area_height_in_luma_samples[i] | u(v) |
|   } | |
| } | |

Figure 10:
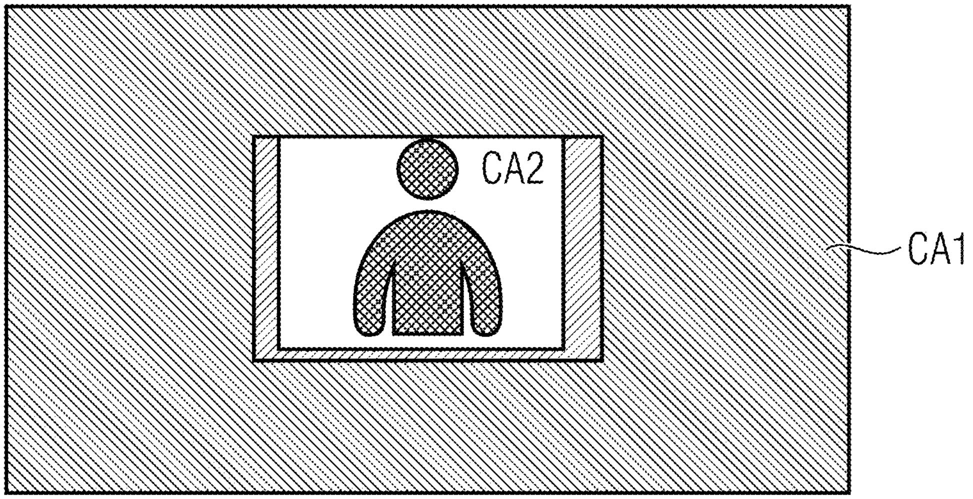
FIG. 10 illustrates two coding areas of which the one comprising the picture boundary CTUs consists of non-contiguous CTUs according to an embodiment.

FIG. 10 illustrates two coding areas of which the one comprising the picture boundary CTUs consists of non-contiguous CTUs according to an embodiment.

In principle the syntax above, num_coding_areas_minus2, could define all CAs but one and have the last CA as the remaining part not covered by previous CAs. However, this would allow for CAs not having contiguous CTUs as shown in FIG. 10, which might add some complexity to the encoding/decoding process.

Therefore, a constraint should be added to prohibit such a case and need the syntax to fulfil some constraints: for instance, given four CTUs ($CTU_a$, $CTU_b$, $CTU_c$, $CTU_d$) corresponding to the CTU at the top-left, top-right, bottom-left and bottom-right of a CA with $CTU_b\_addr-CTU_a\_addr=CAWidthInNumCTUs\_minus1$ and $CTU_c\_addr-CTU_a\_addr=CAHeightInNumCTUs\_minus1$ all CTU and only those that have the following CTU_address shall belong to the remaining CA $CTU_x\_addr=CTU_a\_addr+j+k*(CAWidthInNumCTUs\_minus1+1)$ with j=0 . . . CAWidthInNumCTUs_minus1 and k=0 . . . CAHeightInNumCTUs_minus1.

Alternatively, a syntax element could be added that (e.g. "non_contiguous_remaining_coding_unit_enabled_flag") that could indicate/constraint the CAs to fulfill such a condition. Thus, some profiles could mandate that flag not to be enabled to prevent complexity added by non-contiguous CAs.

According to an embodiment, the data encoder 110 may, e.g., be configured to generate the indication data such that the indication data comprises non-contiguous information which indicates whether at least one of the plurality of coding areas encloses another one of the plurality of coding areas, or whether none of the plurality of coding areas encloses another one of the coding areas. FIG. 10 is a particular example, where two coding areas CA1, CA2 are illustrated. The outer coding area CA1 encloses the inner coding area CA2.

In FIG. 10, CA1 encloses CA2. The non_contiguous_remainingcodingunit_enabled_flag may be used to provide a respective indication.

Likewise, in an embodiment, the data decoder 170 may, e.g., be configured to decode the encoded picture data using non-contiguous information which indicates whether at least one of the plurality of coding areas encloses another one of the plurality of coding areas, or whether none of the plurality of coding areas encloses another one of the coding areas, wherein the indication data comprises said information.

The syntax in the table above allows for flexible signaling with CAs that are not multiple of the maximum coding unit (e.g. 128×128), which is beneficial for some applications. However, signaling CAs using sample units might lead to a lot of bits being used. Alternatively, the signaling could be done in CTUs to save bits. The problem, is that sizes not multiple of CTUs cannot be signaled. In the proposed syntax below, with some additional information, this problem could be solved.

TABLE 2-3

|  | Descriptor |
|---|---|
| coding_areas_arangement( ) { | |
|   coding_areas_sizes_multiple_of_ctu_flag | u(1) |
|   for( i = 0; i <= num_coding_ares_minus1; i++ ){ | |
|     coding_area_start_address[i] | u(v) |
|     coding_area_width_in_ctu[i] | u(v) |
|     coding_area_height_in_ctu[i] | u(v) |
|     if ( !coding_areas_sizes_multiple_of_ctu_flag ) { | |
|       log2_last_ctu_width[i] | ue(v) |
|       log2_last_ctu_height[i] | ue(v) |
|     } | |
|   } | |
| } | |

The proposed signaling indicates whether the last CTU row and column of a CA comprise a CTU of the indicated max. size or the last CTU is smaller. In the case it is smaller, the size of the last CTU row and column of a CA is indicated.

However, in the case that a CA has not a size that is a multiple of max. CTU size (i.e. the last CTU in a row or column is smaller), it could lead to a picture that has a different number of CTUs per row or column, as CAs might have some CTUs that are smaller than other CAs. Such a misalignment might be undesirable since storage of variables that are used for prediction within a picture are usually addressed with the CTU address and a varying number of CTUs per row or column can make the CTU addressing not viable or too complex. Therefore, a constraint should be added that whenever a CA ends before a full CTU (or a CTU of size max. CTU), other neighboring CAs should be aligned within the dimension (horizontal or/and vertical) which does not comprise a full CTU.

Implicit positioning recursively starting at the leftmost position in the uppermost CTU-row that has not been covered by a Coding Area. In other words, for example, if coding_area_explicit_positioning_flag, as shown in Table 2-4, is set to 0, then the start address of the CA is not indicated but only the width and height and a decoder would have to derive the start address of the i-th CA by looking for the smallest CTU address that is not yet covered by the 1 . . . (i−1)-th CAs.

In an embodiment, the data encoder 110 may, e.g., be configured to generate the indication data such that the indication data indicates for a coding area whether a start address indicating one of the one or more coding tree units of said coding area is indicated, or whether the start address indicating said one of the one or more coding tree units of said coding area is not indicated. A particular example, may, e.g., be the coding_area_CTU_start_address described above.

Likewise, according to an embodiment, the data decoder 170 may, e.g., be configured to decode the encoded picture data using an indication for a coding area whether a start address indicating one of the one or more coding tree units of said coding area is indicated, or whether the start address indicating said one of the one or more coding tree units of said coding area is not indicated. If the start address indicating said one of the one or more coding tree units of said coding area is not indicated, the data decoder 170 may, e.g., be configured to determine the start address indicating said one of the one or more coding tree units of said coding area depending on a coding area width and depending on a coding height of said coding area and depending on a coding area scan direction of said coding area.

The syntax in both tables above comprises coding_area_start_address[i], which in principle simplifies the operation of the parser but is to some extent "redundant" information that could be simply derived from the signaled sizes. Therefore, both tables could be same as provided but without that syntax element, where the address is derived as "the leftmost position in the uppermost CTU-row that has not been covered by a Coding Area".

For higher picture resolutions an additional step size might be useful to scale width and height of the CA partitions and if available position codes.

TABLE 2-4

| | Descriptor |
|---|---|
| coding_areas_arangement( ) { | |
| coding_area_scaling_factor_minus1 | ue(v) |
| for( i = 0; i <= num_coding_ares_minus1; i++ ) { | |
| if( coding_area_explicit_positioning_flag ) { | |
| coding_area_CTU_start_address[i] | u(v) |
| } | |
| coding_area_width_in_units[i] | u(v) |
| coding_area_height_in_units[i] | u(v) |
| } | |
| } | |

The final CA position and size shall be derived as follows:

```
coding_area_width_in_CTU   = coding_area_width_in_units *
(coding_area_unit_scaling_factor_minus1+1)
coding_area_height_in_CTU   = coding_area_height_in_units *
(coding_area_unit_scaling_factor_minus1+1)
pic_width_in_units   = (pic_width_in_CTU+coding_area_unit_scaling_factor_minus1)
                        / (coding_area_unit_scaling_factor_minus1+1)
coding_area_CTU_start_address = ( coding_area_unit_scaling_factor_minus1+1)
*( (coding_area_start_address_in_units % pic_width_in_units ) +
(coding_area_CTU_start_address _unit / pic_width_in_units )* picture_width_in_CTU))
```

TABLE 2-5

| | Descriptor |
|---|---|
| coding_areas_arangement( ) { | |
| coding_area_scaling_factor_minus1 | ue(v) |
| for( i = 0; i <= num_coding_ares_minus1; i++ ) { | |
| if( coding_area_explicit_positioning_flag ) { | |
| coding_area_top_left_CTU_address_in_units[i] | u(v) |
| } | |
| coding_area_width_in_units[i] | u(v) |
| coding_area_height_in_units[i] | u(v) |
| } | |
| } | |

coding_area_scaling_factor_minus1 scaling factor used to scale CA position and size parameters coding_area_top_left_CTU_address_in_units[i] address of CTU at the top-left boundary of the CA. The address is given in units and has to be scaled according to coding_area_scaling_factor_minus1+1 to obtain the CTU-address coding_area_width_in_units[i] width of the CA in units has to be scaled according to coding_area_scaling_factor_minus+1 to obtain the CA width in CTUs.

coding_area_height_in_units[i] height of the CA in units has to be scaled according to coding_area_scaling_factor_minus+1 to obtain the CA width in CTUs.

Summarizing the above concepts:

In an embodiment, the data encoder 110 may, e.g., be configured to generate the indication data such that the indication data indicates for one of the plurality of coding areas a coding area width in coding tree units that specifies a number of coding tree units that are arranged in a horizontal direction within one of the coding areas. A particular example, may, e.g., be the coding_area_width_in_CTU described above.

According to an embodiment, the data encoder 110 may, e.g., be configured to generate the indication data such that the indication data indicates for one of the plurality of coding areas a coding area height in coding tree units that specifies a number of coding tree units that are arranged in a vertical direction within one of the coding areas. A particular example, may, e.g., be the coding_area_height_in_CTU described above.

In an embodiment, the data encoder 110 may, e.g., be configured to generate the indication data such that the indication data indicates for a coding area of the plurality of coding areas whether a last coding tree unit in horizontal direction within said coding area is smaller than another coding tree unit of said coding area that precedes said coding tree unit in the horizontal direction.

In a particular embodiment, said coding area may, e.g., comprise a plurality of last coding tree units in the horizontal direction, said last coding tree unit in the horizontal direction being one of said plurality of last coding tree units in the horizontal direction. If said last coding tree unit in the horizontal direction within said coding area is smaller than said another coding tree unit of said coding area that precedes said last coding tree unit in the horizontal direction, each of the plurality of last coding tree units in the horizontal direction may, e.g., have same width.

According to an embodiment, the data encoder 110 may, e.g., be configured to generate the indication data such that the indication data indicates for a coding area of the plurality of coding areas whether a last coding tree unit in vertical direction within said coding area is smaller than another coding tree unit of said coding area that precedes said coding tree unit in the vertical direction.

In a particular embodiment, said coding area may, e.g., comprise a plurality of last coding tree units in the vertical direction, said last coding tree unit in the vertical direction being one of said plurality of last coding tree units in the vertical direction. If said last coding tree unit in the vertical direction within said coding area is smaller than said another coding tree unit of said coding area that precedes said last coding tree unit in the vertical direction, each of the plurality of last coding tree units in the vertical direction may, e.g., have same height.

Likewise, in an embodiment, the data decoder 170 may, e.g., be configured to decode the encoded picture data using information which indicates for one of the plurality of coding areas a coding area width in coding tree units that specifies a number of coding tree units that are arranged in a horizontal direction within one of the coding areas, wherein the indication data may, e.g., comprise said information.

According to an embodiment, the data decoder 170 may, e.g., be configured to decode the encoded picture data using information which indicates for one of the plurality of coding areas a coding area height in coding tree units that specifies a number of coding tree units that are arranged in a vertical direction within one of the coding areas, wherein the indication data may, e.g., comprise said information.

In an embodiment, the data decoder 170 may, e.g., be configured to decode the encoded picture data using information which indicates for a coding area of the plurality of coding areas whether a last coding tree unit in horizontal direction within said coding area is smaller than another coding tree unit of said coding area that precedes said coding tree unit in the horizontal direction, wherein the indication data may, e.g., comprise said information.

In a particular embodiment, said coding area may, e.g., comprise a plurality of last coding tree units in the horizontal direction, said last coding tree unit in the horizontal direction being one of said plurality of last coding tree units in the horizontal direction. If said last coding tree unit in the horizontal direction within said coding area is smaller than said another coding tree unit of said coding area that precedes said last coding tree unit in the horizontal direction, each of the plurality of last coding tree units in the horizontal direction may, e.g., have same width.

According to an embodiment, the data decoder 170 may, e.g., be configured to decode the encoded picture data using information which indicates for a coding area of the plurality of coding areas whether a last coding tree unit in vertical direction within said coding area is smaller than another coding tree unit of said coding area that precedes said coding tree unit in the vertical direction, wherein the indication data may, e.g., comprise said information.

In a particular embodiment, said coding area may, e.g., comprise a plurality of last coding tree units in the vertical direction, said last coding tree unit in the vertical direction being one of said plurality of last coding tree units in the vertical direction. If said last coding tree unit in the vertical direction within said coding area is smaller than said another coding tree unit of said coding area that precedes said last coding tree unit in the vertical direction, each of the plurality of last coding tree units in the vertical direction may, e.g., have same height.

In the following sub-sub-subsection "embodiment B", hierarchical sub-divisioning through splitting is described.

In the particular, two variants for hierarchical CA partitioning are provided.

The first method is to transmit hierarchically the coding area split position values in scaled CTU units. Here, the granularity of partitioning depends on CTU size.

TABLE 2-6

| | Descriptor |
|---|---|
| coding_areas_arangement( ) { | |
| coding_area_scaling_factor_minus1 | ue(v) |
| AreaIdx = 0 | |
| coding_area_tree( 0, 0, picWidthInCTU, picHeightInCTU ) | |
| } | |

TABLE 2-7

| | Descriptor |
|---|---|
| coding_area_tree( x0, y0, widthInCTU, heightInCTU ) { | |
| if( widthInCTU > 1 && heightInCTU > 1) | |
| coding_area_split_id | u(2) |
| else if( widthInCTU > 1 ) | |
| coding_area_split_hor_flag | u(1) |
| else if( heightInCTU > 1 ) | |
| coding_area_split_ver_flag | u(1) |
| if( coding_area_split_id == 1 ) { /* Quad-Split */ | |
| coding_area_split_pos_unit_x | u(v) |
| coding_area_split_pos_unit_y | u(v) |
| x1 = x0 + (coding_area_split_pos_unit_x * (coding_area_scaling_factor_minus1 + 1 ) ) | |
| y1 = y0 + (coding_area_split_pos_unit_y * (coding_area_scaling_factor_minus1 + 1 ) ) | |
| coding_area_tree( x0, y0, x1 − x0, y1 − y0 ) | |
| coding_area_tree( x1, y0, widthInCTU - ( x1 − x0 ), y1 − y0 ) | |
| coding_area_tree( x0, y1, x1 − x0, heightInCTU - (y1 − y0 ) ) | |
| coding_area_tree( x1, y1, widthInCTU - ( x1 − x0 ), heightInCTU - (y1 − y0 ) ) | |
| } else if( ( coding_area_split_id = = 2 ) \| \| | |
| ( coding_area_split_hor_flag ) ) { /* Binary-Split Horizontal */ | |
| coding_area_split_pos_unit_x | u(v) |
| x1 = x0 + ( coding_area_split_pos_unit_x * ( coding_area_scaling_factor_minus1 + 1 ) ) | |
| coding_area_tree( x0, y0, x1 − x0, heightInCTU ) | |
| coding_area_tree( x1, y0, widthInCTU - ( x1 − x0 ), heightInCTU ) | |
| } else if( ( coding_area_split_id = = 3 ) \| \| | |
| ( coding_area_split_ver_flag ) ) { /* Binary-Split Vertical */ | |
| coding_area_split_pos_unit_y | u(v) |
| y1 = y0 + ( coding_area_split_pos_unit_y * ( coding_area_scaling_factor_minus1 + 1 ) ) | |
| coding_area_tree( x0, y0, widthInCTU, y1 − y0 ) | |
| coding_area_tree( x0, y1, widthInCTU, heightInCTU - (y1 − y0 ) ) | |
| } else { | |
| CodingAreaPosX[ AreaIdx ] = x0 | |
| CodingAreaPosY [ AreaIdx ] = y0 | |

TABLE 2-7-continued

| | Descriptor |
|---|---|
| CodingAreaWidth[ AreaIdx ] = widthInCTU | |
| CodingAreaHeight [ AreaIdx ] = heightInCTU | |
| AreaIdx++ | |
| } | |
| } | |

The second variant of hierarchical CA partitioning is to transmit the coding area split position values in general uniform units. The unit dimension can be derived by the scaling of the already parsed original picture size with a particular factor, which is also signaled in the parameter set. Here, the granularity of partitioning is varying and depends on unit size chosen at the encoder side.

TABLE 2-8

| | Descriptor |
|---|---|
| coding_areas_arrangement( ) { | |
| pic_width_in_units_minus1 | ue(v) |

TABLE 2-8-continued

| | Descriptor |
|---|---|
| pic_height_in_units_minus1 | ue(v) |
| PicWidthInUnits = pic_width_in_units_minus1 + 1 | |
| PicHeightInUnits = pic_height_in_units_minus1 + 1 | |
| AreaIdx = 0 | |
| coding_area_tree( 0, 0, PicWidthInUnits, PicHeightInUnits ) | |
| } | |

TABLE 2-9

| | Descriptor |
|---|---|
| coding_area_tree( x0, y0, widthInUnits, heightInUnits ) { | |
| if( widthInUnits > 1 && heightInUnits > 1 ) | |
| coding_area_split_id | u(2) |
| else if( widthInUnits > 1 ) | |
| coding_area_split_hor_flag | u(1) |
| else if( heightInUnits > 1 ) | |
| coding_area_split_ver_flag | u(1) |
| if( coding_area_split_id == 1 ) { /* Quad-Split */ | |
| coding_area_split_pos_unit_x | u(v) |
| coding_area_split_pos_unit_y | u(v) |
| x1 = x0 + coding_area_split_pos_unit_x | |
| y1 = y0 + coding_area_split_pos_unit_y | |
| coding_area_tree( x0, y0, x1 − x0, y1 − y0 ) | |
| coding_area_tree( x1, y0, widthInUnits - ( x1 − x0 ), y1 − y0 ) | |
| coding_area_tree( x0, y1, x1 − x0, heightInUnits - (y1 − y0 ) ) | |
| coding_area_tree( x1, y1, widthInUnits - ( x1 − x0 ), heightInUnits - (y1 − y0 ) ) | |
| } else if( ( coding_area_split_id = = 2 ) \| \| ( coding_area_split_hor_flag ) ) { /* Binary-Split Horizontal */ | |
| coding_area_split_pos_unit_x | u(v) |
| x1 = x0 + coding_area_split_pos_unit_x | |
| coding_area_tree( x0, y0, x1 − x0, heightInUnits ) | |
| coding_area_tree( x1, y0, widthInUnits - ( x1 − x0 ), heightInUnits ) | |
| } else if( ( coding_area_split_id = = 3 ) \| \| ( coding_area_split_ver_flag ) ) { /* Binary-Split Vertical */ | |
| coding_area_split_pos_unit_y | u(v) |
| y1 = y0 + coding_area_split_pos_unit_y | |
| coding_area_tree( x0, y0, widthInUnits, y1 − y0 ) | |
| coding_area_tree( x0, y1, widthInUnits, heightInUnits - (y1 − y0 ) ) | |
| } else { | |
| CodingAreaPosUnitX [ AreaIdx ] = x0 | |
| CodingAreaPosUnitY [ AreaIdx ] = y0 | |
| CodingAreaWidthInUnits[ AreaIdx ] = widthInUnits | |
| CodingAreaHeightInUnits[ AreaIdx ] = heightInUnits | |
| AreaIdx++ | |
| } | |
| } | |

The final CA position and size shall be derived as follows:

UnitWidth=pic_width_in_luma samples/PicWidthnUnits;

UnitHeight=pic_height_inlumasamples/PicHeightnUnits;

CodingAreaWidth[AreaIdx]=CodingAreaWidthInUnits [AreaIdx]*UnitWidth

CodingAreaHeight[AreaIdx]=CodingAreaHeightInUnits [AreaIdx]*UnitHeight

CodingAreaPosX[AreaIdx]=CodingAreaPosUnitX [AreaIdx]*UnitWidth

CodingAreaPosY[AreaIdx]=CodingAreaPosUnitY [AreaIdx]*UnitHeight coding_area_start_address[AreaIdx]=CodingAreaPosY [AreaIdx]*PicWidthInCtbsY+CodingAreaPosX[AreaIdx]

The advantage of hierarchical CA partitioning is that for some partitioning scenarios this method might need less bits for signaling. Besides, it enforces some kind of alignment among CAs or group of CAs where some boundaries are shared, which might be beneficial for some implementations.

Signalling can be constraint to be only possible for RAPs and inherited from there for subsequent pictures.

An additional flag in the bitstream indicating the layout is retransmitted. Otherwise a previous CA-layout is used, that could further be selected out of a set of previously transmitted CA-layouts by a bitstream transmitted index.

Summarizing the above:

According to an embodiment, the data encoder 110 may, e.g., be configured to generate the indication data such that the information on the plurality of coding areas comprises information on how to split the picture one or more times to obtain the plurality of coding areas by splitting the picture the one or more times.

In an embodiment, the data encoder 110 may, e.g., be configured to generate the indication data such that the indication data indicates a plurality coding area split positions.

According to an embodiment, the data encoder 110 may, e.g., be configured to generate the indication data such that the indication data indicates the plurality coding area split positions as an ordered sequence.

In an embodiment, the data encoder 110 may, e.g., be configured to generate the indication data such that the indication data indicates the plurality coding area split positions as a plurality of coding area split position values, wherein each of the plurality of coding area split position values depends on a width of the picture or depends on a height of the picture.

According to an embodiment, the data encoder 110 may, e.g., be configured to generate the indication data such that the information on the plurality of coding areas comprises information on how to split the picture hierarchically one or more times to obtain the plurality of coding areas by splitting the picture hierarchically the one or more times.

Likewise, according to an embodiment, the data decoder 170 may, e.g., be configured to decode the encoded picture data using information on how to split the picture one or more times to obtain the plurality of coding areas by splitting the picture the one or more times, wherein the indication data may, e.g., comprise said information.

In an embodiment, the data decoder 170 may, e.g., be configured to decode the encoded picture data using information which indicates a plurality coding area split positions, wherein the indication data may, e.g., comprise said information.

According to an embodiment, the data decoder 170 may, e.g., be configured to decode the encoded picture data using information which indicates the plurality coding area split positions as an ordered sequence, wherein the indication data may, e.g., comprise said information.

In an embodiment, the data decoder 170 may, e.g., be configured to decode the encoded picture data using information which indicates the plurality coding area split positions as a plurality of coding area split position values, wherein each of the plurality of coding area split position values depends on a width of the picture or depends on a height of the picture, wherein the indication data may, e.g., comprise said information.

According to an embodiment, the data decoder 170 may, e.g., be configured to decode the encoded picture data using information on the plurality of coding areas comprises information on how to split the picture hierarchically one or more times to obtain the plurality of coding areas by splitting the picture hierarchically the one or more times, wherein the indication data may, e.g., comprise said information.

Now, further examples are provided, on how the data encoder 110 may, e.g., be configured to generate the indication data such that the information on the plurality of coding areas comprises information on how to split the picture one or more times to obtain the plurality of coding areas by splitting the picture the one or more times.

In particular, further examples are provided on how the data encoder 110 may, e.g., be configured to generate the indication data such that the information on the plurality of coding areas comprises information on how to split the picture hierarchically one or more times to obtain the plurality of coding areas by splitting the picture hierarchically the one or more times.

Moreover, further examples are provided on how the data decoder 170 may, e.g., be configured to decode the encoded picture data using information on how to split the picture one or more times to obtain the plurality of coding areas by splitting the picture the one or more times, wherein the indication data comprises said information.

In particular, further examples are provided on how the data decoder 170 may, e.g., be configured to decode the encoded picture data using information on the plurality of coding areas comprises information on how to split the picture hierarchically one or more times to obtain the plurality of coding areas by splitting the picture hierarchically the one or more times, wherein the indication data may, e.g., comprise said information.

Furthermore, further examples are provided on how the indication data of an encoded video signal may, e.g., indicate how to split the picture one or more times to obtain the plurality of coding areas by splitting the picture the one or more times.

Moreover, in particular, further examples are provided on how to split the picture hierarchically one or more times to obtain the plurality of coding areas by splitting the picture hierarchically the one or more times.

In some embodiments, the data encoder 110 and/or the data decoder 170 may, e.g., be configured

- in a first step, to split the picture in horizontal and vertical direction to obtain a first partitioning of the picture, and
- in a second step, to split the first partitioning of the picture (only) in horizontal direction to obtain a second partitioning of the picture.

Figure 27:
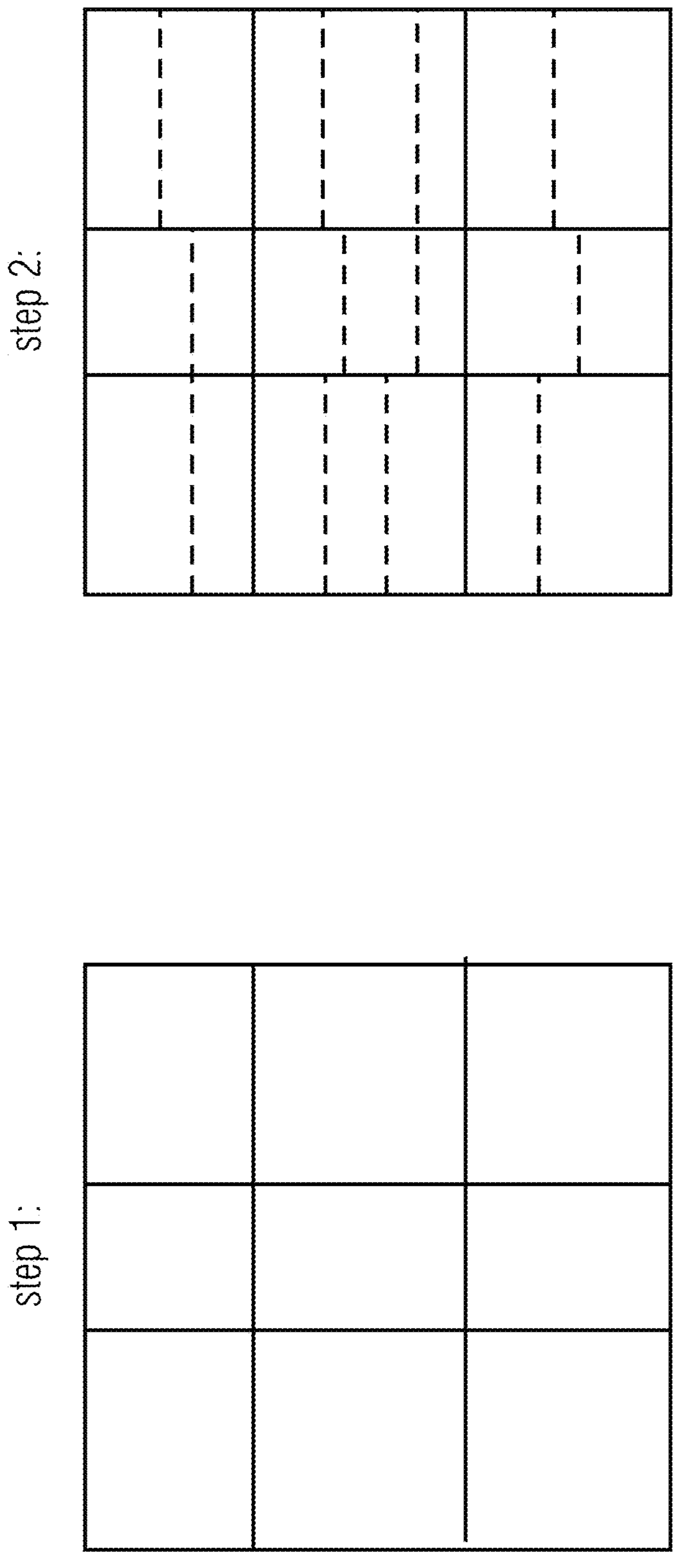
FIG. 27 illustrates the picture being split hierarchically according to an embodiment, in a first step, in the horizontal and in the vertical direction to obtain a first partitioning of the picture, and, in a second step, only in the horizontal direction, to obtain a second partitioning of the picture.

In FIG. 27, the picture is split hierarchically, in a first step, in the horizontal and in the vertical direction to obtain a first partitioning of the picture (e.g., a tile splitting) (FIG. 27, step 1), and, in a second step, only in the horizontal direction, to obtain a second partitioning of the picture (e.g., a brick splitting) (FIG. 27, step 2).

In some other embodiments, the data encoder 110 and/or the data decoder 170 may, e.g., be configured in a first step, to split the picture in horizontal and vertical direction to obtain a first partitioning of the picture, and in a second step, to split the first partitioning of the picture (only) in vertical direction to obtain a second partitioning of the picture.

Figure 28:
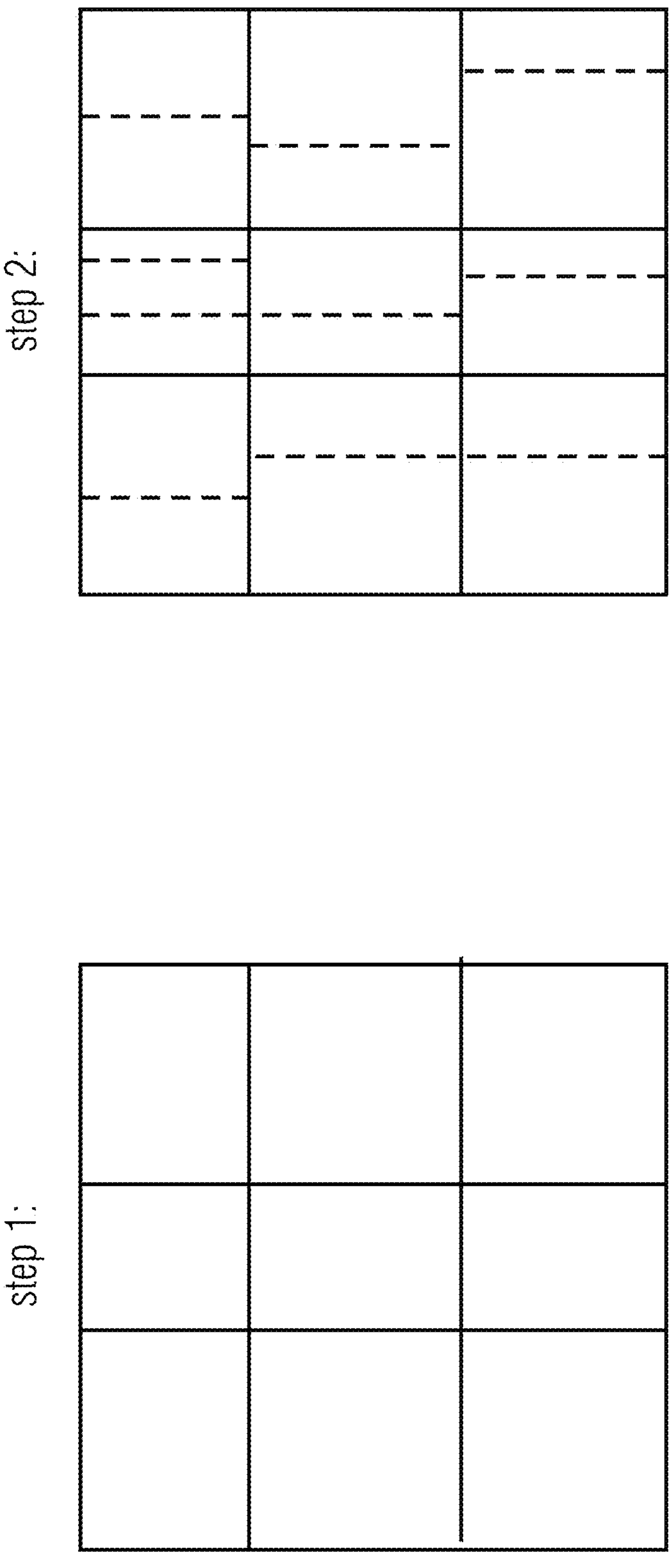
FIG. 28 illustrates the picture being split hierarchically according to another embodiment, in a first step, in the horizontal and in the vertical direction to obtain a first partitioning of the picture, and, in a second step, only in the vertical direction, to obtain a second partitioning of the picture.

In FIG. 28, the picture is split hierarchically, in a first step, in the horizontal and in the vertical direction to obtain a first partitioning of the picture (e.g., a tile splitting) (FIG. 28, step 1), and, in a second step, only in the vertical direction, to obtain a second partitioning of the picture (e.g., a brick splitting) (FIG. 28, step 2).

In some further embodiments, the data encoder 110 and/or the data decoder 170 may, e.g., be configured in a first step, to split the picture (only) in horizontal direction to obtain a first partitioning of the picture, and in a second step, to split the first partitioning of the picture (only) in vertical direction to obtain a second partitioning of the picture.

Figure 29:
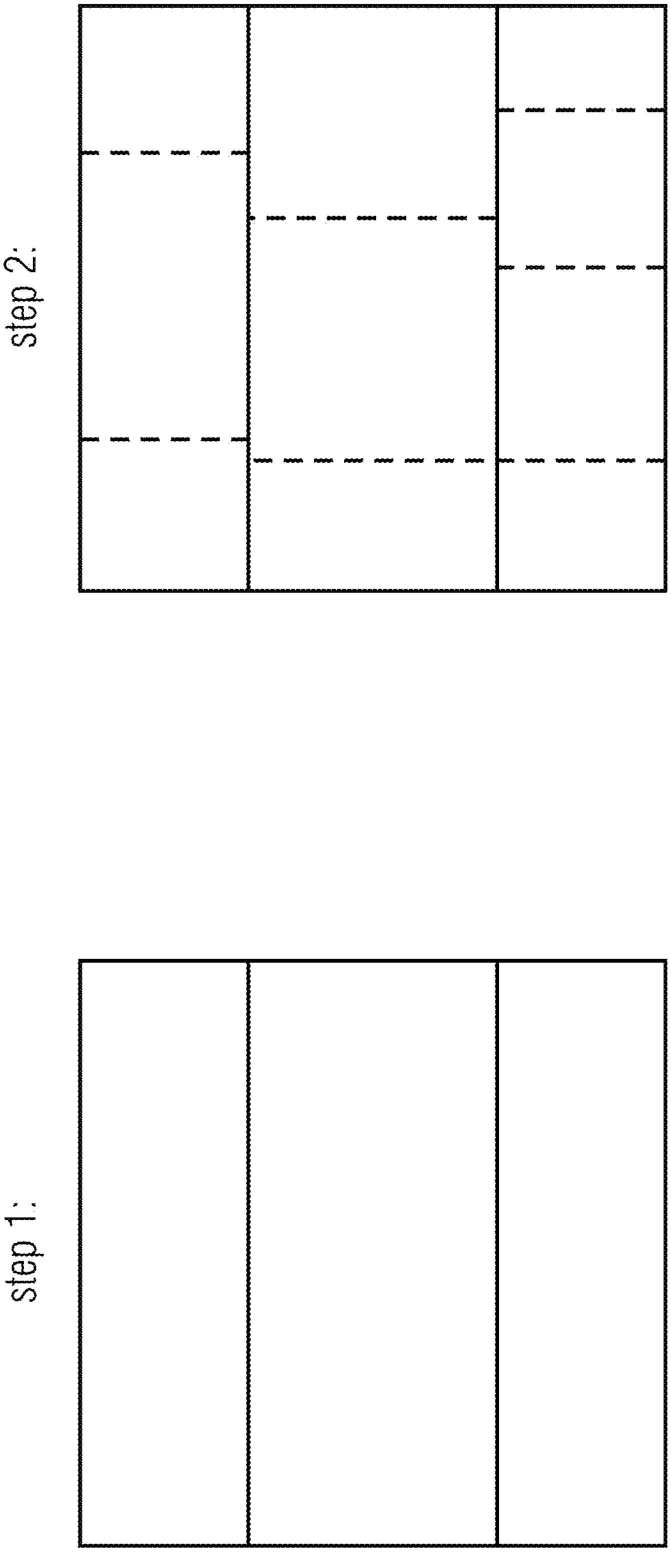
FIG. 29 illustrates the picture being split hierarchically according to a further embodiment, in a first step, only in the horizontal direction to obtain a first partitioning of the picture, and, in a second step, only in the vertical direction, to obtain a second partitioning of the picture.

In FIG. 29, the picture is split hierarchically, in a first step, only in the horizontal direction to obtain a first partitioning of the picture (e.g., a tile splitting) (FIG. 29, step 1), and, in a second step, only in the vertical direction, to obtain a second partitioning of the picture (e.g., a brick splitting) (FIG. 29, step 2).

In some yet further embodiments, the data encoder 110 and/or the data decoder 170 may, e.g., be configured in a first step, to split the picture (only) in vertical direction to obtain a first partitioning of the picture, and in a second step, to split the first partitioning of the picture (only) in horizontal direction to obtain a second partitioning of the picture.

Figure 30:
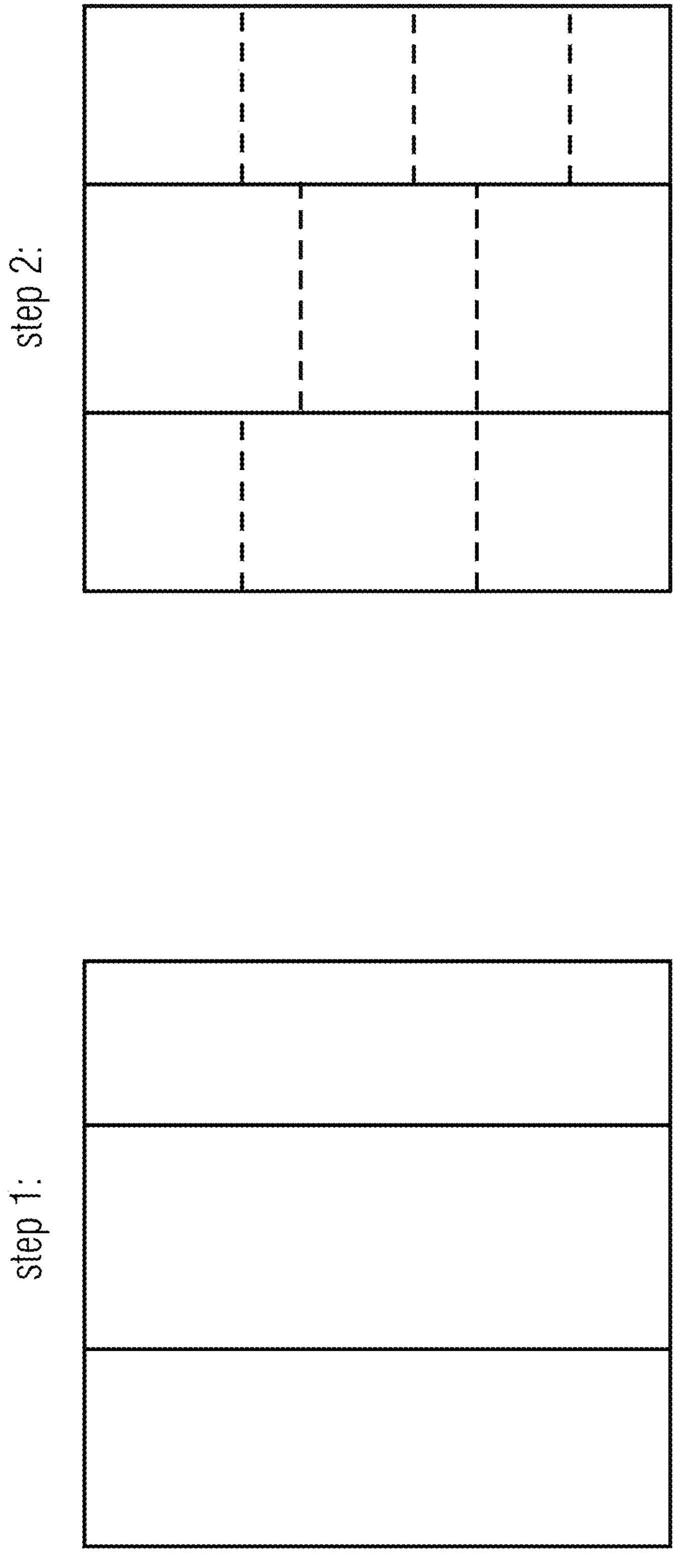
FIG. 30 illustrates the picture being split hierarchically according to a yet further embodiment, in a first step, only in the vertical direction to obtain a first partitioning of the picture, and, in a second step, only in the horizontal direction, to obtain a second partitioning of the picture.

In FIG. 30, the picture is split hierarchically, in a first step, only in the vertical direction to obtain a first partitioning of the picture (e.g., a tile splitting) (FIG. 30, step 1), and, in a second step, only in the horizontal direction, to obtain a second partitioning of the picture (e.g., a brick splitting) (FIG. 30, step 2).

In embodiments, in the code below for a picture parameter set RBSP syntax, the brick_split_flag[i] and the num_brick_rows_minus1[i] parameters implement a exemplary way on how to split the picture hierarchically one or more times to obtain the plurality of coding areas.

Pictures may, e.g., be partitioned into pictures, slices, tiles, bricks, and CTUs A picture may, e.g., be divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 26:
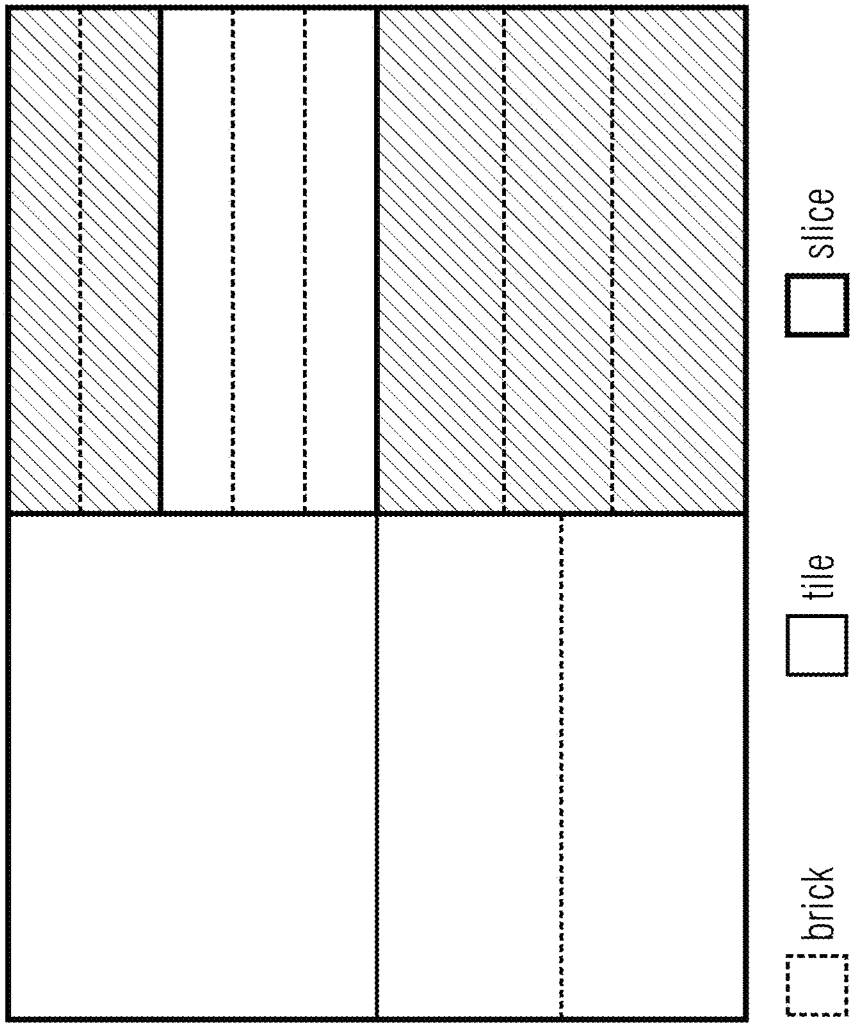
FIG. 26 illustrates an example of a picture partitioned into tiles, bricks, and rectangular slices according to an embodiment, where the picture is divided into 4 tiles, 11 bricks, and 4 rectangular slices.

FIG. 26 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

In the following, brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0.

Moreover, in the following, num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick_split_flag[i] is equal to 0, the value of num_brick_rows_minus1[i] is inferred to be equal to 0. Otherwise, when uniform_brick_spacing_flag[i] is equal to 1, the value of num_brick_rows_minus1[i] is inferred (e.g., as specified below with respect to the CTB raster scanning, the tile scanning, and the brick scanning process).

Therefore, with brick_split_flag[i] and num_brick_rows_minus1[i] and implement a exemplary way on how to split the picture hierarchically one or more times to obtain the plurality of coding areas. A tile may, e.g., be divided into two or more bricks which may, e.g., consist of a number of CTU rows.

In more detail, the CTB raster scanning, the tile scanning, and the brick scanning process may, e.g., be conducted as follows:

The list colWidth[i] for i ranging from 0 to num_tile_columns_minus1, inclusive, specifying the width of the i-th tile column in units of CTBs, is derived, and when uniform_tile_spacing_flag is equal to 1, the value of num_tile_columns_minus1 is inferred, as follows:

```
if( uniform_tile_spacing_flag ) {
    remainingWidthInCtbsY = PicWidthInCtbsY
    i = 0
    while( remainingWidthInCtbsY > ( tile_cols_width_minus1 + 1 ) ) {
        colWidth[ i++ ] = tile_cols_width_minus1 + 1
        remainingWidthInCtbsY −= ( tile_cols_width_minus1 + 1 )
    }
    colWidth[ i ] = remainingWidthInCtbsY
    num_tile_columns_minus1 = i
} else {
    colWidth[ num_tile_columns_minus1 ] = PicWidthInCtbsY            (6-1)
    for( i = 0; i < num_tile_columns_minus1; i++ ) {
        colWidth[ i ] = tile_column_width_minus1[ i ] + 1
        colWidth[ num_tile_columns_minus1 ] −= colWidth[ i ]
    }
}
```

The list RowHeight[j] for j ranging from 0 to num_tile_rows_minus1, inclusive, specifying the height of the j-th tile row in units of CTBs, is derived, and when uniform_tile_spacing_flag is equal to 1, the value of num_tile_rows_minus1 is inferred, as follows:

```
if( uniform__tile__spacing__flag ) {
    remainingHeightInCtbsY = PicHeightInCtbsY
    i = 0
    while( remainingHeightInCtbsY > ( tile__rows__height__minus1 + 1 ) ) {
        RowHeight[ i++ ] = tile__rows__height__minus1 + 1
        remainingHeightInCtbsY -= ( tile__rows__height__minus1 + 1 )
    }
    RowHeight[ i ] = remainingHeightInCtbsY
    num__tile__rows__minus1 = i
} else {
    RowHeight[ num__tile__rows__minus1 ] = PicHeightInCtbsY        (6-2)
    for( j = 0; j < num__tile__rows__minus1; j++ ) {
        RowHeight[ j ] = tile__row__height__minus1[ j ] + 1
        RowHeight[ num__tile__rows__minus1 ] -= RowHeight[ j ]
    }
}
```

The list tileColBd[i] for i ranging from 0 to num_tile_columns_minus1+1, inclusive, specifying the location of the i-th tile column boundary in units of CTBs, is derived as follows:

```
for( tileColBd[ 0 ] = 0, i = 0; i <= num__tile__columns__minus1; i++ )
        tileColBd[ i + 1 ] = tileColBd[ i ] + colWidth[ i ]        (6-3)
```

The list tileRowBd[j] for j ranging from 0 to num_tile_rows_minus1+1, inclusive, specifying the location of the j-th tile row boundary in units of CTBs, is derived as follows:

```
for( tileRowBd[ 0 ] = 0, j = 0; j <= num__tile__rows__minus1; j++ )
    tileRowBd[ j + 1 ] = tileRowBd[ j ] + RowHeight[ j ]        (6-4)
```

The variable NumBricksInPic, specifying the number of bricks in a picture referring to the PPS, and the lists BrickColBd[brickIdx], BrickRowBd[brickIdx], BrickWidth[brickIdx], and BrickHeight[brickIdx] for brickIdx ranging from 0 to NumBricksInPic−1, inclusive, specifying the locations of the vertical brick boundaries in units of CTBs, the locations of the horizontal brick boundaries in units of CTBs, the widths of the bricks in units of CTBs, and the heights of bricks in units of CTBs, are derived, and for each i ranging from 0 to NumTilesInPic−1, inclusive, when uniform_brick_spacing_flag[i] is equal to 1, the value of num_brick_rows_minus1[i] is inferred, as follows:

```
for ( brickIdx = 0, i = 0; i < NumTilesInPic; i++ ) {
    tileX = i % ( num__tile__columns__minus1 + 1 )
    tileY = i / ( num__tile__columns__minus1 + 1 )
    if( !brick__split__flag[ i ] ) {
        BrickColBd[ brickIdx ] = tileColBd[ tileX ]
        BrickRowBd[ brickIdx ] = tileRowBd[ tileY ]
        BrickWidth[ brickIdx ] = colWidth[ tileX ]
        BrickHeight[ brickIdx ] = RowHeight[ tileY ]        (6-5)
        brickIdx++
    } else {
        if( uniform__brick__spacing__flag[ i ] ) {
            remainingHeightInCtbsY = RowHeight[ tileY ]
            j = 0
            while( remainingHeightInCtbsY > ( brick__height__minus1[ i ] + 1 ) ) {
                rowHeight2[ j++ ] = brick__height__minus1[ i ] + 1
            remainingHeightInCtbsY -= ( brick__height__minus1[ i ] + 1 )
            }
            rowHeight2[ j ] = remainingHeightInCtbsY
            num__brick__rows__minus1[ i ] = j
        } else {
            rowHeight2[ num__brick__rows__minus1[ i ] ] = RowHeight[ tileY ]
            for( j = 0; j < num__brick__rows__minus1[ i ]; j++ ) {
             rowHeight2[ j ] = brick__row__height__minus1[ i ][ j ]+ 1
            rowHeight2[ num__brick__rows__minus1[ i ] ] -= rowHeight2[ j ]
            }
        }
        for( rowBd2[ 0 ] = 0, j = 0; j <= num__brick__rows__minus1[ i ]; j++ )
            rowBd2[ j + 1 ] = rowBd2[ j ] + rowHeight2[ j ]
        for( j = 0; j < num__brick__rows__minus1[ i ] + 1; j++) {
            BrickColBd[ brickIdx ] = tileColBd[ tileX ]
            BrickRowBd[ brickIdx ] = tileRowBd[ tileY ] + rowBd2[ j ]
```

-continued

```
                BrickWidth[ brickIdx ] = colWidth[ tileX ]
                BrickHeight[ brickIdx ] = rowHeight2[ j ]
                brickIdx++
            }
        }
}
NumBricksInPic = brickIdx
```

The list CtbAddrRsToBs[ctbAddrRs] for ctbAddrRs ranging from 0 to PicSizeInCtbsY−1, inclusive, specifying the conversion from a CTB address in CTB raster scan of a picture to a CTB address in brick scan, is derived as follows:

```
for( ctbAddrRs = 0; ctbAddrRs < PicSizeInCtbsY; ctbAddrRs++ ) {
    tbX = ctbAddrRs % PicWidthInCtbsY
    tbY = ctbAddrRs / PicWidthInCtbsY
    brickFound = FALSE
    for( bkIdx = NumBricksInPic − 1, i = 0; i < NumBricksInPic − 1 &&
!brickFound; i++ ) {
        brickFound = tbX < ( BrickColBd[ i ] + BrickWidth[ i ] ) &&
                     tbY < ( BrickRowBd[ i ] + BrickHeight[ i ] )
        if( brickFound )                                  (6-6)
            bkIdx = i
    }
    CtbAddrRsToBs[ ctbAddrRs ] = 0
    for( i = 0; i < bkIdx; i++ )
        CtbAddrRsToBs[ ctbAddrRs ] += BrickHeight[ i ] * BrickWidth[ i ]
    CtbAddrRsToBs[ ctbAddrRs ] +=
                ( tbY − BrickRowBd[ bkIdx ] ) * BrickWidth[ bkIdx ] + tbX −
BrickColBd[ bkIdx ]
}
```

The list CtbAddrBsToRs[ctbAddrBs] for ctbAddrBs ranging from 0 to PicSizeInCtbsY−1, inclusive, specifying the conversion from a CTB address in brick scan to a CTB address in CTB raster scan of a picture, is derived as follows:

```
for( ctbAddrRs = 0; ctbAddrRs < PicSizeInCtbsY; ctbAddrRs++ )   (6-7)
    CtbAddrBsToRs[ CtbAddrRsToBs[ ctbAddrRs ] ] = ctbAddrRs
```

The list BrickId[ctbAddrBs] for ctbAddrBs ranging from 0 to PicSizeInCtbsY−1, inclusive, specifying the conversion from a CTB address in brick scan to a brick ID, is derived as follows:

```
for( i = 0, i < NumBricksInPic; i++ )
    for( y = BrickRowBd[ i ]; y < BrickRowBd[ i ] + BrickHeight[ i ]; y++ )  (6-8)
        for( x = BrickColBd[ i ]; x < BrickColBd[ i ] + BrickWidth[ i ]; x++ )
            BrickId[ CtbAddrRsToBs[ y * PicWidthInCtbsY+ x ] ] = i
```

The list NumCtusInBrick[brickIdx] for brickIdx ranging from 0 to NumBricksInPic−1, inclusive, specifying the conversion from a brick index to the number of CTUs in the brick, is derived as follows:

```
    for( i = 0; i < NumBricksInPic; i++ )              (6-9)
        NumCtusInBrick[ i ] = BrickWidth[ i ] * BrickHeight[ i ]
```

The list FirstCtbAddrBs[brickIdx] for brickIdx ranging from 0 to NumBricksInPic−1, inclusive, specifying the conversion from a brick ID to the CTB address in brick scan of the first CTB in the brick are derived as follows:

```
for( ctbAddrBs = 0, brickIdx = 0, brickStartFlag = 1; ctbAddrBs <
PicSizeInCtbsY; ctbAddrBs++ ) {
    if( brickStartFlag ) {
        FirstCtbAddrBs[ brickIdx ] =
ctbAddrBs                (6-10)
        brickStartFlag = 0
    }
    brickEndFlag = ( ctbAddrBs = = PicSizeInCtbsY − 1 ) | |
                    ( BrickId[ ctbAddrBs + 1 ] != BrickId[ ctbAddrBs ] )
    if( brickEndFlag ) {
        brickIdx++
        brickStartFlag = 1
    }
}
```

Picture parameter set RBSP syntax

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx[ i ] | u(v) |
|         bottom_right_brick_idx_delta[ i ] | u(v) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   entropy_coding_sync_enabled_flag | u(1) |
|   cabac_init_present_flag | u(1) |
|   for( i = 0; i < 2; i++ ) | |
|     num_ref_idx_default_active_minus1[ i ] | ue(v) |

-continued

| | Descriptor |
|---|---|
| rpl1_idx_present_flag | u(1) |
| init_qp_minus26 | se(v) |
| transform_skip_enabled_flag | u(1) |
| if( transform_skip_enabled_flag ) | |
| log2_transform_skip_max_size_minus2 | ue(v) |
| cu_qp_delta_enabled_flag | u(1) |
| if( cu_qp_delta_enabled_flag ) | |
| cu_qp_delta_subdiv | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| } | |
| } | |
| pps_loop_filter_across_virtual_boundaries_disabled_flag | u(1) |
| if( pps_loop_filter_across_virtual_boundaries_disabled_flag ) { | |
| pps_num_ver_virtual_boundaries | u(2) |
| for( i = 0; i < pps_num_ver_virtual_boundaries; i++ ) | |
| pps_virtual_boundaries_pos_x[ i ] | u(v) |
| pps_num_hor_virtual_boundaries | u(2) |
| for( i = 0; i < pps_num_hor_virtual_boundaries; i++ ) | |
| pps_virtual_boundaries_pos_y[ i ] | u(v) |
| } | |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

In the above code the Picture parameter set RBSP semantics may, e.g., be defined as follows:

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS. single_tile_in_pic_flag equal to 1 specifies that there is only one tile in each picture referring to the PPS. single_tile_in_pic_flag equal to 0 specifies that there is more than one tile in each picture referring to the PPS.

NOTE—In absence of further brick splitting within a tile, the whole tile is referred to as a brick. When a picture contains only a single tile without further brick splitting, it is referred to as a single brick.

The value of single_tile_in_pic_flag shall be the same for all PPSs that are activated within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i].

When not present, the value of uniform_tile_spacing_flag is inferred to be equal to 1. tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred (e.g., as specified above with respect to the CTB raster scanning, the tile scanning, and the brick scanning process).

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY−1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred (e.g., as specified below with respect to the CTB raster scanning, the tile scanning, and the brick scanning process).

The variable NumTilesInPic is set equal to (num_tile_columns_minus1+1)*(num_tile_rows_minus1+1).

When single_tile_in_pic_flag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

brick_split_flag[i] equal to 1 specifies that the i-th tile is divided into two or more bricks. brick_split_flag[i] equal to 0 specifies that the i-th tile is not divided into two or more bricks. When not present, the value of brick_splitflag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus1[i] and a list of syntax elements brick_row_height_minus1[i][j]. When not present, the value of uniform_brick_spacing_flag [i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick_split_flag[i] is equal to 0, the value of num_brick_rows_minus1[i] is inferred to be equal to 0. Otherwise, when uniform_brick_spacing_flag[i] is equal to 1, the value of num_brick_rows_minus1[i] is inferred (e.g., as specified above with respect to the CTB raster scanning, the tile scanning, and the brick scanning process).

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic−1, inclusive, when uniform_brick_spacing_flag[i] is equal to 1, the value of num_brick_rows_minus1[i] is inferred, by invoking the CTB raster and brick scanning conversion process (e.g., as specified above with respect to the CTB raster scanning, the tile scanning, and the brick scanning process).

- the list RowHeight[j] for j ranging from 0 to num_tile_rows_minus1, inclusive, specifying the height of the j-th tile row in units of CTBs,
- the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan,
- the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture,
- the list BrickId[ctbAddrBs] for ctbAddrBs ranging from 0 to PicSizeInCtbsY−1, inclusive, specifying the conversion from a CTB address in brick scan to a brick ID,
- the list NumCtusInBrick[brickIdx] for brickIdx ranging from 0 to NumBricksInPic−1, inclusive, specifying the conversion from a brick index to the number of CTUs in the brick,
- the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_leftbrick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brick_per_slice_flag is equal to 1, the value of bottom_right_brick_idx_delta[i] is inferred to be equal to 0. The length of the bottom_right_brick_idx_delta[i] syntax element is Ceil(Log 2(NumBricksInPic−top_left_brick_idx [i])) bits.

A slice shall include either a number of complete tiles or only a consecutive sequence of complete bricks of one tile.

The variable NumBricksIInSlice[i] and BricksToSliceMap[j], which specify the number of bricks in the i-th slice and the mapping of bricks to slices, are derived as follows:

```
NumBricksInSlice[ i ] = 0
botRightBkIdx = top__left__brick__idx[ i ] + bottom__right__brick__idx__delta[ i ]
for( j = 0; j < NumBricksInPic; j++) {
    if( BrickColBd[ j ] >= BrickColBd[ top__left__brick__idx[ i ] ] &&
            BrickColBd[ j ] <= BrickColBd[ botRightBkIdx ] &&
            BrickRowBd[ j ] >= BrickRowBd[ top__left__brick__idx[ i ] ] &&   (7-35)
            BrickRowBd[ j ] <= BrickRowBd [ botRightBkIdx ] ) {
        NumBricksInSlice[ i ]++
        BricksToSliceMap[ j ] = i
    }
}
```

loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

signalled_slice_id_flag equal to 1 specifies that the slice ID for each slice is signalled. signalled_slice_id_flag equal to 0 specifies that slice IDs are not signalled. When rect_slice_flag is equal to 0, the value of signalled_slice_id_flag is inferred to be equal to 0.

signalled_slice_id_length_minus1 plus 1 specifies the number of bits used to represent the syntax element slice_id [i] when present, and the syntax element slice_address in slice headers. The value of signalled_slice_id_length_minus1 shall be in the range of 0 to 15, inclusive. When not present, the value of signalled_slice_id_length_minus1 is inferred to be equal to Ceil(Log 2(num_slices_in_pic_minus1+1))−1.

slice_id[i] specifies the slice ID of the i-th slice. The length of the slice_id[i] syntax element is signalled_slice_id_length_minus1+1 bits. When not present, the value of slice_id[i] is inferred to be equal to i, for each i in the range of 0 to num_slices_in_pic_minus1, inclusive.

entropy_coding_sync_enabled_flag equal to 1 specifies that a specific synchronization process for context variables is invoked before decoding the CTU that includes the first CTB of a row of CTBs in each brick in each picture referring to the PPS, and a specific storage process for context variables is invoked after decoding the CTU that includes the first CTB of a row of CTBs in each brick in each picture referring to the PPS. entropy_coding_sync_enabled_flag equal to 0 specifies that no specific synchronization process for context variables may, e.g., be needed to be invoked before decoding the CTU that includes the first CTB of a row of CTBs in each brick in each picture referring to the PPS, and no specific storage process for context variables may, e.g., be needed to be invoked after decoding the CTU that includes the first CTB of a row of CTBs in each brick in each picture referring to the PPS.

The value of entropy_coding_sync_enabled_flag shall be the same for all PPSs that are activated within a CVS.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

init_qp_minus26 plus 26 specifies the initial value of SliceQpy for each slice referring to the PPS. The initial value of SliceQpy is modified at the slice layer when a non-zero value of slice_qp_delta is decoded. The value of init_qp_minus26 shall be in the range of −(26+QpBdOffsety) to +37, inclusive.

transform_skip_enabled_flag equal to 1 specifies that transform_skip_flag may be present in the transform unit syntax. transform_skip_enabled_flag equal to 0 specifies that transform_skip_flag is not present in the transform unit syntax.

log 2_transform_skip_max_size_minus2 specifies the maximum block size used for transform skip, and shall be in the range of 0 to 3.

When not present, the value of log 2_transform_skip_max_size_minus2 is inferred to be equal to 0.

The variable MaxTsSize is set equal to 1<<(log 2_transform_skip_max_size_minus2+2).

cu_qp_delta_enabled_flag equal to 1 specifies that the cu_qp_delta_subdiv syntax element is present in the PPS and that cu_qp_delta_abs may be present in the transform unit syntax. cu_qp_delta_enabled_flag equal to 0 specifies that the cu_qp_delta_subdiv syntax element is not present in the PPS and that cu_qp_delta_abs is not present in the transform unit syntax.

cu_qp_delta_subdiv specifies the maximum cbSubdiv value of coding units that convey cu_qp_delta_abs and cu_qp_delta_sign_flag. The value range of cu_qp_delta_subdiv is specified as follows:

If slice_type is equal to I, the value of cu_qp_delta_subdiv shall be in the range of 0 to 2*(log 2_ctu_size_minus2−log 2_min_qt_size_intra_slice_minus2+MaxMttDepthY), inclusive.

Otherwise (slice_type is not equal to I), the value of cu_qp_delta_subdiv shall be in the range of 0 to 2*(log 2_ctu_size_minus2−log 2_min_qt_size_inter_slice_minus2+MaxMttDepthY), inclusive.

When not present, the value of cu_qp_delta_subdiv is inferred to be equal to 0.

[Ed. (BB): The issue here is that MaxMttDepthY is derived on slice level. In case of partition_constraints_override_enabled_flag equal to 1, one would need to parse the slice header in order to know the value of MaxMttDepthY.]

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

weighted_pred_flag equal to 0 specifies that weighted prediction is not applied to P slices. weighted_pred_flag equal to 1 specifies that weighted prediction is applied to P slices.

weighted_bipred_flag equal to 0 specifies that the default weighted prediction is applied to B slices. weighted_bipred_flag equal to 1 specifies that weighted prediction is applied to B slices.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of deblocking_filter_override_flag in the slice headers for pictures referring to the PPS. deblocking_filter_override_enabled_flag equal to 0 specifies the absence of deblocking_filter_override_flag in the slice headers for pictures referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

pps_loop_filter_across_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. The in-loop filtering operations include the deblocking filter, sample adaptive offset filter, and adaptive loop filter operations. When not present, the value of pps_loop_filter_across_virtual_boundaries_disabled_flag is inferred to be equal to 0.

pps_num_ver_virtual_boundaries specifies the number of pps_virtual_boundaries_pos_x[i] syntax elements that are present in the PPS. When pps_num_ver_virtual_boundaries is not present, it is inferred to be equal to 0.

pps_virtual_boundaries_pos_x[i] is used to compute the value of PpsVirtualBoundariesPosX[i], which specifies the location of the i-th vertical virtual boundary in units of luma samples. The number of bits used to represent pps_virtual_boundaries_pos_x[i] is Ceil(Log 2(pic_width_in_luma_samples)−3). pps_virtual_boundaries_pos_x[i] shall be in the range of 1 to Ceil(pic_width_in_luma_samples+8)−1, inclusive.

The location of the vertical virtual boundary PpsVirtualBoundariesPosX[i] is derived as follows:

$$\text{PpsVirtualBoundariesPos}X[i]=pps\_\text{virtual\_boundaries}\_pos\_x[i]*8 \quad (7\text{-}36)$$

The distance between any two vertical virtual boundaries shall be greater than or equal to CtbSizeY luma samples.

pps_num_hor_virtual_boundaries specifies the number of pps_virtual_boundaries_pos_y[i] syntax elements that are present in the PPS. When pps_num_hor_virtual_boundaries is not present, it is inferred to be equal to 0.

pps_virtual_boundaries_pos_y[i] is used to compute the value of PpsVirtualBoundariesPosY[i], which specifies the location of the i-th horizontal virtual boundary in units of luma samples. The number of bits used to represent pps_virtual_boundaries_pos_y[i] is Ceil(Log 2(pic_height_in_luma_samples)−3). pps_virtual_boundaries_pos_y[i] shall be in the range of 1 to Ceil(pic_height_in_luma_samples+8)−1, inclusive.

The location of the horizontal virtual boundary PpsVirtualBoundariesPosY[i] is derived as follows:

$$\text{PpsVirtualBoundariesPos}Y[i]=pps\_\text{virtual\_boundaries}\_pos\_y[i]*8 \quad (7\text{-}37)$$

The distance between any two horizontal virtual boundaries shall be greater than or equal to CtbSizeY luma samples.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

In the following sub-sub-subsection "embodiment C", signalling in low-level syntax is described.

As already mentioned another option to indicate the layout of the CAs would be using in-VCL syntax in a more flexible way.

The Coding Area layout is determined by the evaluation of two new syntax elements area_line_stop_flag and area_column_stop_flag, whereas the end_of_slice_flag might not be utilized.

The area_line_stop_flag is present in the bit-stream at the end of CTU coding process, if the next CTU in diagonal scan order is located in a CTU-line for which no previous area_line_stop_flag has been transmitted in the bit-stream for the current slice, and that is at least partially located within the picture. If the area_line_stop_flag is false the current slice rectangle is extended by the new CTU-line with the number of currently used CTU-columns. If the area_line_stop_flag is true, the slice height is fixed with the number of currently used CTU-lines in the current slice.

Analog, the area_column_stop_flag is present in the bit-stream at the end of CTU coding process, if the next CTU in diagonal scan order is located in a new CTU-column for that no previous area_column_stop_flag has been transmitted in the bit-stream for the current slice, and that is at least partially located within the picture. If the area_column_stop_flag is false, the slice rectangle is extended by a new CTU-column with the number of currently used CTU-lines. If the area_column_stop_flag is true, the slice width is fixed to the number of currently used CTU-columns in the current slice.

Figure 11:
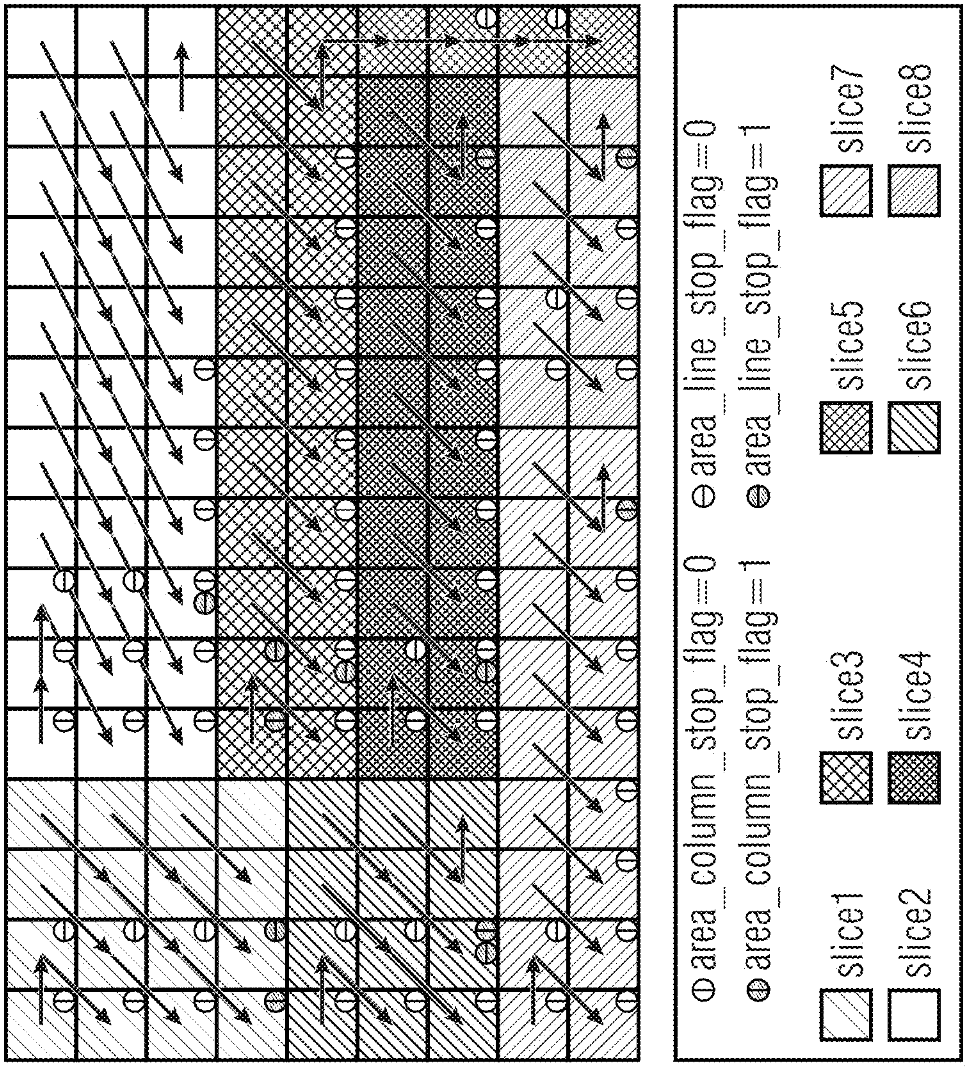
FIG. 11 illustrates coding areas signaling at sub-area (CTU) level according to embodiments.

FIG. 11 illustrates coding areas signaling at sub-area (CTU) level according to embodiments. When the rectangle of the slice is determined, the CTUs are processed in a particular scan order until all CTUs covered by the slice rectangle have been processed. Due to missing of explicit area_line_stop_flag respectively area_column_stop_flag at picture boundaries, the spanned coding regions that border to the picture boundaries are restricted to not exceed these. This can be seen in FIG. 11, where the area_line_stop_flag=1 and area_column_stop_flag=1 are not present near picture boundaries.

Using previous knowledge of sizes and positions of CA, as well as picture boundaries to implicitly derive area_line_stop_flag=1 and area_column_stop_flag=1 allows saving some signaling overhead but prevents some bitstream manipulations such a "coding area bitstream extraction" and "coding area bitstream aggregation" or at least incur additional processing overhead of the entropy coded data in these cases. Currently, for HEVC, motion constrained tile sets (MCTS) are defined that allow for both processes without the further processing of entropy coded data. However, by such processes MCTS (resp. CAs) boundaries become picture boundaries or picture boundaries become MCTS boundaries (respectively CA) and not picture boundaries. Therefore, implicit derivation area_line_stop_flag=1 and area_column_stop_flag=1 should be disallow to enable such functionalities by needing the present of both syntax elements irrespective of whether it is picture boundary or not and whether other CAs have already being described. This could be done by the presence of a syntax element at parameter sets called for instance "implicit_area_line_or_column_enabled_flag" or making it dependent on existence of MCTS or "motion constraint coding areas".

Summarizing the above, according to an embodiment, the data encoder 110 may, e.g., be configured to generate the indication data such that the information on the plurality of coding areas comprises one or more area column stop flags for a coding area of the one or more coding areas, wherein, if an area column stop flag of a coding area of the one or more coding areas is set to a stop value, said area column stop flag may, e.g., indicate a width of said coding area. Or, the data encoder 110 may, e.g., be configured to generate the indication data such that the information on the plurality of coding areas comprises one or more area line stop flags for a coding area of the one or more coding areas, wherein, if an area line stop flag of a coding area of the one or more coding areas is set to a stop value, said area line stop flag may, e.g., indicate a height of said coding area.

According to an embodiment, the data encoder 110 may, e.g., be configured to generate the indication data so that the indication data indicates whether an explicit signalling mode is active or whether the explicit signalling mode is inactive. If the explicit signalling mode is active, and if a coding tree unit of the one or more coding tree units of the coding area is located at a picture boundary of the picture, the data encoder 110 may, e.g., be configured to generate the indication data so that the indication data comprises at least one of the area column stop flag and an area line stop flag for said coding tree unit. If the explicit signalling mode is inactive, and if said coding tree unit of the one or more coding tree units of the coding area is located at said picture boundary of the picture, the data encoder 110 may, e.g., be configured to generate the indication data so that the indication data does not comprise the area column stop flag for said coding tree unit and/or does not comprise the area line stop flag for said coding tree unit.

Likewise, in an embodiment, the data decoder 170 may, e.g., be configured to decode the encoded picture data using information on the plurality of coding areas, said information comprising one or more area column stop flags for a coding area of the one or more coding areas, wherein, if an area column stop flag of a coding area of the one or more coding areas is set to a stop value, said area column stop flag may, e.g., indicate a width of said coding area. Or, the data decoder 170 may, e.g., be configured to decode the encoded picture data using information on the plurality of coding areas, said information one or more area line stop flags for a coding area of the one or more coding areas, wherein, if an area line stop flag of a coding area of the one or more coding areas is set to a stop value, said area line stop flag may, e.g., indicate a height of said coding area.

According to an embodiment, the data decoder 170 may, e.g., be configured to decode the encoded picture data using an indication within the indication data that indicates whether an explicit signalling mode is active or whether the explicit signalling mode is inactive. If the explicit signalling mode is inactive, and if a coding tree unit of the one or more coding tree units of the coding area is located at said picture boundary of the picture, the data decoder 170 may, e.g., be configured to decode the encoded picture data depending on the picture boundary the picture.

In the following sub-subsection "CTU scan order", a CTU scan order is described.

In the following sub-sub-subsection "raster scan", a raster scan is described.

The conventional raster scan method can be applied for CTU processing scheme when a picture is subdivided into multiple CAs. With this method and with awareness of the whole picture partitioning scheme through Coding Areas, it is possible to process the whole picture CTU line-wise. This kind of processing was already possible for Tiles in HEVC. So, in this case, the flexibility of CTU processing scheme is kept.

Thus, according to an embodiment, the coding order of each coding area of the one or more coding areas which comprises two or more coding tree units may, e.g., depend on a raster scan, and the data encoder 110 may, e.g., be configured to generate the indication data such that the indication data indicates that the raster scan has been employed to encode each coding area of the one or more coding areas which comprise two or more coding tree units.

Likewise, according to an embodiment, the coding order of each coding area of the one or more coding areas which comprises two or more coding tree units may, e.g., depend on a raster scan, and the data decoder 170 may, e.g., be configured to decode the encoded picture data depending on the raster scan, wherein the data decoder 170 may, e.g., configured to receive the information that indicates that the raster scan has been employed to encode each coding area of the one or more coding areas which comprise two or more coding tree units, wherein the indication data may, e.g., comprise said information.

In the following sub-sub-subsection "diagonal scan", a diagonal scan is described.

However, the conventional raster scan order imposes restrictions on the availability of spatial references. To improve this, in an embodiment, a diagonal scan is employed as an additional CTU processing scheme.

To derive the diagonal scan, we use, from [2], the generalized handling of the dependency to upper CTU-line: the CTU_dependency_offset_id ([2]).

A block correspondent to $CTU_{X_{ref},Y_{ref}}$ is available for reference, when the $CTU_{X_{ref},Y_{ref}}$ is available for prediction for the current $CTU_{X_{cur},Y_{cur}}$ when the reference is not restricted, e.g. located in a different slice, tile, or outside the picture and the following condition is true:

In WPP case:

$$(Y_{ref}=Y_{cur} \text{ AND } X_{ref} \leq X_{cur}) \text{ OR}$$

$$(Y_{ref} \neq Y_{cur} \text{ AND } X_{ref} < ((Y_{curr}-Y_{ref})*(CTU\_\text{dependency\_offset\_}id-1)+X_{cur}))$$

In sequential processing order case:

$$(Y_{ref}-Y_{cur} \text{ AND } X_{ref} \leq X_{cur}) \text{ OR}$$

$$(Y_{ref}<Y_{cur} \text{ AND } X_{ref} < ((Y_{curr}-Y_{ref})*(CTU\_\text{dependency\_offset\_}id-1)+X_{cur}+1))$$

or $$(Y_{ref}>Y_{cur} \text{ AND } X_{ref} < ((Y_{curr}-Y_{ref})*(CTU\_\text{dependency\_offset\_}id-1)+X_{cur})),$$

where $X_{ref}$, $Y_{ref}$, $X_{cur}$, $Y_{cur}$ are CTU position coordinates.

The described above, upper neighbor block offset restriction can be used to derive the CTU processing order. The resulting various CTU-scans are variants of the diagonal scan with a particular slope or angle, where the slope is given either by a fix value or is controlled by a syntax element transmitted in the bit-stream or derived from syntax elements already present in the bit-stream.

Figure 12:
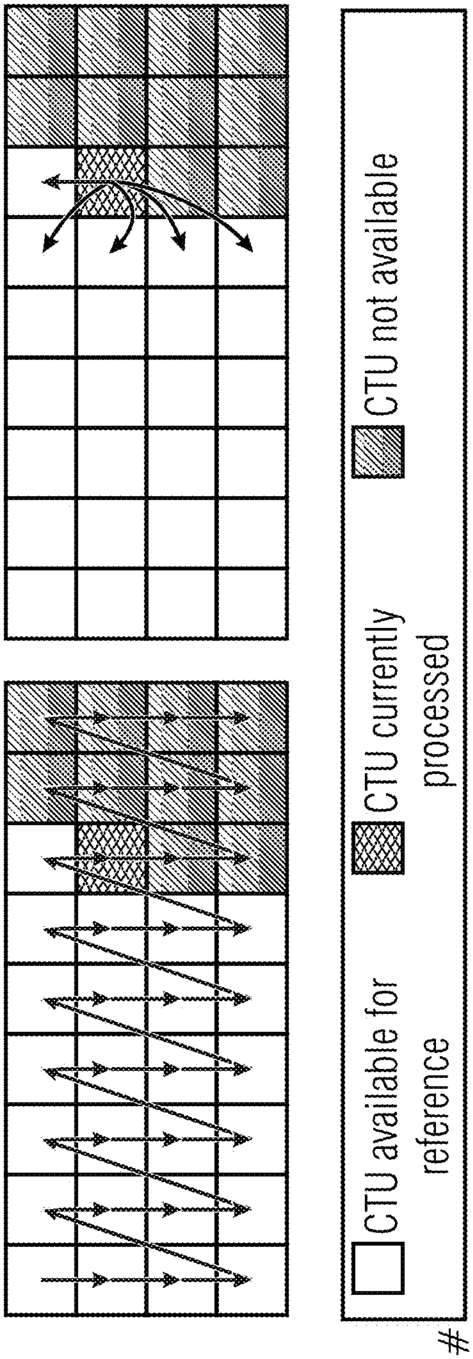
FIG. 12 illustrates a CTU scan-order and spatial references for CTU_dependency_offset_id=1 according to an embodiment.

FIG. 12 illustrates a CTU scan-order and spatial references for CTU_dependency_offset_id=1 according to an embodiment.

Figure 13:
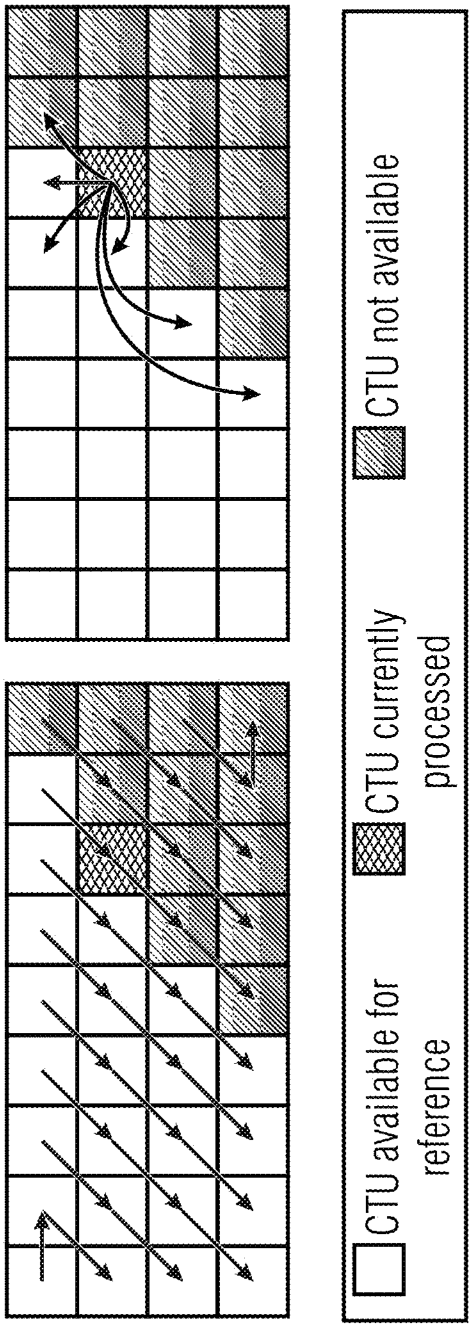
FIG. 13 illustrates another CTU scan-order and spatial references for CTU_dependency_offset_id=2 according to another embodiment.

FIG. 13 illustrates another CTU scan-order and spatial references for CTU_dependency_offset_id=2 according to another embodiment.

As shown in FIG. 12 and FIG. 13 below, different types of CTU-scans can be generated. The default scan direction is running from left to right diagonal downward and can be generated by the following algorithm (Matlab@):

```
Slope = CTU_dependency_offset_id - 1;
A=repmat(1:NumCTUColumns,NumCTURows,1)+repmat((0:NumCTUColumns:(NumCTUCol
umns*(NumCTURows-1)))',1,NumCTUColumns)
scan      = zeros(1,numel(A)); % raster scan idxes
scanXY = zeros(2,numel(A));
idx = 1;
x = 1; y = 1;
while not(all(size(A)==[y x]))
    if y <= NumCTURows && x <= NumCTUColumns
            % scan it
        scan(idx)       = A(y,x);
        scanXY(:,idx) = [x, y]';
        idx             = idx + 1;
    else
            % ignore it
    end
    if x > Slope
        if y < NumCTURows
            x = x - Slope;
            y = y + 1;
        else
            x = x + ( NumCTURows - 1 ) * Slope + 1;
            y = 1;
        end
    else
        if y == 1
            x = x + 1;
        else
            if x <= Slope | | y == NumCTURows
                x = x + ( y - 1 ) * Slope + 1;
                y = 1;
            end
        end
    end
end
% scan it
scan(idx)       = A(y,x);
scanXY(:,idx) = [x, y]';
idx             = idx + 1;
```

Below are shown the exemplary scans and availability of spatial references for some CTU_dependency_offset_id values.

Summarizing the above:

According to an embodiment, the coding order of a coding area of the one or more coding areas which comprises two or more coding tree units may, e.g., depend on a scan order that depends on a slope indicating an angle. After encoding a first one of the two or more coding tree units of said coding area, the data encoder 110 may, e.g., be configured to determine a second one of the two or more coding tree units within the coding area depending on a position of the first one of the coding tree units of said coding area, depending on the other coding tree units of said coding area which have not been encoded and depending on the slope. The data encoder 110 may, e.g., be configured to encode said second one of the two or more coding tree units.

In an embodiment, the data encoder 110 may, e.g., be configured to determine a second one of the two or more coding tree units within the coding area, such that an arrow, being defined by a starting point and by the slope, wherein the starting point may, e.g., be a position of the first one of the coding tree units within the coding area, points to a position of the second one of the two or more coding tree units.

According to an embodiment, the data encoder 110 may, e.g., be configured to generate the indication data such that the indication data indicates that a diagonal scan has been employed to encode each coding area of the one or more coding areas which comprise two or more coding tree units.

Likewise, according to an embodiment, the coding order of a coding area of the one or more coding areas which comprises two or more coding tree units may, e.g., depend on a scan order that depends on a slope indicating an angle. The indication data may, e.g., comprise said information on the coding area, wherein, after decoding a first one of the two or more coding tree units of said coding area, the data decoder 170 may, e.g., be configured to determine a second one of the two or more coding tree units within the coding area depending on a position of the first one of the coding tree units of said coding area, depending on the other coding tree units of said coding area which have not been decoded and depending on the slope. The data decoder 170 may, e.g., be configured to decode said second one of the two or more coding tree units.

According to an embodiment, the data decoder 170 may, e.g., be configured to determine a second one of the two or more coding tree units within the coding area, such that an arrow, being defined by a starting point and by the slope. The starting point may, e.g., be a position of the first one of the coding tree units within the coding area, points to a position of the second one of the two or more coding tree units.

In an embodiment, the data decoder 170 may, e.g., be configured to receive information indication data which indicates that a diagonal scan has been employed to encode each coding area of the one or more coding areas which comprise two or more coding tree units, wherein the indication data may, e.g., comprise said information.

In the following sub-sub-subsection "Z-Scan", a Z-Scan is described.

Figure 14:
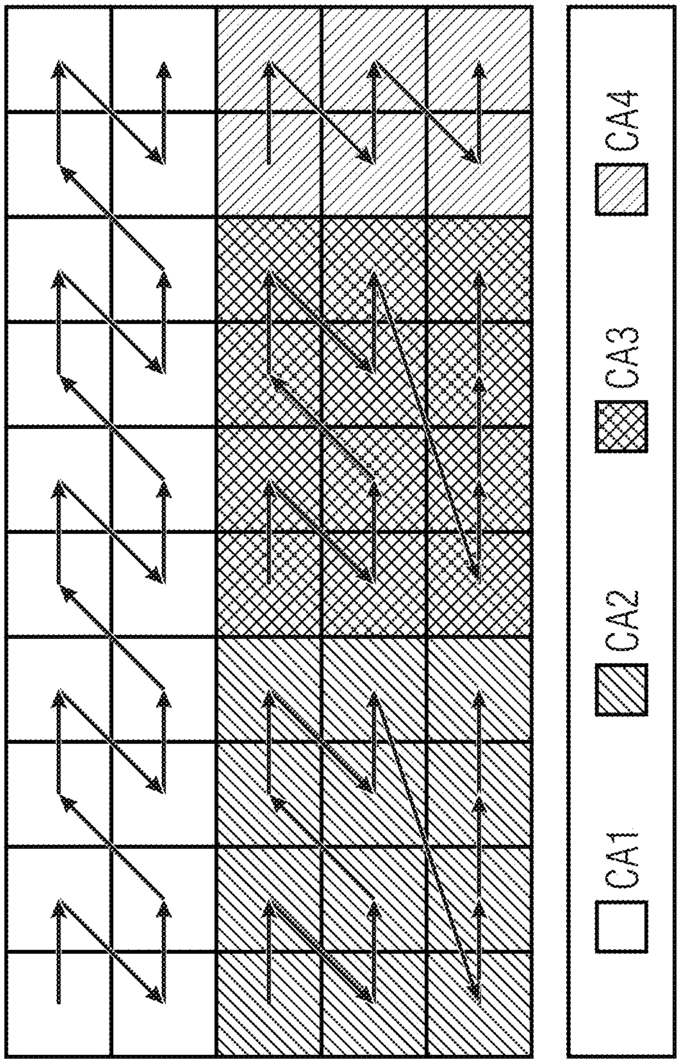
FIG. 14 illustrates coding areas with Z-Scan CTU order according to an embodiment.

FIG. 14 illustrates coding areas with Z-Scan CTU order according to an embodiment.

In such an embodiment, the Z-Scan can be used for CTU-scan-order instead of proposed diagonal scan. The Z-Scan is defined in HEVC.

According to an embodiment, the coding order of a coding area which comprises five or more coding tree units may, e.g., depend on a scan order, said scan order depending on a first angle being 0° and depending on a second angle being 135°, and depending on a third angle being 45°.

After encoding a first coding tree unit of said coding area, the data encoder 110 may, e.g., be configured to determine a second coding tree unit of said coding tree area, such that a first arrow that has first starting point at a position of the first coding tree unit within said coding area encloses the first angle being 0° with respect to a predefined direction, and such that the first arrow points to said second coding tree unit within the coding area, and the data encoder 110 is configured to encode said second coding tree unit of said coding area.

After encoding the second coding tree unit of said coding area, the data encoder 110 may, e.g., be configured to determine a third coding tree unit of said coding tree area, such that a second arrow that has second starting point at a position of the second coding tree unit within said coding area encloses the second angle being 135° with respect to said predefined direction, and such that the second arrow points to said third coding tree unit within the coding area, and the data encoder 110 is configured to encode said third coding tree unit of said coding area.

After encoding the third coding tree unit of said coding area, the data encoder 110 may, e.g., be configured to determine a fourth coding tree unit of said coding tree area, such that a third arrow that has third starting point at a position of the third coding tree unit within said coding area encloses the first angle being 0° with respect to said predefined direction, and such that the third arrow points to said fourth coding tree unit within the coding area, and the data encoder 110 is configured to encode said fourth coding tree unit of said coding area.

In a particular embodiment, after encoding the fourth coding tree unit of said coding area, the data encoder 110 may, e.g., be configured to determine a fifth coding tree unit of said coding tree area, such that a fourth arrow that has fourth starting point at a position of the fourth coding tree unit within said coding area encloses the third angle being 45° with respect to said predefined direction, and such that the fourth arrow points to said fifth coding tree unit within the coding area, and the data encoder 110 is configured to encode said fifth coding tree unit of said coding area.

In an embodiment, the data encoder 110 may, e.g., be configured to generate the indication data such that the indication data indicates that a z-scan has been employed to encode each said area of the one or more coding areas which comprises five or more coding tree units.

Likewise, according to an embodiment, the coding order of a coding area which comprises five or more coding tree units may, e.g., depend on a scan order, said scan order depending on a first angle being 0° and depending on a second angle being 135°, and depending on a third angle being 45°.

After decoding a first coding tree unit of said coding area, the data decoder 170 may, e.g., be configured to determine a second coding tree unit of said coding tree area, such that a first arrow that has first starting point at a position of the first coding tree unit within said coding area encloses the first angle being 0° with respect to a predefined direction, and such that the first arrow points to said second coding tree unit within the coding area, and the data decoder 170 is configured to decode said second coding tree unit of said coding area.

After decoding the second coding tree unit of said coding area, the data decoder 170 may, e.g., be configured to determine a third coding tree unit of said coding tree area, such that a second arrow that has second starting point at a position of the second coding tree unit within said coding area encloses the second angle being 135° with respect to said predefined direction, and such that the second arrow points to said third coding tree unit within the coding area, and the data decoder 170 is configured to decode said third coding tree unit of said coding area.

After decoding the third coding tree unit of said coding area, the data decoder 170 may, e.g., be configured to determine a fourth coding tree unit of said coding tree area, such that a third arrow that has third starting point at a position of the third coding tree unit within said coding area encloses the first angle being 0° with respect to said predefined direction, and such that the third arrow points to said fourth coding tree unit within the coding area, and the data decoder 170 is configured to decode said fourth coding tree unit of said coding area.

In a particular embodiment, after decoding the fourth coding tree unit of said coding area, the data decoder 170 may, e.g., be configured to determine a fifth coding tree unit of said coding tree area, such that a fourth arrow that has fourth starting point at a position of the fourth coding tree unit within said coding area encloses the third angle being 45° with respect to said predefined direction, and such that the fourth arrow points to said fifth coding tree unit within the coding area, and the data decoder 170 is configured to decode said fifth coding tree unit of said coding area.

According to an embodiment, the data decoder 170 may, e.g., be configured to receive information which indicates that a z-scan has been employed to encode each said area of the one or more coding areas which comprises five or more coding tree units, wherein the indication data may, e.g., comprise said information.

In the following sub-sub-subsection "scan directions", scan directions are described.

In another embodiment, the direction of the scan can be flexible, for example, range from right to left diagonal downwards; resp. from right to left diagonal upwards; or from left to right diagonal upwards. The scan direction can be transmitted in the bitstream using the new syntax element CTU scan direction, or can be derived from syntax elements already present in the bit-stream.

In another embodiment, the scan direction is derived by evaluating the adjacent neighborhood of the first slice CTU addressed by coding area start address with the constraint of a strict slice order.

If the first slice CTU has a CTU neighbor adjacent to its bottom boundary, or the first slice CTU is located in the bottom CTU-line of the picture, and has no adjacent neighbors to the right and is not located in the rightmost CTU-column, then the CTU scan is a right upwards scan.

If the first slice CTU has a CTU neighbor adjacent to its bottom boundary, or the first slice CTU is located in the bottom CTU-line of the picture, and has an adjacent neighbor to the right or is located in the rightmost column of the picture, then the CTU scan is a left upwards scan.

Otherwise if a CTU neighbor right to the first slice CTU is available or if the first slice CTU is located in the rightmost column of the picture then the scan is left-downwards. In all other cases the CTU scan is right-downwards.

Figure 15:
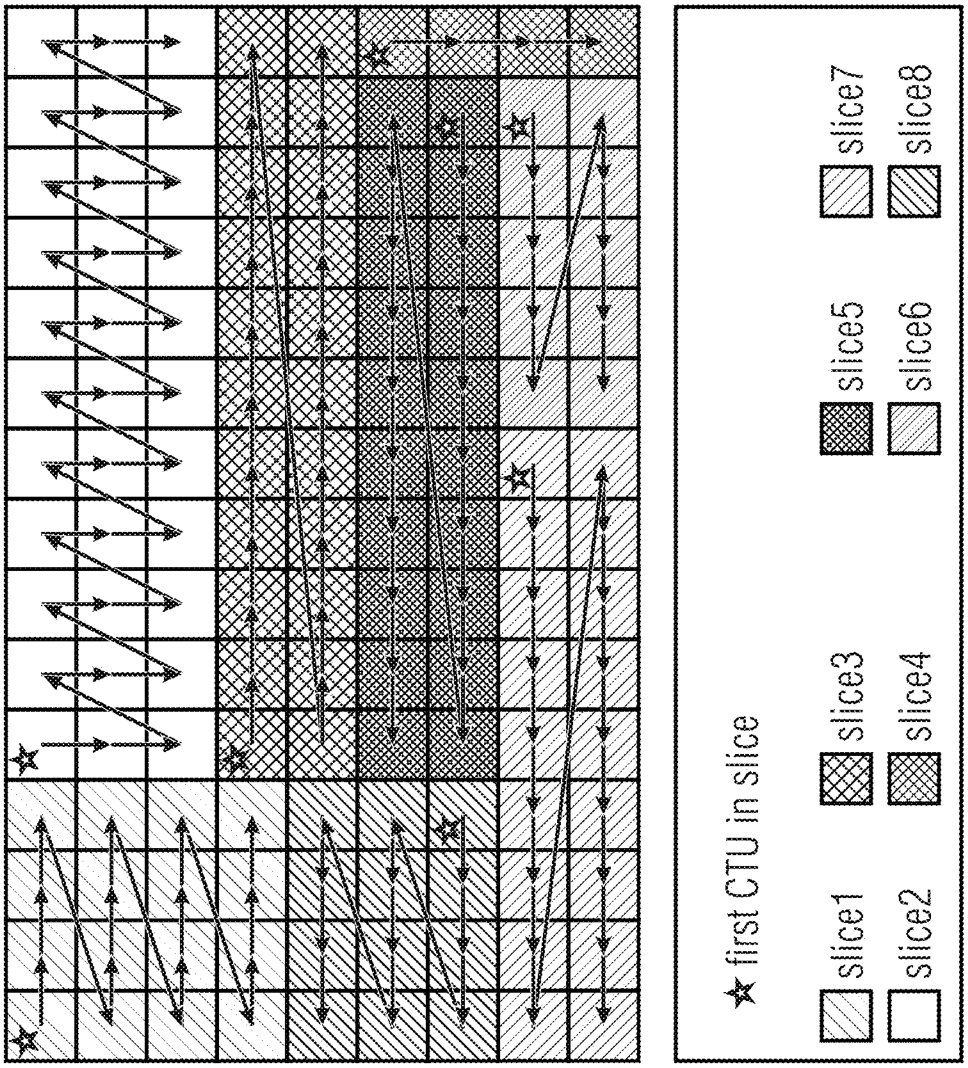
FIG. 15 illustrates implicit CTU scan direction derivation according to another embodiment.

FIG. 15 illustrates implicit CTU scan direction derivation according to another embodiment.

In such another embodiment, the above described invented derivation scheme is further refined by evaluating the number of available CTU-neighbors along a potential Coding Area boundary. As for example the first slice CTU is located at a position with left and above CTU neighbors the scan could be a right-downwards scan or a downward-right scan and thus the number of potentially (if the dimension of the CA is unknown) available CTU neighbors along the Coding Area boundary in vertical and horizontal direction are summed up individually. If the sum of vertical neighbors exceeds the number of horizontal CTU neighbors a downward-right scan is used otherwise the scan is a right-downward scan. This derivation scheme is exemplary shown in FIG. 15 using raster scan.

In another embodiment, the above described invented derivation scheme and the refinement are used to form an ordered list of possible scans where an index is transmitted at slice level that selects the CTU-scan. Additionally, if within a picture different diagonal scans are utilized, the CTU_dependency_offset_id has to be coded in the slice header.

Figure 16:
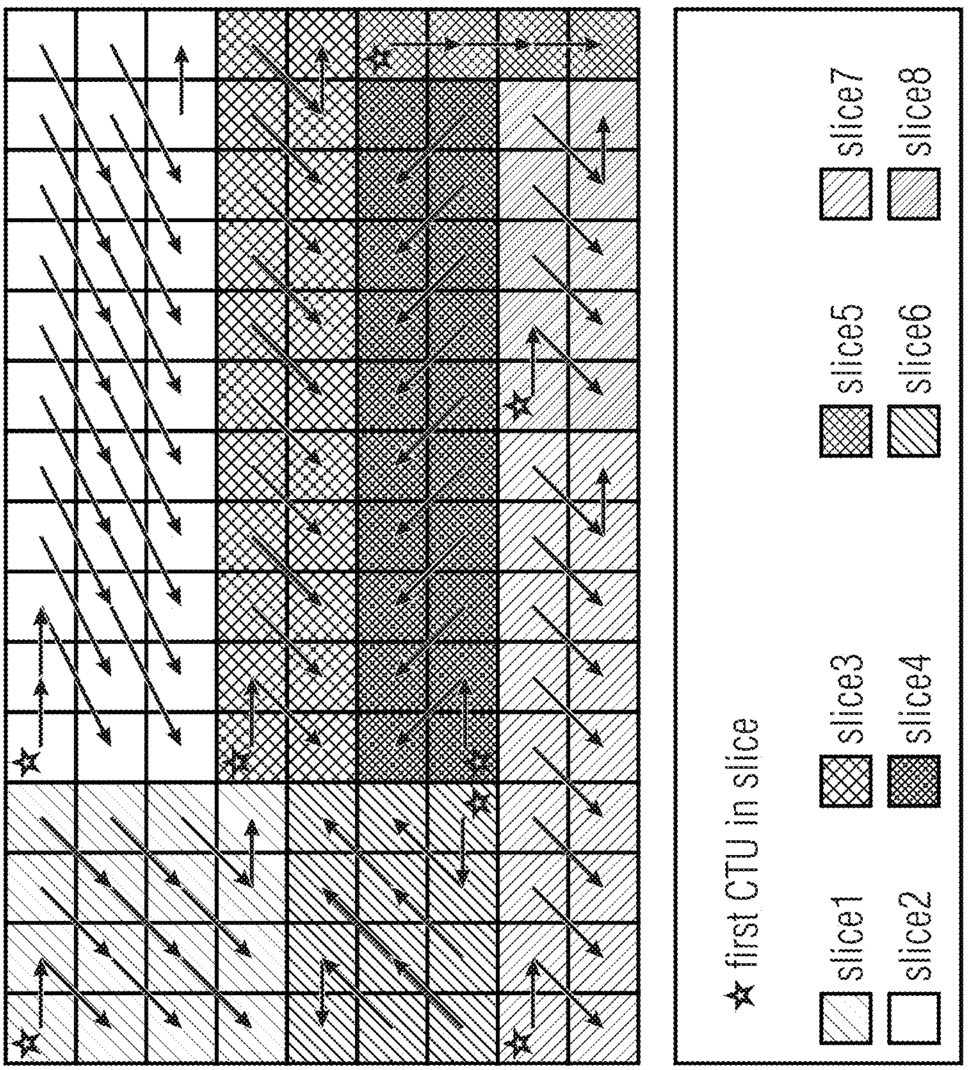
FIG. 16 illustrates coding areas with different CTU-scan directions according to an embodiment.

FIG. 16 illustrates coding areas with different CTU-scan directions according to an embodiment.

In particular, FIG. 16 illustrates an example for using various scan orientations within a picture.

Summarizing the above:

According to an embodiment, the coding order of a coding area of the one or more coding areas which comprises two or more coding tree units may, e.g., depend on a scan order comprising one or more scan directions. After encoding a first coding tree unit of said coding area, the data encoder 110 may, e.g., be configured to determine a second coding tree unit of said coding tree area depending on a position of the first coding tree unit and depending on a first one of the one or more scan directions, and the data encoder 110 is configured to encode said second coding tree unit of said coding area.

In an embodiment, the data encoder 110 may, e.g., be configured to generate the indication data such that the indication data indicates said scan order comprising the one or more scan directions.

According to an embodiment, the data encoder 110 may, e.g., be configured to derive a scan direction of the one or more scan directions by evaluating an adjacent neighborhood of a first coding tree unit of said coding area. If the first coding tree unit has a coding tree unit neighbor of the two or more coding tree units adjacent to its bottom boundary, or if the first coding tree unit is located in a bottom coding tree unit line of the picture, and has no adjacent neighbors to a right and is not located in a rightmost coding tree unit column, then the scan direction may, e.g., be a right upwards scan. If the first coding tree unit has a coding tree unit neighbor of the two or more coding tree units adjacent to its bottom boundary, or if the first coding tree unit is located in a bottom coding tree unit line of the picture, and has an adjacent neighbor to the right or is located in a rightmost column of the picture, then the scan direction may, e.g., be a left upwards scan. If a coding tree unit neighbor of the two or more coding tree units right to the first coding tree unit is available, or if the first coding tree unit is located in the rightmost column of the picture then the scan direction may, e.g., be left-downwards. Otherwise, the scan direction may, e.g., be right-downwards.

In an embodiment, the data encoder 110 may, e.g., be configured to generate the indication data such that the indication data indicates an index which indicates a selected scan direction of the one or more scan directions.

Likewise, according to an embodiment, the coding order of a coding area of the one or more coding areas which comprises two or more coding tree units may, e.g., depend on a scan order comprising one or more scan directions. After decoding a first coding tree unit of said coding area, the data decoder 170 may, e.g., be configured to determine a second coding tree unit of said coding tree area depending on a position of the first coding tree unit and depending on a first one of the one or more scan directions, and the data decoder 170 may, e.g., be configured to decode said second coding tree unit of said coding area.

In an embodiment, the data decoder 170 may, e.g., be configured to receive information which indicates said scan order comprising the one or more scan directions, wherein the indication data may, e.g., comprise said information.

According to an embodiment, the data decoder 170 may, e.g., be configured to derive a scan direction of the one or more scan directions by evaluating an adjacent neighborhood of a first coding tree unit of said coding area. If the first coding tree unit has a coding tree unit neighbor of the two or more coding tree units adjacent to its bottom boundary, or if the first coding tree unit is located in a bottom coding tree unit line of the picture, and has no adjacent neighbors to a right and is not located in a rightmost coding tree unit column, then the scan direction may, e.g., be a right upwards scan. If the first coding tree unit has a coding tree unit neighbor of the two or more coding tree units adjacent to its bottom boundary, or if the first coding tree unit is located in a bottom coding tree unit line of the picture, and has an adjacent neighbor to the right or is located in a rightmost column of the picture, then the scan direction may, e.g., be a left upwards scan. If a coding tree unit neighbor of the two or more coding tree units right to the first coding tree unit is available, or if the first coding tree unit is located in the rightmost column of the picture then the scan direction may, e.g., be left-downwards. Otherwise, the scan direction may, e.g., be right-downwards.

In an embodiment, the data decoder 170 may, e.g., be configured to receive information which indicates an index which indicates a selected scan direction of the one or more scan directions, wherein the indication data may, e.g., comprise said information.

In the following sub-subsection "dependent coding areas", dependent coding areas are described.

Figure 17:
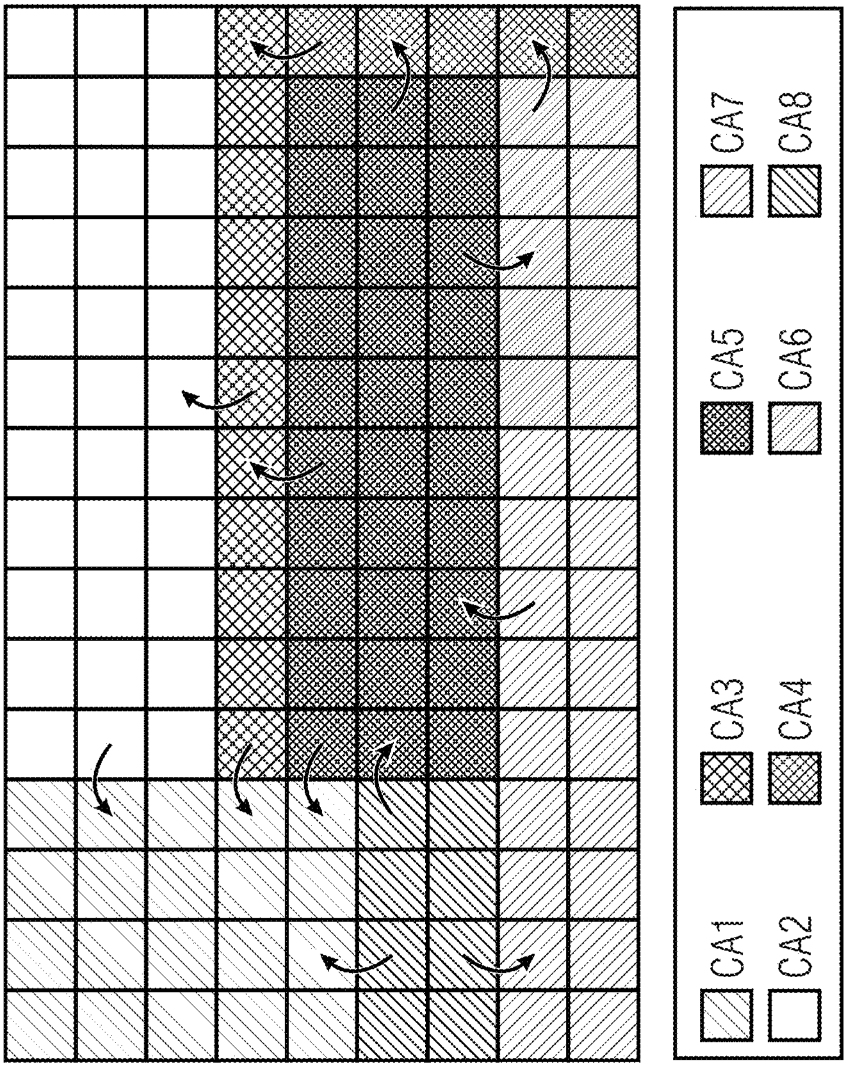
FIG. 17 illustrates dependent coding areas with inter-region prediction options according to an embodiment.

FIG. 17 illustrates dependent coding areas with inter-region prediction options according to an embodiment.

In such an embodiment, within the picture, to exploit spatial prediction capabilities, one Coding Area can have dependencies to another Coding Area. In this case a particular processing order of areas may, e.g., be needed to facilitate the deterministic behavior. This can be done, for example, by the signaling of the area order using a new syntax element area_order_idx for each CA that explicitly determines the dependency order. Alternatively, the dependency order can be derived directly from the order of the CAs as signaled in the coding_area_arrangement( ) syntax, see sub-subsection "size and arrangement of coding areas".

The value of area_order_idx can be interpreted as follows: areas with a higher area_order_idx values depend on areas with lower area_order_idx values or vice versa.

Summarizing the above:

In an embodiment, the data encoder 110 may, e.g., be configured to encode the picture by encoding image data of the picture within each coding area of the plurality of coding areas to obtain the encoded picture data. The data encoder 110 may, e.g., be configured to encode the image data of the picture of at least one of the plurality of coding areas such that encoding the image data of said at least one of the plurality of coding areas depends on the encoding of the image data of at least another one of the plurality of coding areas.

Likewise, in an embodiment, the data decoder 170 may, e.g., be configured to decode the encoded picture data of at least one of the plurality of coding areas such that decoding the encoded picture data of said at least one of the plurality of coding areas depends on the decoding of the encoded picture data of at least another one of the plurality of coding areas.

In the following sub-subsection "parallel processing of coding areas", parallel processing of coding areas is described.

Coding Areas are also capable of parallel processing support. The obvious use case for parallelization is using multiple non-depending Coding Areas. In this case dependencies for parsing or reconstruction of the comprised CTUs of one CA into any other CA is forbidden, adjacent CU that are assigned to a different CA are treated as not available for reference. In this case post-processing filters might be applied to CA individually or per picture, depending on filter_over_ca_boundaries_flag. This syntax element works in the same manner like the loop_filter_across_tiles_enabled_flag used in HEVC.

Figure 18:
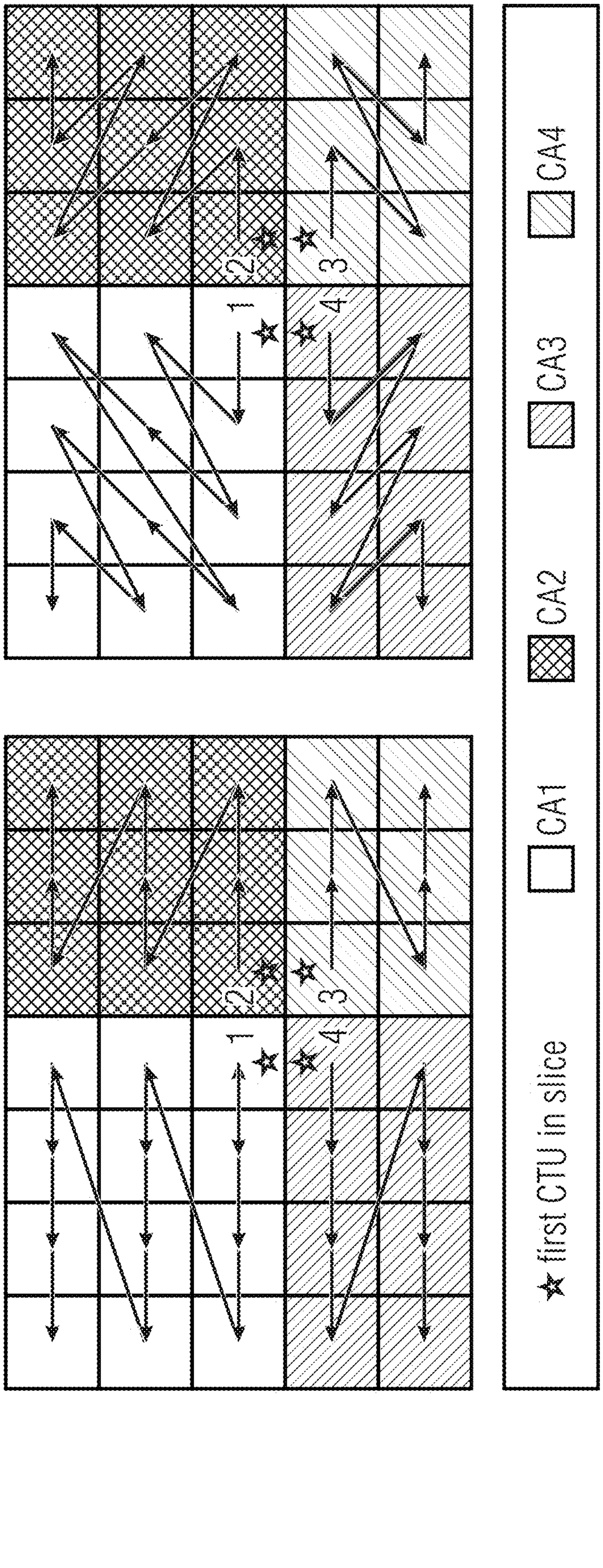
FIG. 18 illustrates parallel processing of dependent coding areas according to an embodiment ((A) CTU Raster Scan; (B) CTU Diagonal Scan).

FIG. 18 illustrates parallel processing of dependent coding areas according to an embodiment ((A) CTU Raster Scan; (B) CTU Diagonal Scan).

In the case of dependent Coding Areas, processing schemes as shown in FIG. 18, can be used to exploit spatial dependencies in the picture and to reduce possible artifacts on cross-area boundaries. To use Inter-CA dependencies a clear order of CTU processing may, e.g., be needed, resulting in a reliable availability of CTUs from adjacent CAs.

The order to process the CA's might be given implicitly by the order of CA transmitted in the bitstream. Furthermore, the order of CAs could also be explicitly stated by a symbol transmitted in the bitstream.

Figure 19:
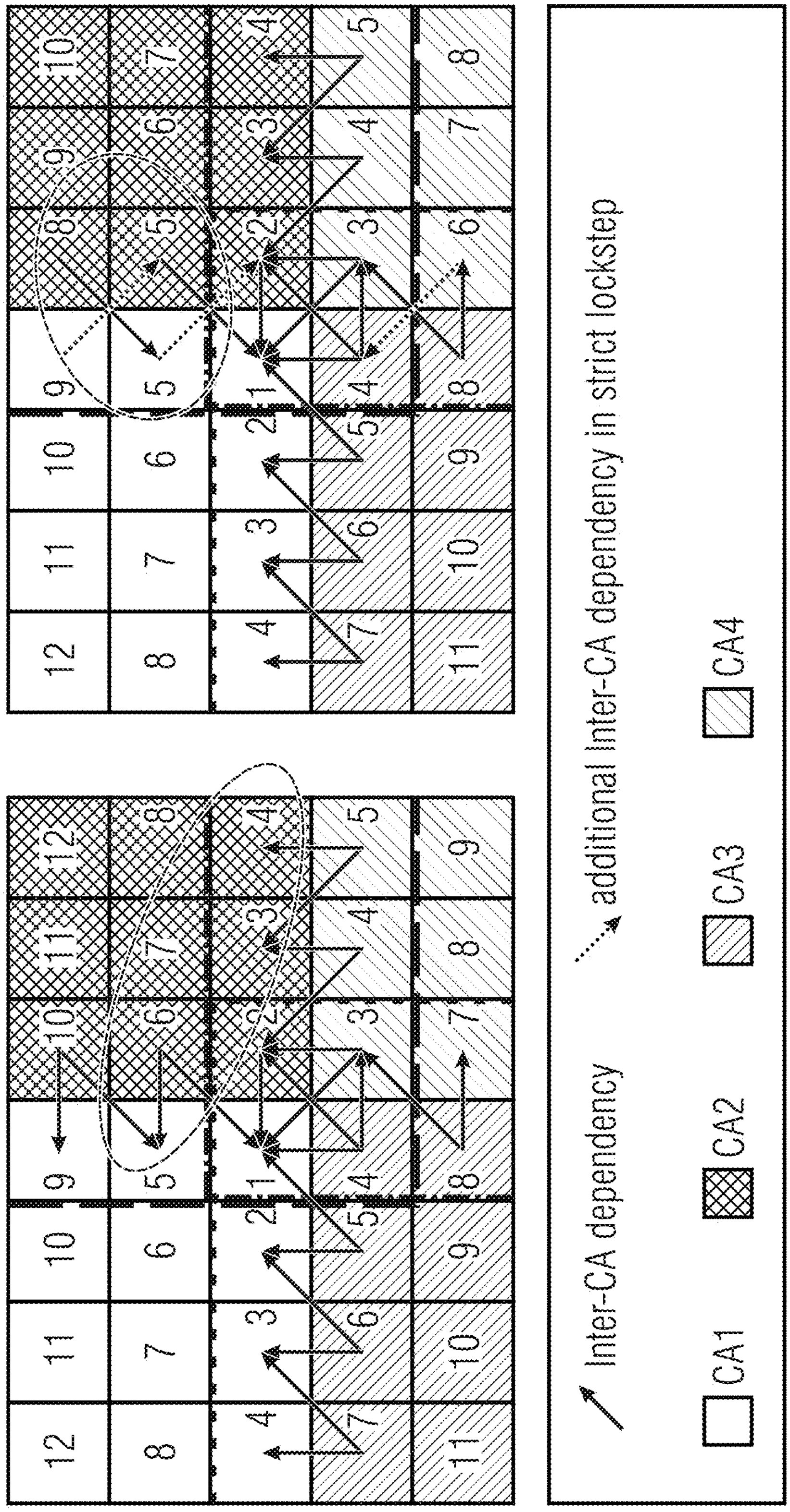
FIG. 19 illustrates an execution order and inter CA dependencies according to an embodiment ((A) Dependency Driven; (B) Lockstep).

Two major CTU execution concepts are shown in FIG. 19.

FIG. 19 illustrates an execution order and inter CA dependencies according to an embodiment ((A) Dependency Driven; (B) Lockstep).

In the following, a lockstep pipeline is described.

The pipe line concept assumes the parsing and reconstruction and/or post-filtering following a lockstep execution scheme. A global event is used to start the execution step of a CTU for each thread, where in each step a single CTU is processed in each CA. This scheme guarantees maximum throughput at the cost of unavailable CTU references as depicted in FIG. 19 (B), where direct neighboring CTUs in the $1^{st}$ and $2^{nd}$ CA are processed simultaneous and thus are unavailable for reference in either direction.

But, if strict lockstep execution is enforced additional Inter-CA dependencies become available as shown by the light blue arrows.

In the following, dependencies driven concepts are described.

This concept relies on the local availability of the Inter-CA CTU neighbors. If a reference CTU in an adjacent neighbor CA is not available, although it should be available for reference the execution of this particular CA is stalled until the reference CTU becomes available by complete parsing resp. reconstruction. This can be seen in FIG. 19 (A) where for example the processing of the $2^{nd}$ CA is halted for the $5^{th}$ execution step because the reference CTU of the first CA is processed in the $5^{th}$ execution step and available earliest in the $6^{th}$ execution step.

Furthermore, parallel processing can be extended to the operation of post-processing filters using the dependent CA processing scheme. For CTU inner boundaries (CU boundaries) the default filter process can be applied. In contrast, the CTU boundaries are filtered when the $2^{nd}$ CTU in processing order is been filtered and thus filter strength at the boundary can be determined as well as the samples for filtering are available. In case when the CA cross-boundary filtering is enabled or in case of dependent CA, this rule is also applied for CA cross-boundary filtering. Deblocking filters reaching over CTU boundaries are processed in an analogue way as parsing and reconstruction is performed by considering the availability of reference CTUs in adjacent CAs. If a CTU in an adjacent CA is available the portion of the area that has not been filtered in advance is filtered in the current filtering process.

Figure 20:
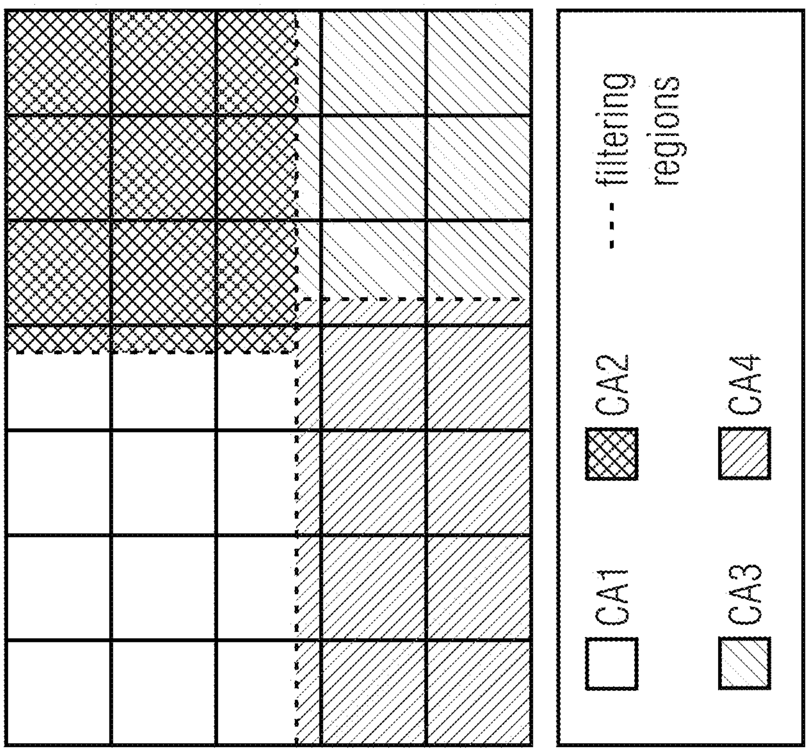
FIG. 20 illustrates a deblocking filter process on CA boundaries with respect to the CA order according to an embodiment.

FIG. 20 illustrates a deblocking filter process on CA boundaries with respect to the CA order according to an embodiment.

Figure 21:
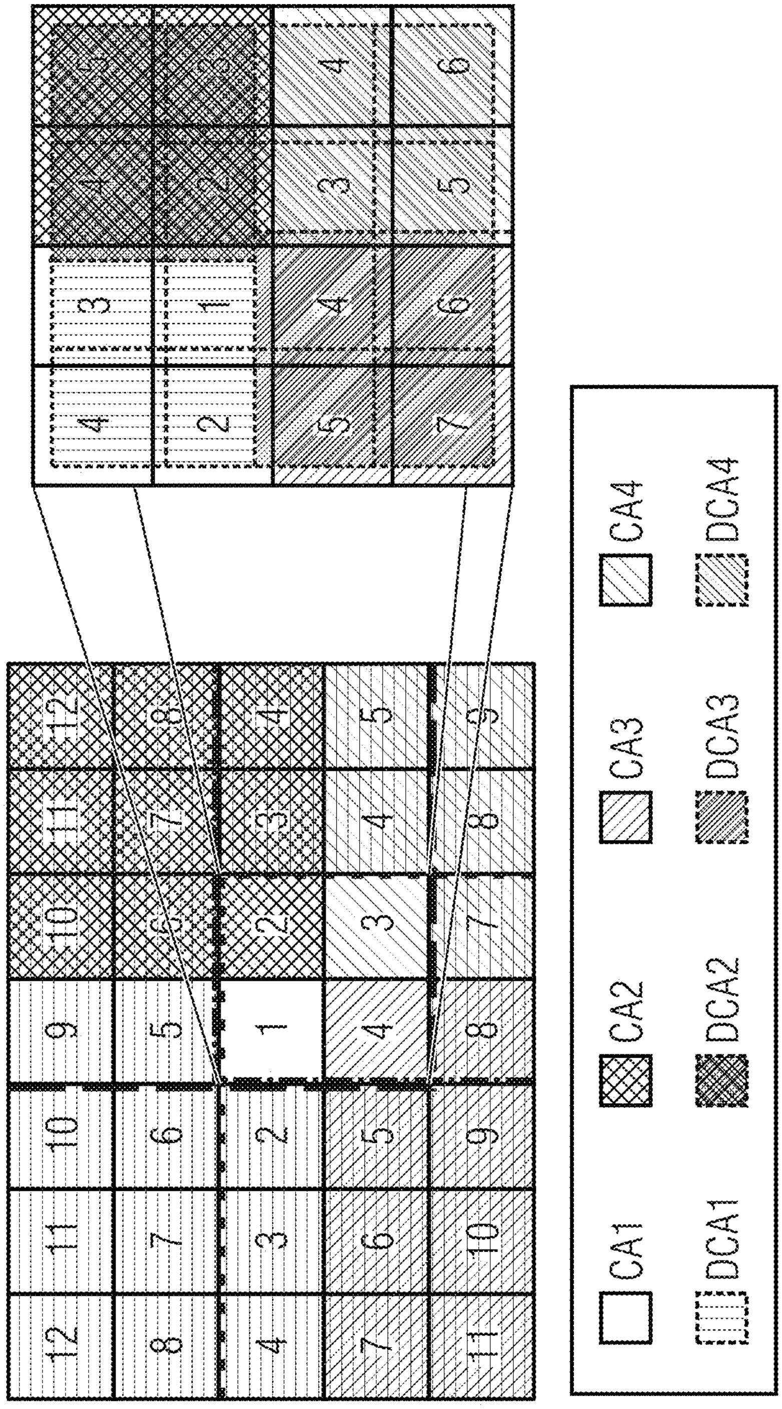
FIG. 21 illustrates a deblocking filter employing inter-CA filtering with hatched filter regions according to an embodiment.

FIG. 21 illustrates a deblocking filter employing inter-CA filtering with hatched filter regions according to an embodiment.

As depicted in FIG. 21, in the first processing step only the CTU (1) in the first CA can be filtered. The filtering for this CTU is restricted to inner-boundaries since no CTU-neighbors are available. In the $2^{nd}$ execution step the second CTU in the first CA filters its inner boundaries as well as the CTU-boundary to the first CTU in the $1^{st}$ CA. Additionally the left bottom CTU of the $2^{nd}$ CA is filtering its inner boundaries as well as the CA overlapping CTU-boundary to the first CTU in the $1^{st}$ CA. One effect of this parallel processing is to enable low-delay operation of the deblocking filter. The cross-CA boundary filtering deblocking can commence before entire CAs are decoded and thereby the overall processing time before a picture region can be used reference picture for further pictures can be decreased.

In the following sub-subsection "error resiliency aspects", error resiliency aspects are described.

As mentioned in section "VCL partitioning according to the state of the art", error resiliency is a desirable feature in video coding when the storage or transport mechanism in an application is unreliable. However, many applications such as HTTP streaming exist today, in which less error resilience may, e.g., be needed as, for instance, in RTP/UDP streaming with packet losses or typical broadcast channels with bit- or burst-errors. For HTTP streaming, coded video is typically segmented n*GOP-wise and missing segments trigger buffer stalling on receiver side until the respective segment is successfully retransmitted. In the latter scenario, it is desirable to introduce further dependencies inside the coded data for the profit of increased coding efficiency while losing some error resilience capabilities. For instance, the scan order derivation aspect based on neighboring CAs as described in sub-sub-subsection "scan directions", may, e.g., need availability of the neighboring CAs on receiver side before the current CA can be correctly decoded. Hence, such techniques should only be used if limited error resilience is tolerable. Likewise, the aspect concerning dependent coding areas as in sub-subsection "dependent coding areas", introduces dependencies that impact error resilience as well as the parallelization aspects and processing orders described in sub-subsection "parallel processing of coding areas". Other state-of-the-art techniques in this regard have to deal with the same trade-off, for instance, in-picture translation-compensated prediction such as IBC in HEVC SCC or other intra-prediction techniques that facilitate samples within the picture that are further distanced from the current block then in regular intra-prediction. Also on sequence level, there are further techniques known to increase coding efficiency at the price of an error resilience impact, e.g. sharing state of entropy coding entities such as CABAC context models over pictures for instance and so on.

In a system that incorporates transmission of coded video, the information about the degree of error resilience that a coded video stream provides can be utilized in various ways, e.g. a media-aware middle box can trigger early retransmission or an end-device can choose between error mitigation strategies such as frame-level slice-based error concealment through frame subsection copy or buffering until successful retransmission or skipping the decoding of parts (individual AUs, AUs associated to a PPS or otherwise, AUs associated to an SPS or forming a CVS) of a bitstream. It is therefore desirable to indicate to a middle box or the client end-device, the degree of error resilience that a coded video stream provides. Another use of the error concealment degree in a coded video sequence is for a service operator to decide whether a certain coded stream is suitable for an envisioned transmission system, e.g. a stream encoded for HTTP streaming may perform vary poorly when transmitted via a burst-error prone satellite broadcast channel.

Currently, this information cannot be easily accessed in coded streams using state-of-the-art codecs as a myriad of parameters determines the error resilience, take for instance the non-exhaustive list of examples above. Some individual parameters may be derived from parameter sets, others may, e.g, need parsing high-level syntax on picture basis, while others may, e.g., even need low-level syntax parsing. Also, most of the investigated parameters are not signalled with information about the encoder decisions for the remainder of the coded video sequence but have a limited scope. For instance, the partitioning decision may chance from picture to picture. A corrupted stream may even not bear the needed information anymore.

Embodiments provide a easily accessible indication of a degree of error resilience of a coded video sequence. Some embodiments provide a coding constraint for the coded video on relevant tools that impact error resilience and error mitigation strategies. A middle-box or a client end-device could interpret the indication as guarantee that the video encoder excluded certain options from his decision space that would otherwise impact error resilience. Service provides can interpret such information as to for which transmission system a coded stream is suitable.

In an embodiment, a single flag in the easily accessible high-level syntax of a coded video as in the following is provided, e.g., as follows.

| | Descriptor |
|---|---|
| sequence_parameter_set_rbsp( ) { | |
| [ ... ] | |
| sps_error_resiliency_enabled_flag | u(1) |
| [ ... ] | |
| } | |

sps_error_resiliency_enabled_flag indicates the error resilience state of the coded video sequence. sps_error_resiliency_flag equal to 1 indicates that no active SPS in the CVS activates the use of [CodingToolSetC] and that no active PPS or AU in the CVS activates the use of [CodingToolSetB]. sps_error_resiliency_flag equal to 0 gives no such indication.

Alternatively, an embodiment provides an index into a pre-defined list of error resilience states in the easily accessible high-level syntax of a coded video as follows.

| | Descriptor |
|---|---|
| sequence_parameter_set_rbsp( ) { | |
| [ ... ] | |
| sps_error_resiliency_enabled_idx | u(2) |
| [ ... ] | |
| } | |

sps_error_resiliency_enabled_idx indicates the error resilience state of the coded video sequence according to the following table.

| Sps_error_resiliency_enabled_idx | Description | (Informative) Error tolerance, e.g. towards slice loss |
|---|---|---|
| 0 | Active SPS in the CVS that enable the use of [CodingToolSetC] and active PPS in the CVS that enable the use of [CodingToolSetB] and AUs in the CVS that make use of [CodingToolSetA] are allowed. | Lowest, skip decoding AUs till random access |

-continued

| Sps_error_resiliency_enabled_idx | Description | (Informative) Error tolerance, e.g. towards slice loss |
|---|---|---|
| 1 | Active SPS in the CVS that enable the use of [CodingToolSetC] are disallowed, but AUs in the CVS that make use of [CodingToolSetA] and active PPS in the CVS that activate [CodingToolSetB] are allowed. | Higher than 0, skip decoding of AUs associated with PPS until random access |
| 2 | Active SPS in the CVS that enable the use of [CodingToolSetC] and active PPS in the CVS that enable the use of [CodingToolSetB] are disallowed, but AUs in the CVS that make use of [CodingToolSetA] are allowed. | Higher than 1, skip AU |
| 3 | Active SPS in the CVS that enable the use of [CodingToolSetC] and active PPS in the CVS that enable the use of [CodingToolSetB] and AUs in the CVS that make use of [CodingToolSetA] are disallowed. | Highest |

AU = Access Unit;
PPS = picture parameter set;
SPS = sequence parameter set,
CVS coded video sequence Wherein the lists [CodingToolSetA], [CodingToolSetB] and [CodingToolsSetC] are defined as follows.

CodingToolSetA comprises tools that harm error resiliency on a picture-level, i.e. they introduce dependencies within a picture that prevent successful decoding in case parts of a picture are lost, e.g. dependent CAs or others.

CodingToolSetB comprises tools that harm error resiliency on a multiple-picture-level (i.e. the scope of a PPS), i.e. they introduce dependencies between the pictures that reference the PPS, so that they prevent successful decoding of any of the pictures that reference the PPS using the tool following an erroneous picture, e.g. joint entropy coding of multiple pictures such as the pictures belonging to the highest temporal layer of a GOP or others.

CodingToolsSetC comprises tools that harm error resiliency on a sequence-level (i.e. the scope of a SPS), i.e. they introduce dependencies between all pictures within a random access period, so that they prevent successful decoding of any of the pictures that reference the SPS using the tool following an erroneous picture until a random access point starting a new CVS, e.g. quantizer scaling matrices, entropy coding initialization or others.

In a further embodiment of the invention, the different modes of the indication are not linked to syntax structures activating the tools sets.

| Sps_error_resiliency_enabled_idx | Description | (Informative) Error tolerance, e.g. towards slice loss |
|---|---|---|
| 0 | Indicates that use of [CodingToolSetA], [CodingToolSetB] and [CodingToolSetC] in the CVS is allowed. | Lowest, skip decoding till random access |
| 1 | Indicates that use of [CodingToolSetC] in the CVS is disallowed, but use of [CodingToolSetA] and [CodingToolSetB] in the CVS is allowed. | Higher than 0, skip decoding as indicated |
| 2 | Indicates that use of [CodingToolSetC] and [CodingToolSetB] in the CVS is disallowed, but use of [CodingToolSetA] in the CVS is allowed. | Higher than 1, skip AU |
| 3 | Indicates that use of [CodingToolSetA], [CodingToolSetB] and [CodingToolSetC] in the CVS is disallowed. | Highest |

In addition, the scope of CodingToolSetB is indicated by further signaling that indicates the scope in amount of pictures following in coding order from a first picture. Therefore, CodingToolSetB in this embodiment comprises tools that harm error resiliency on a multiple-picture-level (wherein the respective pictures are indicated by the scope indication), i.e. they introduce dependencies between the indicated pictures, so that they prevent successful decoding of any of the pictures using the tool set following an erroneous picture, e.g. joint entropy coding of multiple pictures such as the pictures belonging to the highest temporal layer of a GOP or others.

Summarizing the above: According to an embodiment, the data encoder 110 may, e.g., be configured to generate the indication data such that the indication data may, e.g., comprise an information on an error resiliency of a coded video sequence.

In an embodiment, the information on the error resiliency may, e.g., indicate one of three or more different states on the error resiliency of the coded video sequence.

Likewise, according to an embodiment, the data decoder 170 may, e.g., be configured to receive information which indicates an error resiliency of a coded video sequence. The data decoder 170 may, e.g., be configured to decode the encoded picture data depending on the information which indicates the error resiliency of the coded video sequence.

In an embodiment, the information on the error resiliency may, e.g., indicate one of three or more different states on the error resiliency of the coded video sequence.

In a particular embodiment, a first state of the three or more different states may, e.g., indicate that an access unit is not error resilient. A second state of the three or more different states may, e.g., indicate that a first plurality of access units of a picture parameter set is not error resilient. A third state of the three or more different states may, e.g., indicate that a second plurality of access units of a sequence parameter set is not error resilient.

In another particular embodiment, the information on the error resiliency may, e.g., indicate one of four or more different states on the error resiliency of the coded video sequence. A first state of the four or more different states may, e.g., indicate that the error resiliency is harmed on a picture-level and is harmed on a multiple-picture-level and is harmed on a sequence level. A second state of the four or more different states may, e.g., indicate that the error resiliency is harmed on the picture-level and is harmed on the multiple-picture-level, but is not harmed on the sequence level. A third state of the four or more different states may, e.g., indicate that the error resiliency is harmed on the picture-level, but that the error resiliency is not harmed on the multiple-picture-level and is not harmed on the sequence level. And a fourth state of the four or more different states may, e.g., indicate that the error resiliency is not harmed on the picture-level and is not harmed on the multiple-picture-level and is not harmed on the sequence level.

In the following subsection "coding area data fragmentation", coding area data fragmentation is described.

Like Tiles, CA can also be fragmented for the transport layer. There are no restrictions in this case. The possible use-cases are shown in FIG. 22, FIG. 23 and FIG. 24.

Figure 22:
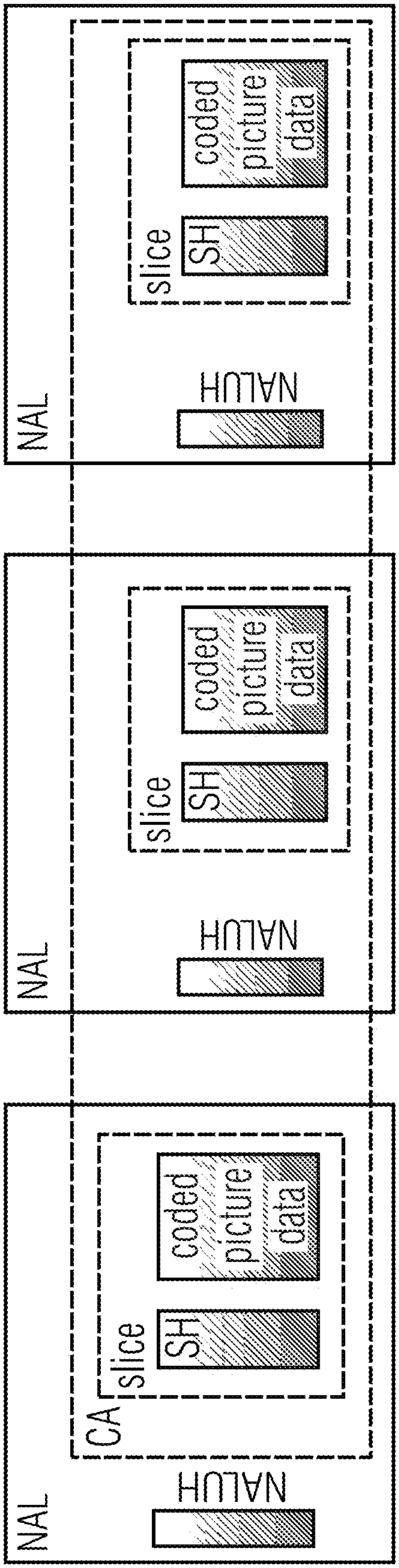
FIG. 22 illustrates a bitstream comprising single picture with one Coding Area, whereas CA is fragmented into multiple transport units.

FIG. 22 illustrates a bitstream comprising single picture with one Coding Area, whereas CA is fragmented into multiple transport units.

Figure 23:
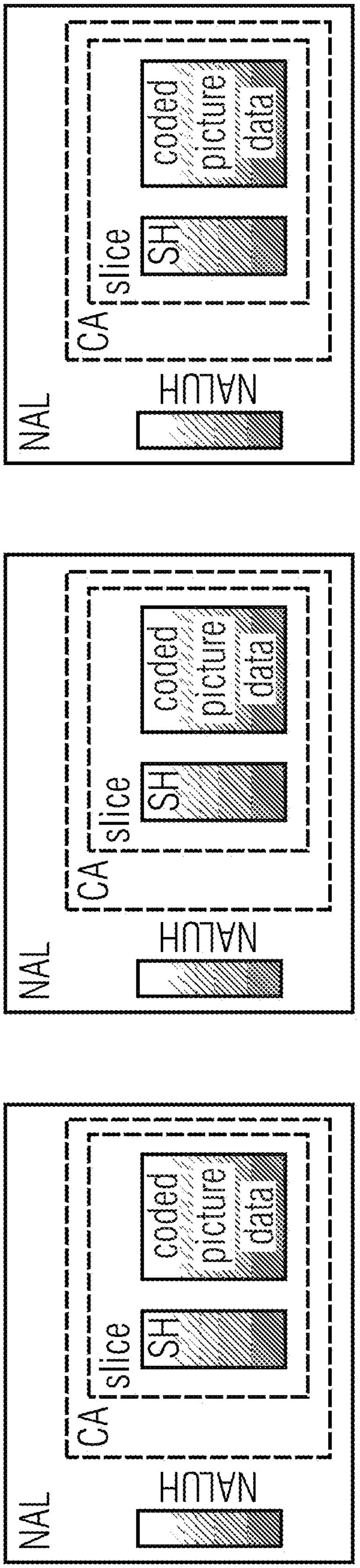
FIG. 23 illustrates a bitstream comprising single picture with multiple Coding Areas, whereas each CA has own transport unit.

FIG. 23 illustrates a bitstream comprising single picture with multiple Coding Areas, whereas each CA has own transport unit.

Figure 24:
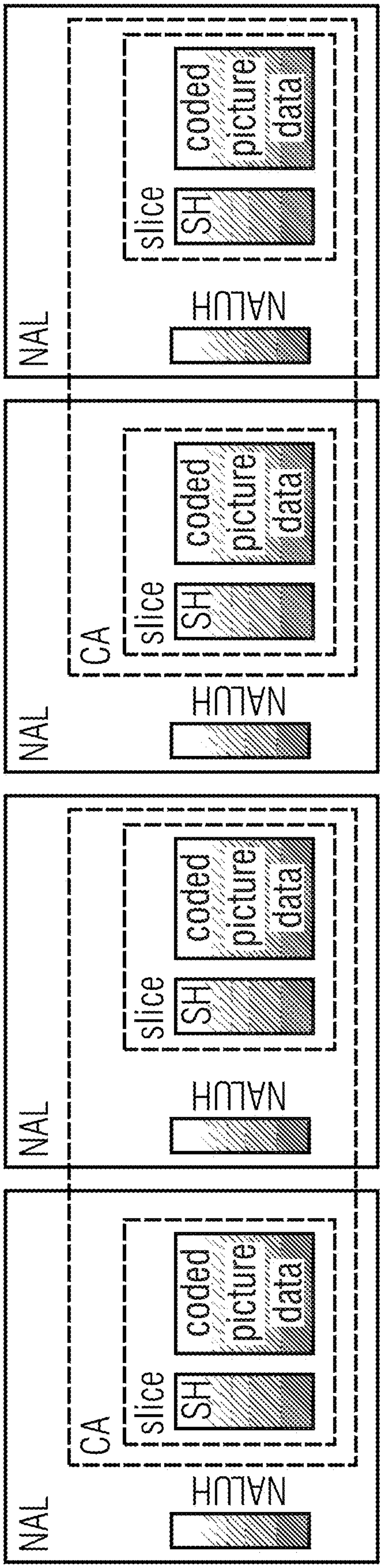
FIG. 24 illustrates a bitstream comprising single picture with multiple Coding Areas, whereas each CA is fragmented into multiple transport units.

FIG. 24 illustrates a bitstream comprising single picture with multiple Coding Areas, whereas each CA is fragmented into multiple transport units.

In the following subsection "coding sub-area spatial predictor management", coding sub-area spatial predictor management is described.

Figure 25:
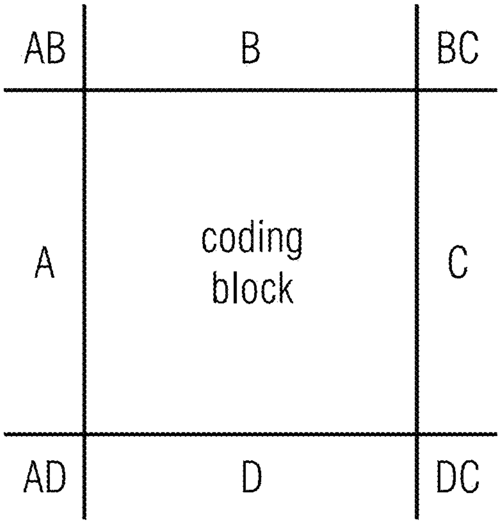
FIG. 25 illustrates a generalized presentation of a block surrounded by regions according to an embodiment.

FIG. 25 illustrates a generalized presentation of a block surrounded by regions according to an embodiment.

In the generalized approach, the coding block can be surrounded by eight major spatial regions, see FIG. 25.

In the following sub-subsection "general predictor management", a general predictor management is described.

The candidates from all eight neighbor regions can be incorporated in the prediction candidate list. They can be selected in straight forward manner, respectively their availability. In case of a CTU, which may, e.g., comprise a further partitioning into sub-blocks with a particular sub-block processing order and due to a particular availability scenario the order of sub-blocks can be aligned. For example, if only the neighbors AD, D, DC and C are available, the sub-blocks adjacent to these neighbors should be processed first.

Summarizing, according to an embodiment, the data encoder 110 may, e.g., be configured to encode a coding tree unit of the plurality of coding tree units being located within the picture depending on one or more coding tree units of eight neighboring coding tree units of the plurality of coding tree units being located within the picture, wherein the eight neighboring coding tree units are neighbored to said coding tree unit.

Likewise, in an embodiment, the data decoder 170 may, e.g., be configured to decode a coding tree unit of the plurality of coding tree units being located within the picture depending on one or more coding tree units of eight neighboring coding tree units of the plurality of coding tree units being located within the picture, wherein the eight neighboring coding tree units are neighbored to said coding tree unit.

In the following sub-subsection "spatial adaptation of neighbors", spatial adaptation of neighbors is described.

Some specific neighborhood scenarios would allow the conventional sub-block processing order by some adaptation of correspondent neighbor regions or predictors. In an embodiment, the adaptation may, e.g., comprise a rotation of the correspondent neighbor regions and if needed of a coding block, step-wise by a 90° degree step. For example, in FIG., if only the neighbors AD, D, DC, C and BC are available, rotation of these neighbors and if needed of the coding block by 180° can be performed. This could be a logical rotation, as well as a memory operation like transformation of buffered data like samples or syntax elements to a new buffered state.

The coordinate transform could also include a horizontal or vertical flip, which results in a different prediction candidate order . . . .

Summarizing, in an embodiment, the data encoder 110 may, e.g., be configured to encode a coding tree unit of the plurality of coding tree units being located within the picture by shifting a coding tree unit of the eight neighboring coding tree units into another one of the eight neighboring coding tree units.

Likewise, according to an embodiment, the data decoder 170 may, e.g., be configured to decode a coding tree unit of the plurality of coding tree units being located within the picture by shifting a coding tree unit of the eight neighboring coding tree units into another one of the eight neighboring coding tree units.

In the following sub-subsection "replacement concept for non-available neighbors", a replacement concept for non-available neighbors is described.

In some cases spatial neighbors are not available for prediction. In those cases, either the derivation algorithm is using different neighbors, that are available for prediction or the algorithm uses some kind of fallback to derive values by using either explicitly transmitted in the bit-stream or derived from previously coded symbols or reconstructed values.

In a particular embodiment, the spatial neighbors that are not available for prediction, may, e.g., be replaced by neighbors from the spatial neighborhood below the current block, if available.

Otherwise, if no spatial predictor below the current block is available. The default fall back is used.

In the following the term 'extended-below-left' in this context is defined, as block which is according to the definition in 0 directly located below-left the current block; except the special case where the bottom left sample of the current block is located in the bottom sample line of the current CTU. In this special case the extended-below-left neighbor of the current block is the top-right block of the CTU of the next CTU-line, that is available for prediction according to the proposed block dependency offset.

For example the QP prediction scheme in the current state of the art standard 0 uses the following derivation scheme with a given fallBackQP.

A=(isLeftCUavailble ? CULeftQP:fallBackQP)

B=(isAboveCUavailble ? CUAboveQP:fallBackQP)

PredictedQP (A+B+1)>>1

In a particular embodiment, the prediction scheme is extended to use the QP of the extended-below-left CU, if the left CU resp. the above CU is not available for prediction but the CU extended-below-left is available for prediction. If neither of the regular neighbor CU nor extended-below-left CU are available for prediction the fallBackQP is used instead to derive the values for A resp. B.

A=(isLeftCUavailble ? CULeftQP:(isExtendedBelowLeftCUavailble ?CUExtendedBelowLeftQP:fallBackQP))

B×(isAboveCUavailble ? CUAboveQP:(isExtendedBelowLeftCUavailble ?CUExtendedBelowLeftQP:fallBackQP))

PredictedQP (A+B+1)>>1

However, this kind of prediction scheme is universal and applicable to any prediction scheme that uses prediction data from left and above neighbors.

Especially, derivation of CABAC CTX CU split_flag derivation of CABAC CTX affine_flag derivation of CABAC CTX skip_flag derivation of CABAC CTX imv_flag derivation of CABAC CX bt split_flag derivation of CABAC CTX intra_nn_flag Furthermore, the invented prediction scheme can also be used in the normative decoding process for the derivation of particular predictors, e.g. the derivation process for motion vector components and reference indices, or the derivation process for luma intra prediction mode.

Summarizing, according to an embodiment, said eight neighboring coding tree units are a first neighborhood, and the data encoder 110 may, e.g., be configured to encode said coding tree unit of the plurality of coding tree units by shifting a third coding tree unit of another eight neighbouring coding tree units of a second neighborhood into a second coding tree unit of the eight neighboring coding tree units of the first neighborhood, if said second coding tree unit of the eight neighboring coding tree units of the first neighborhood is unavailable, said another eight neighbouring coding tree units of the second neighborhood being neighbored to said second coding tree unit.

Likewise, in an embodiment, eight neighboring coding tree units may, e.g., be a first neighborhood, and the data decoder 170 may, e.g., be configured to decode a coding tree unit of the plurality of coding tree units being located within the picture by shifting a third coding tree unit of another eight neighbouring coding tree units of a second neighborhood into a second coding tree unit of the eight neighboring coding tree units of the first neighborhood, if said second coding tree unit of the eight neighboring coding tree units of the first neighborhood is unavailable, said another eight neighbouring coding tree units of the second neighborhood being neighbored to said second coding tree unit.

Moreover, an encoded video signal encoding a picture is provided, wherein the encoded video signal comprises encoded picture data and indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein the picture is encoded depending on the plurality of coding areas, and wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the picture is encoded depending on the coding order of the one or more coding areas which comprise two or more coding tree units, and wherein the indication data comprises information on the coding order of the one or more coding areas which comprise two or more coding tree units.

According to an embodiment, each coding area of the plurality of coding areas extends rectangularly within the picture, and wherein each coding tree unit of the one or more coding tree units of each of the plurality of coding areas extends rectangularly within the picture.

In an embodiment, each of the plurality of coding tree units has a horizontal position within the picture and a vertical position within the picture, wherein a first coding area of the plurality of coding areas comprises a first coding tree unit having a first vertical position being identical to a second vertical position of a different second coding tree unit of a different second coding area of the plurality of coding areas, and a third coding tree unit of the first coding area has a third vertical position being different from the vertical position of any other coding tree unit of the second coding area, and a fourth coding tree unit of the second coding area has a fourth vertical position being different from the vertical position of any other coding tree unit of the first coding area, or wherein the first coding area of the plurality of coding areas comprises the first coding tree unit having a first horizontal position being identical to a second horizontal position of the different second coding tree unit of the different second coding area of the plurality of coding areas, and the third coding tree unit of the first coding area has a third horizontal position being different from the horizontal position of any other coding tree unit of the second coding area, and the fourth coding tree unit of the second coding area has a fourth horizontal position being different from the horizontal position of any other coding tree unit of the first coding area.

According to an embodiment, each coding area of the plurality of coding areas may, e.g., exhibit a spatial characteristic comprising a position, a width and a height of said coding area, wherein the width and the height of said coding area depend on the rectangular extension of said coding area, and wherein the position of said coding area depends on the location of said coding area within the picture.

In an embodiment, a first height of a first one of the plurality of coding areas may, e.g., be different from a second height of a second one of the plurality of coding areas, or wherein a first width of the first one of the plurality of coding areas is different from a second width of the second one of the plurality of coding areas.

According to an embodiment, the indication may, e.g., comprise information on the spatial characteristic of each coding area of the plurality of coding areas.

In an embodiment, the indication data may, e.g., comprise the position, the width and the height of each coding area of the plurality of coding areas.

According to an embodiment, the image data of a picture portion of each of the plurality of coding areas may, e.g., be encoded independently from encoding the image data of the picture portion of any other coding area of the plurality of coding areas to obtain the encoded picture data within the encoded video signal.

In an embodiment, a picture portion may, e.g., be encoded by encoding image data of the picture portion within each coding area of the plurality of coding areas to obtain the encoded picture data, wherein the image data of the picture portion of at least one of the plurality of coding areas is encoded within the encoded video signal such that encoding the image data of said at least one of the plurality of coding areas depends on the encoding of the image data of at least another one of the plurality of coding areas.

According to an embodiment, the encoded video signal may, e.g., comprise a bitstream, wherein the bitstream comprises the encoded picture data and the indication data.

In an embodiment, the indication data may, e.g., comprise information for each coding area on whether an address of a top left coding tree unit is specified.

According to an embodiment, the indication data may, e.g., comprise information on a number of the plurality of coding areas or the number of the plurality of coding areas minus 1 or the number of the plurality of coding areas minus 2.

In an embodiment, the indication data may, e.g., indicate for one of the plurality of coding areas which succeeds another one of the plurality of coding areas whether said one of the plurality of coding areas depends on said another one of the plurality of coding areas.

According to an embodiment, the indication data may, e.g., indicate whether exactly one slice of a plurality of slices is assigned to exactly one coding area of the plurality of coding areas.

In an embodiment, the indication data may, e.g., indicate whether the indication data comprises information on how to scan within each of the one or more coding tree units of the plurality of coding areas.

According to an embodiment, the indication data may, e.g., indicate how to scan within each of the one or more coding tree units of the plurality of coding areas.

In an embodiment, the indication data may, e.g., indicate for each of the plurality of coding areas whether the coding area comprises more than one coding tree unit.

According to an embodiment, the indication data may, e.g., indicate for one of the plurality of coding areas whether a coding tree unit scan is started with a leftmost coding tree unit or whether the coding tree unit scan is started with a rightmost coding tree unit.

In an embodiment, the indication data may, e.g., indicate for one of the plurality of coding areas whether a coding tree unit scan is started with a top coding tree unit row of the coding area or whether the coding tree unit scan is started with a bottom coding tree unit row of the coding area.

In an embodiment, the indication data may, e.g., indicate for one of the plurality of coding areas whether a coding tree unit scan is started in a horizontal direction or whether a coding tree unit scan is started in a vertical direction.

According to an embodiment, the indication data may, e.g., indicate non-contiguous information which indicates whether at least one of the plurality of coding areas encloses another one of the plurality of coding areas, or whether none of the plurality of coding areas encloses another one of the coding areas.

According to an embodiment, the indication data may, e.g., indicate for one of the plurality of coding areas a coding area width in coding tree units that specifies a number of coding tree units that are arranged in a horizontal direction within one of the coding areas.

In an embodiment, the indication data may, e.g., indicate for one of the plurality of coding areas a coding area height in coding tree units that specifies a number of coding tree units that are arranged in a vertical direction within one of the coding areas.

According to an embodiment, the indication data may, e.g., indicate for a coding area of the plurality of coding areas whether a last coding tree unit in horizontal direction within said coding area is smaller than another coding tree unit of said coding area that precedes said coding tree unit in the horizontal direction.

In a particular embodiment, said coding area may, e.g., comprise a plurality of last coding tree units in the horizontal direction, said last coding tree unit in the horizontal direction being one of said plurality of last coding tree units in the horizontal direction. If said last coding tree unit in the horizontal direction within said coding area is smaller than said another coding tree unit of said coding area that precedes said last coding tree unit in the horizontal direction, each of the plurality of last coding tree units in the horizontal direction may, e.g., have same width.

In an embodiment, the indication data may, e.g., indicate for a coding area of the plurality of coding areas whether a last coding tree unit in vertical direction within said coding area is smaller than another coding tree unit of said coding area that precedes said coding tree unit in the vertical direction.

In a particular embodiment, said coding area may, e.g., comprise a plurality of last coding tree units in the vertical direction, said last coding tree unit in the vertical direction being one of said plurality of last coding tree units in the vertical direction. If said last coding tree unit in the vertical direction within said coding area is smaller than said another coding tree unit of said coding area that precedes said last coding tree unit in the vertical direction, each of the plurality of last coding tree units in the vertical direction may, e.g., have same height.

In an embodiment, the indication data may, e.g., indicate for a coding area whether a start address indicating one of the one or more coding tree units of said coding area is indicated, or whether the start address indicating said one of the one or more coding tree units of said coding area is not indicated.

According to an embodiment, the indication data may, e.g., indicate how to split the picture one or more times to obtain the plurality of coding areas by splitting the picture the one or more times.

In an embodiment, the indication data may, e.g., indicate a plurality coding area split positions.

According to an embodiment, indication data may, e.g., indicate the plurality coding area split positions as an ordered sequence.

In an embodiment, the indication data may, e.g., indicate the plurality coding area split positions as a plurality of coding area split position values, wherein each of the plurality of coding area split position values depends on a width of the picture or depends on a height of the picture.

According to an embodiment, the indication data may, e.g., indicate how to split the picture hierarchically one or more times to obtain the plurality of coding areas by splitting the picture hierarchically the one or more times.

In an embodiment, the indication data may, e.g., comprise one or more area column stop flags for a coding area of the one or more coding areas, wherein, if an area column stop flag of a coding area of the one or more coding areas is set to a stop value, said area column stop flag may, e.g., indicate a width of said coding area. Or, the indication data may, e.g., comprise one or more area line stop flags for a coding area of the one or more coding areas, wherein, if an area line stop flag of a coding area of the one or more coding areas is set to a stop value, said area line stop flag may, e.g., indicate a height of said coding area.

According to an embodiment, the indication data may, e.g., indicate whether an explicit signalling mode is active or whether the explicit signalling mode is inactive. If the explicit signalling mode is active, and if a coding tree unit of the one or more coding tree units of the coding area is located at a picture boundary of the picture, the indication data may, e.g., comprise at least one of an area column stop flag and an area line stop flag for said coding tree unit. If the explicit signalling mode is inactive, and if said coding tree unit of the one or more coding tree units of the coding area is located at said picture boundary of the picture, the indication data does not comprise the area column stop flag for said coding tree unit and/or does not comprise the area line stop flag for said coding tree unit.

According to an embodiment, the coding order of each coding area of the one or more coding areas which comprises two or more coding tree units depends on a raster scan, wherein the indication data comprises information that may, e.g., indicate that the raster scan has been employed to encode each coding area of the one or more coding areas which comprise two or more coding tree units.

In an embodiment, the indication data comprises information that may, e.g., indicate that a diagonal scan has been employed to encode each coding area of the one or more coding areas which comprise two or more coding tree units.

According to an embodiment, the indication data may, e.g., indicate that a z-scan has been employed to encode each said area of the one or more coding areas which comprises five or more coding tree units.

In an embodiment, the indication data may, e.g., indicate a scan order comprising the one or more scan directions.

According to an embodiment, the indication data may, e.g., indicate an index which may, e.g., indicate a selected scan direction of the one or more scan directions.

In an embodiment, the indication data comprises information on an error resiliency of a coded video sequence.

According to an embodiment, the information on the error resiliency may, e.g., indicate one of three or more different states on the error resiliency of the coded video sequence.

In an embodiment, a first state of the three or more different states may, e.g., indicate that an access unit is not error resilient. A second state of the three or more different states may, e.g., indicate that a first plurality of access units of a picture parameter set is not error resilient. A third state of the three or more different states may, e.g., indicate that a second plurality of access units of a sequence parameter set is not error resilient.

In another embodiment, the information on the error resiliency may, e.g., indicate one of four or more different states on the error resiliency of the coded video sequence. A first state of the four or more different states may, e.g., indicate that the error resiliency is harmed on a picture-level and is harmed on a multiple-picture-level and is harmed on a sequence level. A second state of the four or more different states may, e.g., indicate that the error resiliency is harmed on the picture-level and is harmed on the multiple-picture-level, but is not harmed on the sequence level. A third state of the four or more different states may, e.g., indicate that the error resiliency is harmed on the picture-level, but that the error resiliency is not harmed on the multiple-picture-level and is not harmed on the sequence level. And a fourth state of the four or more different states may, e.g., indicate that the error resiliency is not harmed on the picture-level and is not harmed on the multiple-picture-level and is not harmed on the sequence level.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ISO/IEC, ITU-T. High efficiency video coding. ITU-T Recommendation H.2651 ISO/IEC 23008 10 (HEVC), edition 1, 2013; edition 2, 2014.

[2] European Patent Application, Application No. EP 18165249.6; filed on 29 Mar. 2018.

The invention claimed is:

1. A video decoder for decoding an encoded video signal comprising encoded picture data and indication data of a picture of a video to reconstruct the picture of the video, comprising:

an interface configured for receiving the encoded video signal, a data decoder configured for reconstructing the picture of the video by decoding the encoded picture data using the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, the data decoder is configured to decode the encoded picture data depending on the plurality of coding areas, wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, the data decoder is configured to decode the encoded picture data depending on the coding order of the one or more coding areas which comprise two or more coding tree units, wherein the indication data comprises information on the coding order of the one or more coding areas which comprise two or more coding tree units.

2. The video decoder according to claim 1,
wherein the data decoder is configured to decode the encoded picture data using information on how to split the picture one or more times to acquire the plurality of coding areas by splitting the picture the one or more times, wherein the indication data comprises said information.

3. The video decoder according to claim 2,
wherein the data decoder is configured to decode the encoded picture data using information which indicates a plurality coding area split positions, wherein the indication data comprises said information.

4. The video decoder according to claim 3,
wherein the data decoder is configured to decode the encoded picture data using information which indicates the plurality coding area split positions as an ordered sequence, wherein the indication data comprises said information.

5. The video decoder according to claim 3,
wherein the data decoder is configured to decode the encoded picture data using information which indicates the plurality coding area split positions as a plurality of coding area split position values, wherein each of the plurality of coding area split position values depends on a width of the picture or depends on a height of the picture, wherein the indication data comprises said information.

6. The video decoder according to claim 2,
wherein the data decoder is configured to decode the encoded picture data using information on the plurality of coding areas comprises information on how to split the picture hierarchically one or more times to acquire the plurality of coding areas by splitting the picture hierarchically the one or more times, wherein the indication data comprises said information.

7. A video encoder for encoding a picture by generating an encoded video signal, comprising:
a data encoder configured for encoding a picture of a video into encoded picture data, wherein the data encoder is moreover configured to generate indication data, and
a signal generator configured for generating the encoded video signal comprising the encoded picture data and the indication data,
wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein the data encoder is configured to encode the picture depending on the plurality of coding areas, and wherein the data encoder is configured to generate the indication data such that the indication data comprises information on the plurality of coding areas,
wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the data encoder is configured to encode the picture depending on the coding order of the one or more coding areas which comprise two or more coding tree units, and wherein the data encoder is configured to generate the indication data such that the indication data comprises information on the coding order of the one or more coding areas which comprise two or more coding tree units.

8. The video encoder according to claim 7,
wherein the data encoder is configured to generate the indication data such that the information on the plurality of coding areas comprises information on how to split the picture one or more times to acquire the plurality of coding areas by splitting the picture the one or more times.

9. The video encoder according to claim 8,
wherein the data encoder is configured to generate the indication data such that the indication data indicates a plurality coding area split positions.

10. The video encoder according to claim 9,
wherein the data encoder is configured to generate the indication data such that the indication data indicates the plurality coding area split positions as an ordered sequence.

11. The video encoder according to claim 9,
wherein the data encoder is configured to generate the indication data such that the indication data indicates the plurality coding area split positions as a plurality of coding area split position values, wherein each of the plurality of coding area split position values depends on a width of the picture or depends on a height of the picture.

12. The video encoder according to claim 8,
wherein the data encoder is configured to generate the indication data such that the information on the plurality of coding areas comprises information on how to split the picture hierarchically one or more times to acquire the plurality of coding areas by splitting the picture hierarchically the one or more times.

13. An encoded video signal encoding a picture, wherein the encoded video signal comprises encoded picture data and indication data,
wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein the picture is encoded depending on the plurality of coding areas, and wherein the indication data comprises information on the plurality of coding areas,
wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the picture is encoded depending on the coding order of the one or more coding areas which comprise two or more coding tree units, and wherein the indication data comprises information on the coding order of the one or more coding areas which comprise two or more coding tree units.

14. The encoded video signal according to claim 13,
wherein the indication data indicates how to split the picture one or more times to acquire the plurality of coding areas by splitting the picture the one or more times.

15. The encoded video signal according to claim 14,
wherein the indication data indicates a plurality coding area split positions.

16. The encoded video signal according to claim 15,
wherein the indication data indicates the plurality coding area split positions as an ordered sequence.

17. The encoded video signal according to claim 15, wherein the indication data indicates the plurality coding area split positions as a plurality of coding area split position values, wherein each of the plurality of coding area split position values depends on a width of the picture or depends on a height of the picture.

18. The encoded video signal according to claim 14, wherein the indication data indicates how to split the picture hierarchically one or more times to acquire the plurality of coding areas by splitting the picture hierarchically the one or more times.

19. A method for decoding an encoded video signal comprising encoded picture data and indication data of a picture of a video to reconstruct the picture of the video, comprising:

receiving the encoded video signal, and reconstructing the picture of the video by decoding the encoded picture data using the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, wherein decoding the encoded picture data is conducted depending on the plurality of coding areas, wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, decoding the encoded picture data is conducted depending on the coding order of the one or more coding areas which comprise two or more coding tree units, wherein the indication data comprises information on the coding order of the one or more coding areas which comprise two or more coding tree units.

20. A method for encoding a picture by generating an encoded video signal, comprising:

encoding a picture of a video into encoded picture data, generating indication data, and generating the encoded video signal comprising the encoded picture data and the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein encoding the picture is conducted depending on the plurality of coding areas, and wherein generating the indication data is conducted such that the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein encoding the picture is conducted depending on the coding order of the one or more coding areas which comprise two or more coding tree units, and wherein generating the indication data is conducted such that the indication data comprises information on the coding order of the one or more coding areas which comprise two or more coding tree units.

21. A non-transitory digital storage medium having a computer program stored thereon to perform the method for decoding an encoded video signal comprising encoded picture data and indication data of a picture of a video to reconstruct the picture of the video, the method comprising:

receiving the encoded video signal, and reconstructing the picture of the video by decoding the encoded picture data using the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, wherein decoding the encoded picture data is conducted depending on the plurality of coding areas, wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, decoding the encoded picture data is conducted depending on the coding order of the one or more coding areas which comprise two or more coding tree units, wherein the indication data comprises information on the coding order of the one or more coding areas which comprise two or more coding tree units, when said computer program is run by a computer.

22. A non-transitory digital storage medium having a computer program stored thereon to perform the method for encoding a picture by generating an encoded video signal, the method comprising:

encoding a picture of a video into encoded picture data, generating indication data, and generating the encoded video signal comprising the encoded picture data and the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein encoding the picture is conducted depending on the plurality of coding areas, and wherein generating the indication data is conducted such that the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein encoding the picture is conducted depending on the coding order of the one or more coding areas which comprise two or more coding tree units, and wherein generating the indication data is conducted such that the indication data comprises information on the coding order of the one or more coding areas which comprise two or more coding tree units, when said computer program is run by a computer.

23. The video decoder according to claim 1, wherein the video decoder is configured to output the picture of the video on an output device.

24. A system comprising:

a video encoder for encoding a picture by generating an encoded video signal, comprising:

a data encoder configured for encoding a picture of a video into encoded picture data, wherein the data encoder is moreover configured to generate indication data, and a signal generator configured for generating the encoded video signal comprising the encoded picture data and the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein the data encoder is configured to encode the picture depending on the plurality of coding areas, and wherein the data encoder is configured to generate the indication data such that the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein the data encoder is configured to encode the picture depending on the coding order of the one or more coding areas which comprise two or more coding tree units, and wherein the data encoder is configured to generate the indication data such that the indication data comprises information on the coding order of the one or more coding areas which comprise two or more coding tree units, and the video decoder for decoding an encoded video signal comprising encoded picture data and indication data of a picture of a video to reconstruct the picture of the video, comprising:

an interface configured for receiving the encoded video signal, a data decoder configured for reconstructing the picture of the video by decoding the encoded picture data using the indication data, wherein the picture is partitioned into a plurality of coding areas, wherein each coding area of the plurality of coding areas is located within the picture, wherein each of the plurality of coding areas comprises one or more coding tree units of a plurality of coding tree units being located within the picture, wherein, using the indication data, the data decoder is configured to decode the encoded picture data depending on the plurality of coding areas, wherein the indication data comprises information on the plurality of coding areas, wherein one or more coding areas of the plurality of coding areas comprise two or more coding tree units of the plurality of coding tree units, wherein each coding area of the one or more coding areas which comprises two or more coding tree units exhibits a coding order for the two or more coding tree units of said coding area, wherein, using the indication data, the data decoder is configured to decode the encoded picture data depending on the coding order of the one or more coding areas which comprise two or more coding tree units, wherein the indication data comprises information on the coding order of the one or more coding areas which comprise two or more coding tree units, wherein the video encoder is configured to generate the encoded video signal, and wherein the video decoder is configured to decode the encoded video signal to reconstruct the picture of the video.

* * * * *